(12) United States Patent
Hanano

(10) Patent No.: US 6,185,045 B1
(45) Date of Patent: Feb. 6, 2001

(54) IMAGE DISPLAY APPARATUS WITH MECHANISM FOR MODIFYING THE APPEARANCE OF THE PERIPHERY OF A DISPLAY DEVICE

(75) Inventor: Kazunari Hanano, Hachioji (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/002,524

(22) Filed: Jan. 5, 1998

(30) Foreign Application Priority Data

Jan. 6, 1997 (JP) .................................................... 9-000176
Nov. 11, 1997 (JP) .................................................... 9-308646

(51) Int. Cl.⁷ .................................................... G02B 27/14
(52) U.S. Cl. .......................... 359/631; 359/633; 359/630
(58) Field of Search ..................................... 359/629, 630, 359/631, 632, 633, 636, 637, 639, 640; 345/7, 8

(56) References Cited

U.S. PATENT DOCUMENTS

| | | | |
|---|---|---|---|
| 3,785,715 | * | 1/1974 | Mecklenborg ........................ 359/631 |
| 5,134,521 | * | 7/1992 | Lacroix et al. ....................... 359/631 |
| 5,184,250 | * | 2/1993 | Lacroix ................................. 359/631 |
| 5,768,025 | * | 6/1998 | Togino et al. ........................ 359/633 |

FOREIGN PATENT DOCUMENTS 5-328258  12/1993  (JP) .
6-268944   9/1994  (JP) .
7-325266  12/1995  (JP) .

* cited by examiner

*Primary Examiner*—Ricky Mack
(74) *Attorney, Agent, or Firm*—Pillsbury Madison & Sutro LLP

(57) ABSTRACT

A head-mounted image display apparatus capable of displaying an image with dynamic presence even if the observation field angle is not wide, and which is easy to view and unlikely to cause the observer's eye to be fatigued. An image display device (1) is disposed on one side of a projection lens (5') at approximately the focal point of the lens (5'), and a stop (8) is disposed on the other side of the lens (5') at approximately the focal point of the lens (5'), thereby projecting the image of the image display device (1). If the refracting power at the peripheral portion of the projection lens (5') is larger than that at the principal (central) area thereof, the image-formation characteristics of the projected image are deteriorated at the periphery. Consequently, the projected image is blurred at the periphery thereof. Thus, it is possible to project an image in which the edges of the image, which hinder an improvement in dynamic presence, are not clearly displayed.

24 Claims, 35 Drawing Sheets

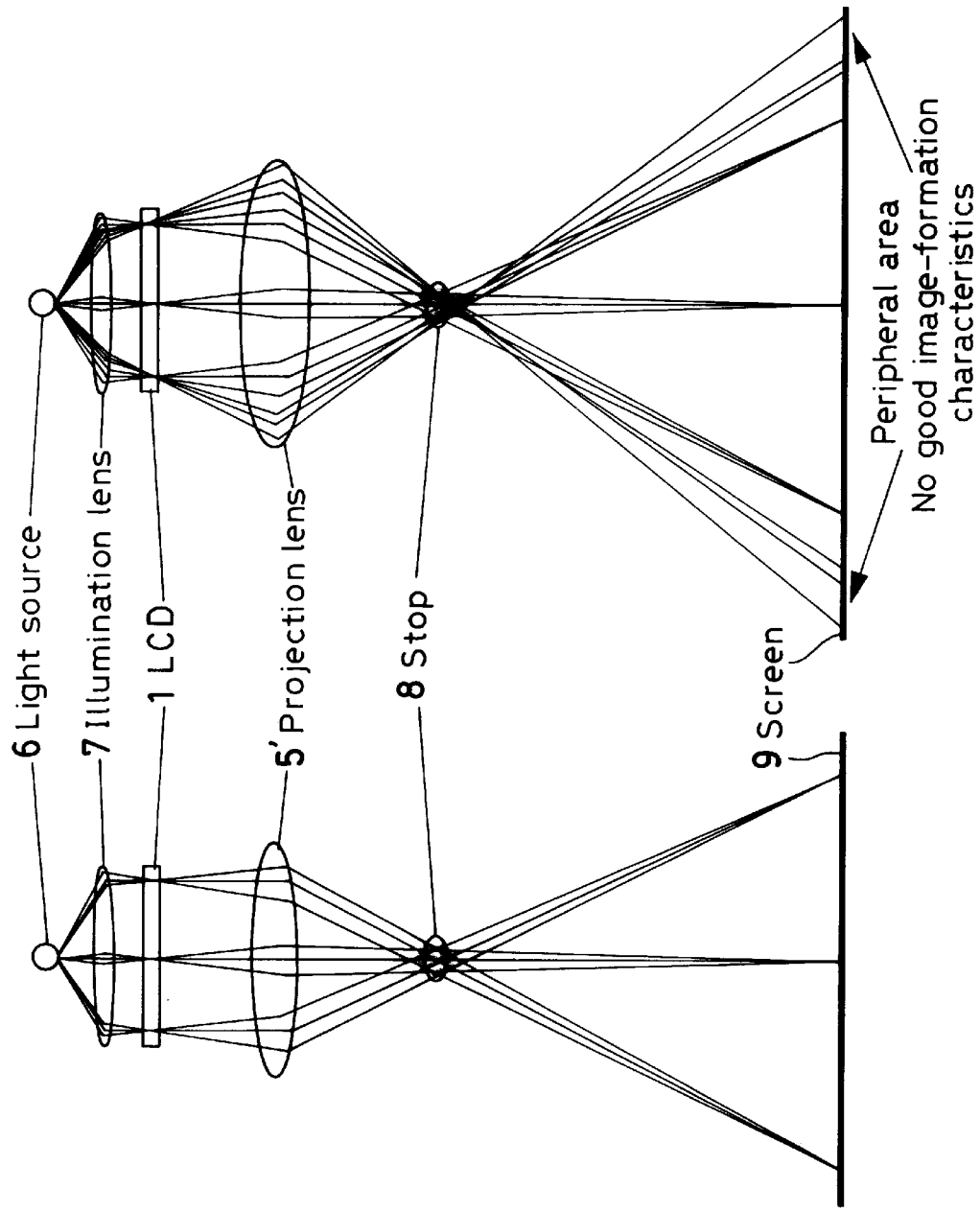

FIG. 36
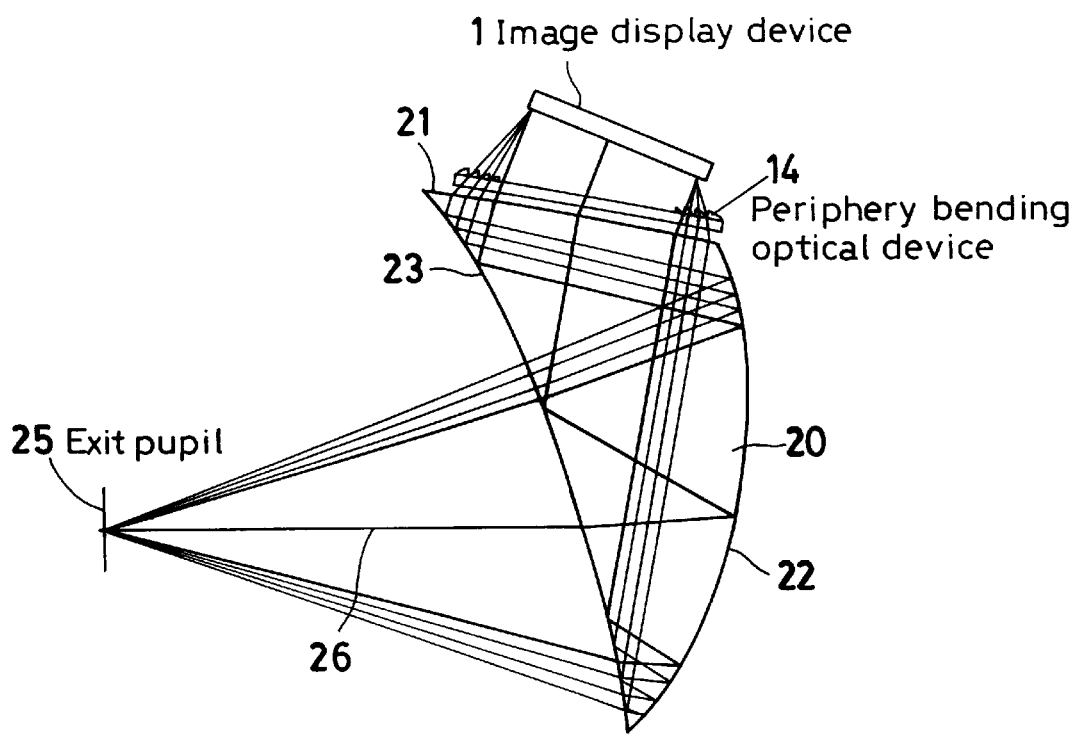
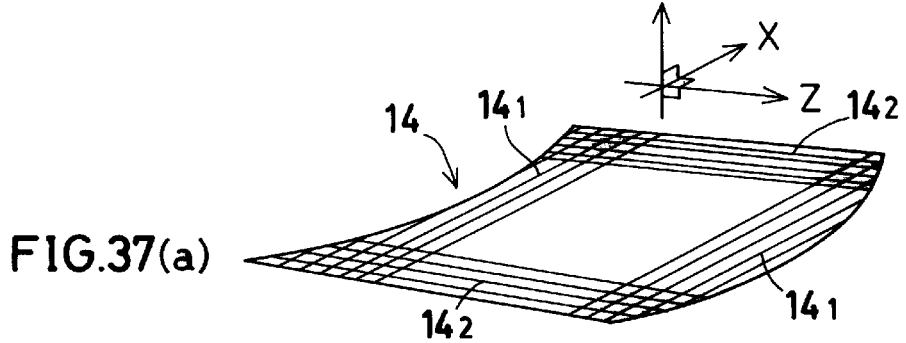
FIG. 37(a)
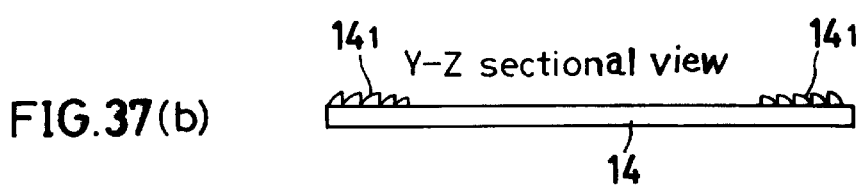
FIG. 37(b)

Light beam entering observer's pupil at incident angle θ

Light beam entering observer's pupil at incident angle $(\theta + \Delta\theta)$ Light beam entering observer's pupil at incident angle $(\theta - \Delta\theta)$ Area including area subjected to field periphery processing Horizontal 46°
Good image-formation area Horizontal 27.7°

IMAGE DISPLAY APPARATUS WITH MECHANISM FOR MODIFYING THE APPEARANCE OF THE PERIPHERY OF A DISPLAY DEVICE

BACKGROUND OF THE INVENTION

The present invention relates to an image display apparatus and, more particularly, to an easy-to-view head-mounted image display apparatus in which images are displayed under conditions close to those of the human visual field, thereby enabling the displayed images to be favorably seen without impairing the dynamic presence even if the image field is narrower than the field of view.

In recent years, head-mounted display apparatuses (HMD: Head Mounted Display) have been proposed in the field of virtual reality, in which the virtual image of a small-sized display disposed in front of an observer's eye is projected onto the retina of the eyeball by an optical system also disposed in front of the observer's eye, thereby allowing the observer to perceive the image. This type of apparatus is expected to be used in various applications. For example, a user wears such a display apparatus of his/her head to enjoy a wide-screen picture or image and sound of VTR personally.

Incidentally, when the image of an image display device is led to an observer's eye by an ocular optical system in the head-mounted image display apparatus, if the periphery of the projected image field is clearly displayed, the boundary between the image display area and the non-image display area, that is, the frame of the image field, is recognized. Accordingly, the displayed image field shows up clearly against a dark background. The frame separates distinctly the world of the displayed image from the observer's real world, causing the dynamic presence of the displayed image to be impaired to a considerably extent. If the frame of the image field, that is, the boundary, is clearly displayed with a strong contrast, the observer's line of sight tends to be directed toward the outer peripheral portion of the image field by the psychological effect, causing the observer to be unwillingly conscious of the presence of the frame, and thus making it difficult to obtain the dynamic presence of the displayed image.

The display condition that a bright image field shows up clearly against a dark background is unfavorable from the viewpoint of the fatigue of the observer's eye.

The frame of the image field, which causes degradation of the dynamic presence and aggravation of the fatigue, consists mainly of the images of the edges of the image display device and the image of the field stop.

To make the image field sufficiently large to prevent the frame from entering the field of view or to prevent the frame from interfering with the observation of the displayed image even if it is within the field of view, a wide observation field angle of from 120 degrees to 160 degrees or more is needed. To meet the demand of such a wide field angle, the optical system must become complicated and larger in size to correct aberrations. Moreover, a two-dimensional image display device corresponding to the wide field angle is required. However, a restriction in size is imposed on an image display apparatus of the type that is mounted on the user's head. Therefore, it is difficult to realize such a wide field angle under the restriction on the size of the apparatus.

To resolve these problems, Japanese Patent Application Unexamined Publication Number [hereinafter referred to as "JP(A)"] 8-146339 discloses a technique wherein a peripheral light source capable of independently illuminating the periphery of the displayed image is provided separately from illumination for an image display unit, and a mechanism for adjusting the peripheral light source is also provided, thereby giving a luminance to the periphery of the displayed image. JP(A) 5-328258 discloses a technique wherein a milky white diffuse transmission curved plate or the like is provided in an optical system to make the periphery of the displayed image unsharp. JP(A) 7-325266 discloses a technique wherein a light-blocking member or the like is provided in an optical system at a position corresponding to the periphery of the displayed image so that the periphery of the image is gradually blurred to become darker and unsharper.

According to these conventional techniques, light from an image display device, which is provided from the beginning, is not led to the periphery of the displayed image, but light from a newly provided light source is led to the periphery of the image, or marginal light is intentionally vingetted, thereby making the periphery of the image unsharp. Therefore, light that carries image information is not led to the unsharp portion outside the image display area. Accordingly, even when the image itself changes to a bright scene, the periphery of the image may be still dark. Conversely, the periphery may be bright despite a dark scene. Thus, the peripheral portion does not change in association with the displayed image and hence involves some unnaturalness. Further, the conventional techniques are not intended to widen the field angle effectively.

Regarding optical systems for use in head-mounted image display apparatuses, there have been proposed an optical system using a half-mirror and a concave mirror, and a prism-type optical system (JP(A) 6-268944). These optical systems are arranged to obtain a wide field angle for the size thereof while meeting the demand to achieve a reduction in the size of head-mounted image display apparatus, which is one of the requirements for this type of image display apparatus.

Regarding the vertical direction of these optical systems, as shown in FIG. 64, light from an image display device 1 passes through a half-mirror 3 to impinge on a concave mirror 2, and the reflected light is reflected by the half-mirror 3 and projected into an observer's eyeball E. The concave mirror 2 and the half-mirror 3 are disposed such that their center axes intersect each other at approximately 45 degrees. Therefore, the optical system has an approximately cubic configuration in which the effective diameter a of the concave mirror 2 is approximately equal to the length b of an exit surface 4, which is a surface closest to the observer's eyeball E. The exit surface 4 is not present if the optical system consists of only the concave mirror 2 and the half-mirror 3. However, a space shown by S in FIG. 64 is physically needed on the eyeball side. When the optical system is actually used as a product, the exit surface 4 is the surface of a cover glass. In the case of a prism optical system, the exit surface 4 is an exit-side surface of the prism. FIG. 65 shows above-described arrangement as an equivalent optical system which does not use the half-mirror 3. A refracting lens 5 in FIG. 65 has a positive refracting power equivalent to the power of the concave mirror 2 and is therefore equivalent to the concave mirror 2. In this case, the concave mirror 2 is a principal refracting surface having an action by which a bundle of light rays is bent to lead light rays to the observer's eyeball E. In the equivalent optical system, the concave mirror 2 is obviously the lens 5. As will be understood from FIGS. 64 and 65, because the refracting surface and the exit surface 4 are at a distance from each other, light beams passing via the edge of the concave mirror 2, or the lens 5, which limits the numerical aperture, do not pass through the edge of the exit surface 4, which is approximately equal in size to the refracting surface owing to the arrangement of the optical system, but pass through a portion closer to the optical axis than the edge. The same is true of the horizontal direction (direction perpendicular to the plane of the figure) of the optical system. That is, at the exit surface 4, the space S lying between the portion through which the light beams pass and the edge of the exit surface 4 is a dead space that is not used.

Thus, the conventional optical systems comprising a combination of the half-mirror 3 and the concave mirror 2 have the advantage that a wide field angle for observation is realized despite a compact structure, but in some respects they have the dead space S at the exit surface 4.

SUMMARY OF THE INVENTION

In view of the problems associated with the above-described conventional techniques, an object of the present invention is to provide a head-mounted image display apparatus capable of displaying an image with dynamic presence even if the observation field angle is not wide, and which is easy to view and unlikely to cause the observer's eye to be fatigued. It should be noted that there is not particular restriction on the type of image display device used in the present invention, and that the term "image display device" as used herein means any known device that is applicable.

To attain the above-described object, the present invention provides an image display apparatus having an image display device that displays an image, and a projection optical system that projects the image. The projection optical system has a periphery bending optical device that distributes a part of light beams from the periphery of the image display device to the inside and outside of an image display area in the image field.

In this case, it is desirable that the distribution of a part of the light beams by the periphery bending optical device should have a continuous distribution.

It is also desirable that the distribution of a part of the light beams by the periphery bending optical device should include a distribution at an angle exceeding the maximum field angle of the image display area in the image field.

In addition, the present invention provides an image display apparatus having an image display device that displays an image, and a projection optical system that projects the image. The projection optical system has an edge portion having a refracting or reflecting action and arranged such that the refracting power for the periphery of the image display area is larger in the positive direction than the refracting power for the principal display area.

In the above-described image display apparatuses, the projection optical system is preferably an ocular optical system that projects the image onto the retina in an observer's eyeball. The ocular optical system is preferably an optical system including a surface which has both transmitting and reflecting actions and which is tilted with respect to both the image display device and the visual axis so as to project an enlarged image of the image displayed by the image display device.

Still other objects and advantages of the invention will in part be obvious and will in part be apparent from the specification.

The invention accordingly comprises the features of construction, combinations of elements, an arrangement of parts which will be exemplified in the construction hereinafter set forth, and the scope of the invention will be indicated in the claims.

BRIEF DESCRIPTION OF THE DRAWINGS

FIGS. 1(*a*) and 1(*b*) are diagrams schematically showing the arrangement of an image display apparatus according to Example 1 of the present invention in comparison with the prior art.

FIG. 36 is a sectional view showing the arrangement of an optical system in an image display apparatus according to one form of Example 14 of the present invention.

FIGS. 37(a) and 37(b) are perspective and sectional views, respectively, of a periphery bending optical device used in Example 14.

DESCRIPTION OF THE PREFERRED EMBODIMENTS

Figure 2A:
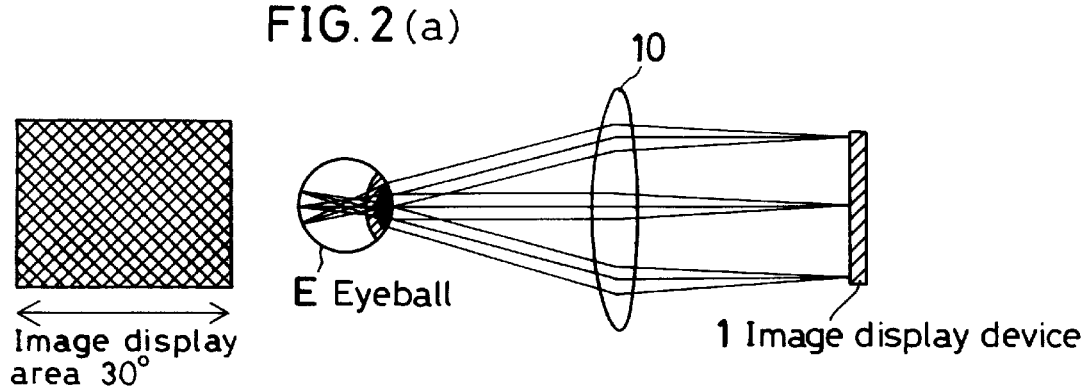
FIGS. 2(*a*), 2(*b*) and 2(*c*) are diagrams schematically showing the arrangement and displayed image field of an image display apparatus according to Example 2 of the present invention in comparison with the prior art.

The present invention will be described below, together with modifications thereof. Examples of the present invention will be described thereafter.

In projection optical systems wherein an image is projected onto a screen or the like for observation, a scheme of widening the observation field angle by enlarging the image field has been devised in order to enhance the dynamic presence. To further enhance the dynamic presence, a projection optical system according to one aspect of the present invention has a periphery bending optical device that distributes a part of light beams from the periphery of the image display device to the inside and outside of the image display area in the image field. The peripheral image is gradually blurred by the periphery bending optical device.

According to another aspect of the present invention, a projection optical system has an edge portion having a refracting or reflecting action and arranged such that the refracting power (transmissive refracting power, reflective refracting power or diffractive refracting power; the reciprocal of the focal length) for the periphery of the image display area is larger in the positive direction than the refracting power for the principal display area. With this arrangement, the peripheral image of the image projected by the optical system is gradually blurred by the large refracting power of the periphery of the image. Thus, the following advantageous effect is produced.

If the projected image is sharp as far as the periphery of the image display area, the image terminates suddenly at the edges of the screen, and the edges undersirably show clearly the boundary between the world of the projected image and the real world, giving the sensation that the observer is viewing the world of the projected image from the real world. This causes the dynamic presence to be impaired. By gradually blurring the edge portion, the boundary, or gap between the real world and the world of the projected image is made indistinct, thereby improving the dynamic presence.

It is preferable from the viewpoint of obtaining the advantageous effect that the distribution of light beams by the periphery bending optical device should be a continuous distribution and include a distribution at an angle exceeding the maximum field angle of the image display area in the projected image field.

According to the present invention, the projection optical system may be an ocular optical system that projects the image onto the retina in an observer's eyeball. Further, a scheme is devised for the periphery of a refracting surface or reflecting surface in the ocular optical system so that the boundary between the image display area and the non-image display area at the periphery of the observational field of view, that is, the frame of the image field, which causes the dynamic presence to be impaired, is made inconspicuous, thereby creating visual conditions close to those of the human natural field of view, in which resolution is high at and near an area in the image field at which the observer gazes but low at the periphery of the image field, that is, the periphery is gradually blurred to become unsharper and darker. Further, light is also led to the periphery of the image display area, thereby enabling an image with dynamic presence to be provided even if the normal display field angle is not wide.

As a specific design idea, the light-refracting power at a portion of the ocular optical system which corresponds to the periphery of the image display area is made larger in the positive direction than the light-refracting power for the principal display area. This causes aberrations, e.g. astigmatism, distortion and coma, to be introduced into the projected image. The fact that the refracting power at a portion of the ocular optical system which corresponds to the periphery of the image display area is larger than that for the principal display area means that, of light beams emitted from the periphery of the image display device, light beams emanating from the image display device at such a large exit angle that they have heretofore been impossible to lead to the observer's eyeball can also be led to the eyeball. This causes aberrations to be produced. Accordingly, light can be led to the dark at the boundary portion where the brightness contrast has heretofore been high, and hence it is possible to produce an image in which the boundary portion is gradually blurred to become darker. Thus, an image with dynamic presence can be provided even if the normal display field angle is not wide.

The ocular optical system is preferably an optical system including a surface which has both transmitting and reflecting actions and which is tilted with respect to both the image display device and the visual axis so as to project an enlarged image of the image displayed by the image display device. The ocular optical system, which includes a surface having both transmitting and reflecting actions, can display an image favorably with a compact structure by leading light rays to the observer's eye along a folded optical path. Light is newly led to a peripheral area of the image projected by the optical system by giving a large refracting power to a portion of the optical system which corresponds to the periphery of the image. Moreover, because the light, which is led to the peripheral area of the image, is inferior in image-formation characteristics, an image which is blurred at the periphery thereof is produced. Thus, it is possible to provide an optical system which is compact and yet capable of displaying an image with dynamic presence in which the boundary isolating the image world and the real world from each other is effectively blurred.

The arrangement of the ocular optical system may be as follows: The ocular optical system has a concave mirror disposed to face the image display device and having a focal length f satisfying the condition of $15 \leq f \leq 60$ (millimeters) so as to project an enlarged image of the image displayed by the image display device. The ocular optical system further has a semitransparent mirror disposed between the concave mirror and the image display device so as to lead light beams reflected by the concave mirror into the observer's eyeball. The concave mirror has a configuration in which the point of intersection between a line normal to a plane tangent to the peripheral area of the concave mirror and the optical axis of the concave mirror is closer to the concave mirror than the point of intersection between a line normal to a plane tangent to the principal area of the concave mirror and the optical axis of the concave mirror, so that the refracting power for light rays in the peripheral area is larger in the positive direction than the refracting power for light rays in the principal display area.

The above-described optical system, which has a semitransparent mirror (half-mirror) and a concave mirror, is capable of providing an image of wide field angle despite its compact structure, as has been stated above in connection with the problems of the prior art. The concave mirror in the optical system has a configuration in which the point of intersection between a line normal to a plane tangent to the peripheral area and the optical axis of the concave mirror is closer to the concave mirror than the point of intersection between a line normal to a plane tangent to the principal area and the optical axis of the concave mirror. In other words, the peripheral area has a steeper configuration than that of the principal area. Consequently, the refracting power of the peripheral area is increased, and astigmatism, distortion and comatic aberration are introduced into the image. Accordingly, of light beams emitted from the periphery of the image display device to reach the peripheral area, light beams emanating from the image display device at such a large exit angle that they have heretofore been impossible to lead to the observer's eyeball can also be led to the eyeball, and hence it is possible to produce an image in which the boundary portion is gradually blurred to become darker. Thus, an image with dynamic presence can be provided even if the normal display field angle is not wide.

The arrangement of the ocular optical system may be as follows: The ocular optical system has a concave mirror having an action by which the image displayed by the image display device is projected as an enlarged image. The concave mirror has a focal length f satisfying the condition of $15 \leq f \leq 60$ (millimeters) and is disposed to face the observer's eyeball such that the optical axis of the concave mirror intersects a line normal to the image display device. The ocular optical system further has a semitransparent mirror disposed between the observer's eyeball and the concave mirror to lead light beams emitted from the image display device to the concave mirror and to lead light beams reflected by the concave mirror into the observer's eyeball. The concave mirror has a configuration in which the point of intersection between a line normal to a plane tangent to the peripheral area of the concave mirror and the optical axis of the concave mirror is closer to the concave mirror than the point of intersection between a line normal to a plane tangent to the principal area of the concave mirror and the optical axis of the concave mirror, so that the refractive power for light rays in the peripheral area is larger in the positive direction than the refracting power for light rays in the principal display area.

In this case also, advantageous effects are produced as in the case of the above-described optical system. That is, the optical system has a half-mirror and a concave mirror and is capable of providing an image of wide field angle despite its compact structure. In the optical system, the peripheral area of the concave mirror has a steeper configuration than that of the principal area. Consequently, the refracting power of the peripheral area is increased, and astigmatism, distortion and comatic aberration are introduced into the image. Accordingly, of light beams emitted from the periphery of the image display device to reach the peripheral area, light beams emanating from the image display device at such a large exit angle that they have heretofore been impossible to lead to the observer's eyeball can also be led to the eyeball, and hence it is possible to produce an image in which the boundary portion is gradually blurred to become darker. Thus, an image with dynamic presence can be provided even if the normal display field angle is not wide.

The arrangement of the ocular optical system may be as follows: The ocular optical system has a concave mirror having an action by which the image displayed by the image display device is projected as an enlarged image. The concave mirror has a focal length f satisfying the condition of $15 \leq f \leq 60$ (millimeters and is disposed to face the observer's eyeball such that the optical axis of the concave mirror intersects a line normal to the image display device. The ocular optical system further has a cemented prism with a semitransparent portion disposed between the observer's eyeball and the concave mirror to lead light beams emitted from the image display device to the concave mirror and to lead light beams reflected by the concave mirror into the observer's eyeball. The concave mirror has a configuration in which the point of intersection between a line normal to a plane tangent to the peripheral area of the concave mirror and the optical axis of the concave mirror is closer to the concave mirror than the point of intersection between a line normal to a plane tangent to the principal area of the concave mirror and the optical axis of the concave mirror, so that the refracting power for light rays in the peripheral area is larger in the positive direction than the refracting power for light rays in the principal display area.

The prism optical system having a concave mirror and a cemented prism has a higher magnification than that of the above-described optical systems comprising a combination of a concave mirror and a half-mirror and is therefore capable of providing an image of wider field angle despite its compact structure. In the prism optical system, the peripehral area of the concave mirror has a steeper configuration than that of the principal area. Consequently, the refracting power of the peripheral area is increased, and astigmatism, distortion and comatic aberration are effectively introduced into the image in comparison to a case where the peripheral area of the concave mirror is not steeper. Moreover, of light beams emitted from the periphery of the image display device to reach the peripheral area, light beams emanating from the image display device at such a large exit angle that they have heretofore been impossible to lead to the observer's eyeball can also be led to the eyeball by the refracting power of the peripheral area, and hence it is possible to produce an image in which the boundary portion is gradually blurred to become darker. Thus, an image with dynamic presence can be provided even if the normal display field angle is not wide.

The arrangement of the ocular optical system may be as follows: The ocular optical system has a concave mirror having a focal length f satisfying the condition of $15 \leq f \leq 60$ (millimeters) and disposed such that the optical axis of the concave mirror intersects a line normal to the image display device so as to project an enlarged image of the image displayed by the image display device. The ocular optical system further has a cemented prism with a semitransparent portion disposed between the concave mirror and the image display device to lead light beams reflected by the concave mirror into the observer's eyeball. The concave mirror has a configuration in which the point of intersection between a line normal to a plane tangent to the peripheral area of the concave mirror and the optical axis of the concave mirror is closer to the concave mirror than the point of intersection between a line normal to a plane tangent to the principal area of the concave mirror and the optical axis of the concave mirror, so that the refracting power for light rays in the peripheral area is larger in the positive direction than the refracting power for light rays in the principal display area.

The prism optical system having a concave mirror and a cemented prism is capable of providing an image of wide field angle despite its compact structure as in the case of the above-described optical system. In the prism optical system, the peripheral area of the concave mirror has a steeper configuration than that of the principal area. Consequently, the refracting power of the peripheral area is increased, and aberrations are effectively introduced into the peripheral portion of the image in comparison to a case where the peripheral area of the concave mirror is not steeper. Moreover, of light beams emitted from the periphery of the image display device to reach the peripheral area, light beams emanating from the image display device at such a large exit angle that they have heretofore been impossible to lead to the observer's eyeball can also be led to the eyeball by the refracting power of the peripheral area, and hence it is possible to produce an image in which the boundary portion is gradually blurred to become darker. Thus, an image with dynamic presence can be provided even if the normal display field angle is not wide.

The ocular optical system may have a periphery bending optical device disposed in an optical path extending between the observer's eyeball and an optical device having the principal refracting power. The periphery bending optical device is arranged such that the light beam-refracting power for the peripheral area of the image display area is larger in the positive direction than the light beam-refracting power for the principal display area.

Thus, a special optical device in which the refracting power at a portion thereof corresponding to the peripheral portion of the image display area is larger in the positive direction than the refracting power for the principal display area is disposed on the observer's eyeball side of an optical device having the principal refracting power in the ocular optical system, whereby, of light beams emitted from the periphery of the image display device, light beams emanating from the image display device at such a large exit angle that they have heretofore been impossible to lead to the observer's eyeball can also be led to the eyeball. The light beams affected by the refracting power for the peripheral area enter the eyeball at a larger incident angle than that of light beams which are not affected by the refracting power and which form the most peripheral portion of the normal image with high resolution. Accordingly, light can be led to the dark at the boundary portion where the brightness contrast has heretofore been high. Consequently, it is possible to make the display field angle seem to have enlarged, and it is also possible to produce an image in which the boundary portion is gradually blurred to become darker. Thus, an image with dynamic presence can be provided even if the normal display field angle is not wide.

The ocular optical system may have an optical system including a surface which has both transmitting and reflecting actions and which is tilted with respect to both the image display device and the visual axis so as to project an enlarged image of the image displayed by the image display device.

The ocular optical system having both transmitting and reflecting actions as described above is favorable in that an image can be effectively displayed with a compact structure by leading light rays to the observer's eye along a folded optical path, but, at the same time, it has a dead area that is not used. More specifically, if an optical system is present on the eye side of a refracting optical system having a refracting power to lead light rays to the eye, the projection of the effective area of the eye-side optical system, through which light rays pass, on the refracting optical system is inevitably smaller than the refracting optical system because light rays are narrowed down and refracted toward the eye by the refracting optical system. The optical system having transmitting or reflecting action is made compact by being disposed on the eye side of the refracting optical system. Therefore, an area or space that is not used is inevitably present at the periphery of the eye-side optical system. A refracting (or diffracting or reflecting) power is given to the area or space that is not used, that is, the periphery bending optical device is provided in the area or space. Consequently, light is newly led to the peripheral area of the image, and the light is inferior in image-formation characteristics. Therefore, an image which is blurred at the periphery thereof is produced. Thus, it is possible to provide an image with dynamic presence in which the boundary isolating the image world and the real world from each other is effectively blurred even if the original display field angle is not wide.

The arrangement of the ocular optical system may be as follows: The ocular optical system has a concave mirror disposed to face the image display device and having a focal length f satisfying the condition of $15 \leq f 60$ (millimeters) so as to project an enlarged image of the image displayed by the image display device. The ocular optical system further has a semitransparent mirror disposed between the concave mirror and the image display device so as to lead light beams reflected by the concave mirror into the observer's eyeball. Further, the ocular optical system has a periphery bending optical device disposed in an optical path extending between the semitransparent mirror and the observer's eyeball. The periphery bending optical device is arranged such that the refracting power for the peripheral area of the image display device is larger in the positive direction than the refracting power for the principal display area.

The ocular optical system having a half-mirror and a concave mirror is capable of providing an image of wide field angle despite its compact structure, but, at the same time, a dead space is inevitably present on the exit side of the ocular optical system, as has been stated above in connection with the problems of the prior art. The periphery bending optical device is provided in the vicinity of the exit side of the ocular optical system to newly give a refracting power to a portion corresponding to the dead space, and the refracting power is set such that light beams affected by the refracting power enter the eyeball at a larger incident angle than that of light beams which are not affected by the refracting power and which form the most peripheral portion of the normal image with high resolution. Consequently, light beams which have heretofore been impossible to lead to the eyeball can be led to the eye, and light can be led to the dark at the boundary portion where the brightness contrast has heretofore been high. Consequently, it is possible to make the display field angle seem to have enlarged, and it is also possible to produce an image in which the boundary portion is gradually blurred to become darker. Thus, an image with dynamic presence can be provided even if the normal display field angle is not wide.

The arrangement of the ocular optical system may be as follows: The ocular optical system has a concave mirror having an action by which the image displayed by the image display device is projected as an enlarged image. The concave mirror has a focal length f satisfying the condition of $15 \leq f \leq 60$ (millimeters) and is disposed to face the observer's eyeball such that the optical axis of the concave mirror intersects a line normal to the image display device. The ocular optical system further has a semitransparent mirror disposed between the observer's eyeball and the concave mirror to lead light beams emitted from the image display device to the concave mirror and to lead light beams reflected by the concave mirror into the observer's eyeball. Further, the ocular optical system has a periphery bending optical device disposed in an optical path extending between the semitransparent mirror and the observer's eyeball. The periphery bending optical device is arranged such that the refracting power for the peripheral area of the image display device is larger in the positive direction than the refracting power for the principal display area.

In this case also, advantageous effects are produced as in the case of the above-described optical system. That is, the optical system has a half-mirror and a concave mirror and is capable of providing an image of wide field angle despite its compact structure. The periphery bending optical device is provided in the vicinity of the exit side of the optical system to give a refracting power to a portion corresponding to the dead space. The refracting power is set such that light beams affected by the refracting power enter the eyeball at a larger incident angle than that of light beams which are not affected by the refracting power and which form the most peripheral portion of the normal image with high resolution. Consequently, light beams which have heretofore been impossible to lead to the eyeball can be led to the eye, and light can be led to the dark at the boundary portion where the brightness contrast has heretofore been high. Consequently, it is possible to make the display field angle seem to have enlarged without increasing the size of the optical system, and it is also possible to produce an image in which the boundary portion is gradually blurred to become darker. Thus, an image with dynamic presence can be provided even if the normal display field angle is not wide.

The arrangement of the ocular optical system may be as follows: The ocular optical system has a concave mirror disposed to face the image display device and having a focal length f satisfying the condition of 15≦f≦60 (millimeters) so as to project an enlarged image of the image displayed by the image display device. The ocular optical system further has a cemented prism with a semitransparent portion disposed between the concave mirror and the image display device to lead light beams reflected by the concave mirror into the observer's eyeball. Further, the ocular optical system has a periphery bending optical device disposed in an optical path extending between the cemented prism and the observer's eyeball. The periphery bending optical device is arranged such that the refracting power for the peripheral are of the image display device is larger in the positive direction than the refracting power for the principal display area.

In this case also, the prism optical system having a concave mirror and a cemented prism is capable of providing an image of wide field angle despite its compact structure. On the other hand, a dead space is inevitably present on the exit side of the ocular optical system. The periphery bending optical device is provided in the vicinity of the prism exit surface to newly give a refracting power to a portion corresponding to the dead space, and the refracting power is set such that light beams affected by the refracting power enter the eyeball at a larger incident angle than that of light beams which are not affected by the refracting power and which form the most peripheral portion of the normal image with high resolution. As a result, light beams which have heretofore been impossible to lead to the eyeball can be led to the eye, and light can also be led to the dark at the boundary portion where the brightness contrast has heretofore been high. Consequently, it is possible to make the display field angle seem to have enlarged without increasing the size of the optical system, and it is also possible to produce an image in which the boundary portion is gradually blurred to become darker. Thus, an image with dynamic presence can be provided even if the normal display field angle is not wide.

The arrangement of the ocular optical system may be as follows: The ocular optical system has a concave mirror having a focal length f satisfying the condition of 15≦f≦60 (millimeters) and disposed such that the optical axis of the concave mirror intersects a line normal to the image display device so as to project an enlarged image of the image displayed by the image display device. The ocular optical system further has a cemented prism with a semitransparent portion disposed between the concave mirror and the image display device to lead light beams reflected by the concave mirror into the observer's eyeball. Further, the ocular optical system has a periphery bending optical device disposed in an optical path extending between the cemented prism and the observer's eyeball. The periphery bending optical device is arranged such that the refracting power for the peripheral area of the image display device is larger in the positive direction than the refracting power for the principal display area.

In this case also, the prism optical system having a concave mirror and a cemented prism is capable of providing an image of wide field angle despite its compact structure. On the other hand, a dead space is inevitably present on the exit side of the ocular optical system. The periphery bending optical device is provided in the vicinity of the prism exit surface to newly give a refracting power to a portion corresponding to the dead space, and the refracting power is set such that light beams affected by the refracting power enter the eyeball at a larger incident angle than that of light beams which are not affected by the refracting power and which form the most peripheral portion of the normal image with high resolution. Consequently, light beams which have heretofore been impossible to lead to the eyeball can be led to the eye, and light can also be led to the dark at the boundary portion where the brightness contrast has heretofore been high. Consequently, it is possible to make the display field angle seem to have enlarged without increasing the size of the optical system, and it is also possible to produce an image in which the boundary portion is gradually blurred to become darker. Thus, an image with dynamic presence can be provided even if the normal display field angle is not wide.

The above-described periphery bending optical device may have a distribution of refracting power in which the refracting power becomes stronger gently as the distance from the center of the device increases toward the periphery thereof.

If the periphery bending optical device is arranged such that the refracting power changes according to the position on the periphery bending optical device, it is possible to control the deviation angle of light rays according to the position at which the light rays pass through the periphery bending optical device. For example, the deviation angle of light rays can be controlled such that all light beams passing through the periphery bending optical device reach the edge of the principal refracting surface of the concave mirror in the backward ray tracing, for example.

The bending action of the periphery bending optical device works in such a way that light rays which would otherwise be incapable of being led to the eye are led thereto by the refracting power thereof. In this regard, light rays emanating from the eye at a large exit angle in the backward ray tracing may be vignetted in the optical system and fail to reach the image display device unless the refracting power is set so as to become stronger as the exit angle increases.

Light rays passing through a portion of the periphery bending optical device that has a strong refracting power are those which will be vignetted if the periphery bending optical device is not provided and are allowed to reach the image display device by the refracting power of that portion of the periphery bending optical device. Therefore, such light rays reach a portion of the image display device that is closer to the center than the periphery thereof in the backward ray tracing. In other words, the image outside the periphery of the normal image is formed by light rays from regions on the image display device which lie successively closer to the center of the image display device form the periphery thereof. In this case, if the image of a portion excessively close to the center of the image display device is displayed, the projected image becomes discontinuous and appears to be unnatural. Therefore, it is preferable for the refracting power to become stronger gently either continuously or stepwisely. The periphery bending optical device having this action enables light to be led smoothly to an area extending from the periphery of the normal image to the outside thereof. Thus, light can be led to the dark that gives a strong brightness contrast with the normal image in the prior art, without increasing the size of the optical system, and the projected image is presented in a natural form without becoming discontinuous. Consequently, it is possible to make the display field angle seem to have enlarged. Moreover, the image outside the normal image is a deteriorated image which is contiguous naturally with the periphery of the normal image. Accordingly, an image with dynamic presence can be provided even if the normal display field angle is not wide.

The image display apparatus may be arranged such that a region on the image display device which a light beam reaches in the backward ray tracing from the exit pupil after being subjected to the bending action of the periphery bending optical device for the peripheral area, the refracting power for which is larger than the refracting power for the principal display area, overlaps a region on the image display device which a light beam reaches in the backward ray tracing after being subjected to the bending action of the periphery bending optical device of the principal display area.

Thus, the refracting power of the periphery bending optical device is set such that a region on the image display device which a light beam subjected to the large refracting power of the periphery bending optical device for the peripheral area reaches in the backward ray tracing overlaps a region on the image display device which a light beam subjected to the refracting power for the principal display area, which is not so large as that for the peripheral area, reaches in the backward ray tracing. This means that regions where the light beams pass through the principal refracting surface in the optical system overlap each other.

In the backward ray tracing, light beams from the observer's eye can reach the image display device without being vignetted in the optical system by passing through the principal refracting surface no matter which regions they may pass through and even if the regions overlap each other. This means that light rays forming an incident angle to the eyeball are actually present. In other words, even light that is emitted from a portion of the image display device closer to the center thereof can be made incident on the eyeball at an enlarged incident angle. Accordingly, it is possible to make the display field angle seem to have enlarged without increasing the size of the optical system, and an image with dynamic presence can be provided even if the normal display field angle is not wide.

The periphery bending optical device may have an action by which, in the backward ray tracing from the exit pupil, light rays passing through the peripheral portion of the periphery bending optical device, which has a large refracting power, reach the vicinity of the edge of the optical device having the principal refracting power or the vicinity of the edge of the display area of the image display device.

Head-mounted image display apparatuses are demanded to minimize the size of the optical system thereof in order to make the apparatus as compact as possible. If the size of a lens or other optical element, e.g. a concave mirror, having the principal refracting power is determined so that a light beam emitted from the most peripheral portion of displayed image passes through the peripheral edge of such an optical element and is led to the observer'pupil with a view to minimizing the size of the optical system, the overall size of the optical system, which is approximately determined by the size of the optical element having the principal refracting power, is well balanced with the attainable display field angle. In other words, it is possible to construct an optical system which satisfies the demanded display field angle and, at the same time, which is not excessively large in size.

Figure 15:
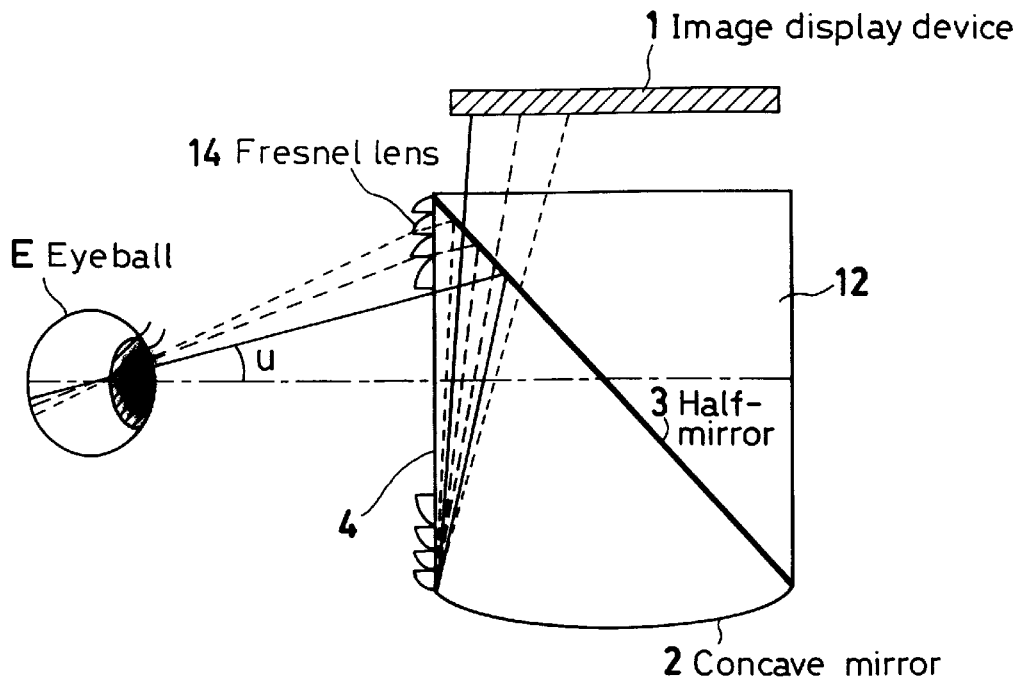
FIG. 15 is a vertical sectional view showing the arrangement of an optical system in an image display apparatus according to Example 8 of the present invention.

In this case, an image with dynamic presence can be provided without increasing the size of the optical system by arranging the periphery bending optical device to perform the following action:

The periphery bending optical device is arranged to perform a bending action such that, as shown in FIG. 15, light rays passing through the periphery bending optical device 14 (comprising a Fresnel lens in the case of FIG. 15) in the backward ray tracing from an eyeball E pass via the edge of the concave mirror 2. It should be noted that the arrangement shown in FIG. 15 will be described later in detail.

In the arrangement shown in FIG. 15, the exit angle u at which a light ray reaching the most peripheral portion of the image display device 1 emanates from the observer's eyeball E in the backward ray tracing is equivalent to the half field angle of the displayed image. Light rays exiting from the eyeball E at an angle near or larger than the angle u are subjected to the action of the periphery bending optical device 14. The light rays subjected to the action of the periphery bending optical device 14 reach a portion of the image display device 1 inside the most peripheral portion thereof by passing via the edge of the concave mirror 2. If the bending action of the periphery bending optical device 14 is uniform, light rays entering the eyeball E at a larger incident angle are those which are emitted from a more inward portion of the image display device 1. In this case, the displayed image is projected as a picture in which an image inferior in image-formation characteristics is present outside the normal image of good image-formation characteristics, which is not subjected to the action of the periphery bending optical device 14, and in the outside inferior image, as the distance from the center increases outwardly, the image of a portion closer to the center of the image display device is displayed. This is not favorable from the viewpoint of the naturalness of the image because as the arrival point on the concave mirror 2 of light passing through the periphery bending optical device 14 in the backward ray tracing comes closer to the center thereof, the light reaches a point closer to the center of the image display device 1, and the image of the central portion of the image display device 1 is discontinuously displayed outside the normal displayed image. This unfavorable phenomenon can be reduced by arranging the periphery bending optical device 14 such that light rays passing through the periphery bending optical device 14 in the backward ray tracing reach the edge of the concave mirror 2.

As will be clear from the foregoing description, the periphery bending optical device is arranged to have an action by which light rays passing through the periphery bending optical device pass via the edge of the concave mirror, thereby enabling light to be led to the dark which has heretofore been present outside the normal image and presented a strong brightness contrast with the normal image. Consequently, it is possible to make the display field angle seem to have enlarged without increasing the size of the optical system. Moreover, the image outside the normal image is a deteriorated image which is contiguous naturally with the periphery of the normal image. Accordingly, an image with dynamic presence can be provided even if the normal display field angle is not wide.

Assuming that a light ray which exits perpendicularly from the center of the image display device and which reaches the eyeball is defined as an optical axis, and that a light ray passing through the center of the exit pupil or a light ray passing through the center of the pupil of the observer's eyeball when the observer gazes at the center of the image field is defined as a principal ray, the periphery bending optical device may be provided so that the refracting action begins to work at a point within a range extending from a point 2.5 millimeters from a position where the principal ray exiting from the most peripheral portion of the image display device reaches the surface of the periphery bending optical device, on a side of the position that is closer to the optical axis, to a point 2.5 millimeters from the above-described position on a side thereof that is remote from the optical axis, and the refracting action is available in an area extending from the point at which the refracting action begins on a side thereof that is remote from the optical axis.

Figure 17:
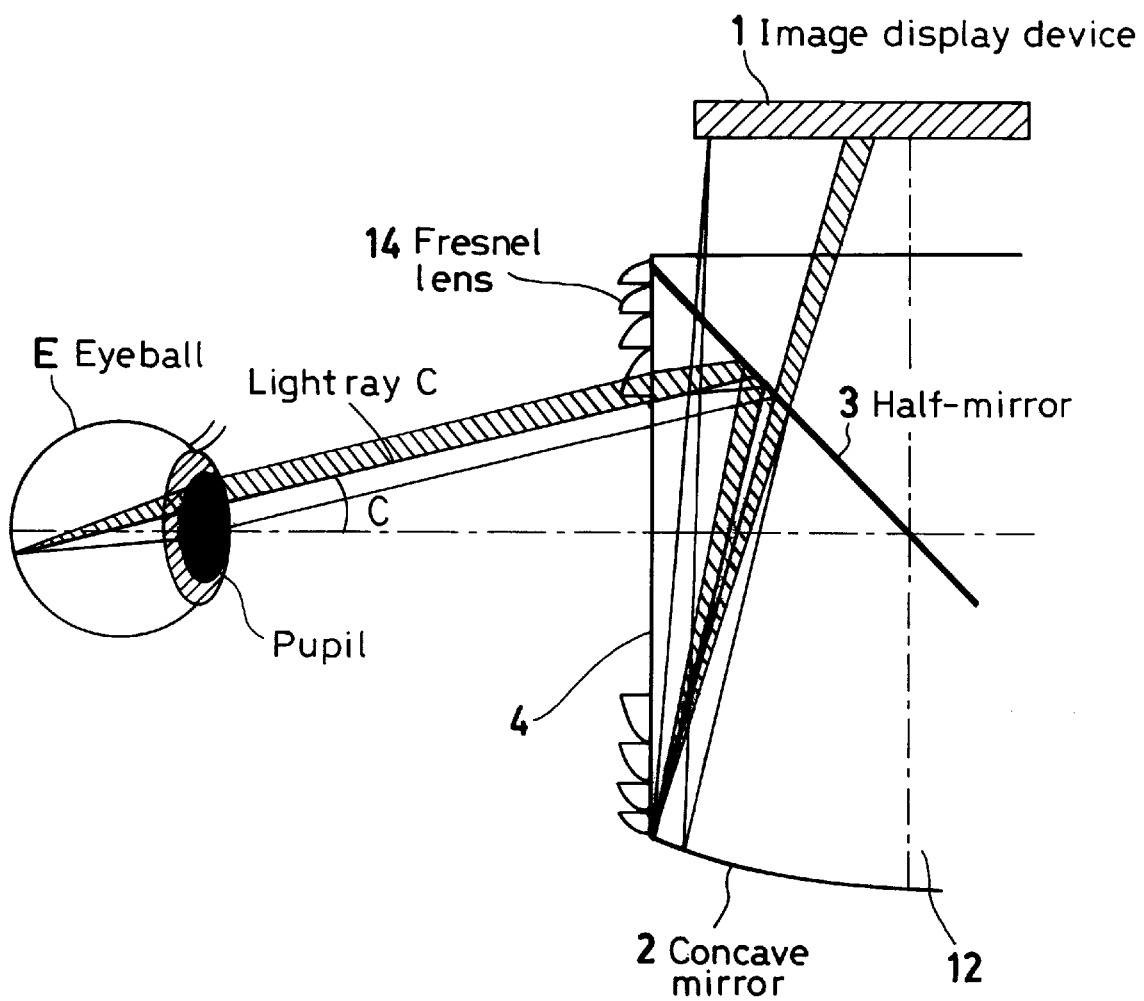
FIG. 17 is a fragmentary vertical sectional view showing the arrangement of an optical system in an image display apparatus according to Example 9 of the present invention.
Figure 61:
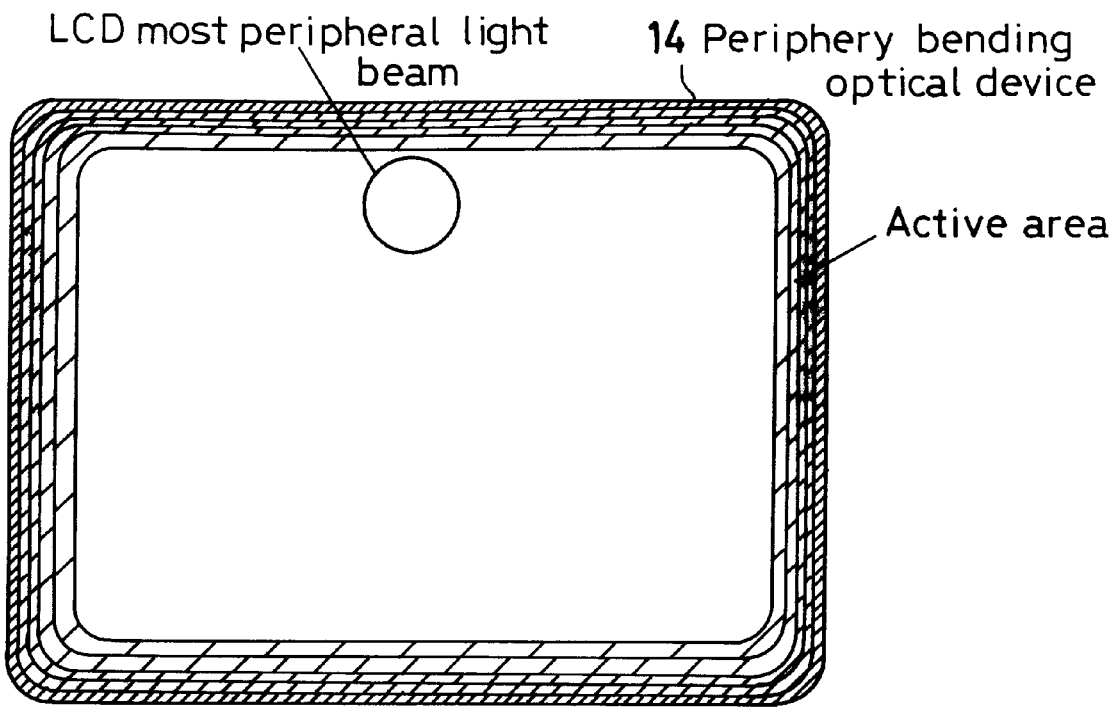
FIG. 61 is a diagram showing the way in which a light beam from the most peripheral portion of an LCD is in contact with the inner edge of a periphery bending optical device.

The diameter of the human pupil is roughly in the range of from 3 millimeters to 5 millimeters, although there are differences among individuals. In a dark environment, the pupil diameter increases. If the exit pupil diameter of the optical system is about 5 millimeters or more, it is possible to see the image as far as the periphery thereof. In a case where the diameter of a light beam emitted from the image display device as it enters the observer's eyeball has the above-mentioned value, the way in which the image is seen changes according to how many of light rays in the light beam are subjected to the action of the periphery bending optical device, that is, how many of light rays pass through the periphery bending optical device. As shown in FIG. 17 (described later in detail), the periphery bending optical device 14 is provided so as to act only on the periphery of the image field. In this case, as a light beam emitted from the image display device 1 comes closer to the periphery, the proportion in which it is subjected to the action of the periphery bending optical device 14 increases. An image in which the peripheral portion is gradually blurred is obtained by disposing the periphery bending optical device 14 such that the edge of its portion having refracting action lies within the range corresponding to the beam diameter, i.e. about 5 millimeters, from a position at which light emanating perpendicularly from the periphery of the image display device 1 reaches the periphery bending optical device 14 so that the periphery bending optical device 14 acts on a part or the whole of a light beam emitted from the most peripheral portion of the image display device 1 (see FIGS. 61, 62 and 63: in FIG. 61, the most peripheral light beam from the LCD is in contact with the inner edge of the periphery bending optical device 14; in FIG. 62, a half of the LCD most peripheral light beam impinges on the periphery bending optical device 14; and in FIG. 63, the whole of the LCD most peripheral light beam impinges on the periphery bending optical device 14).

Further, if the active area of the periphery bending optical device 14 is present outside the LCD most peripheral light beam, light emanating from a portion of the image display device 1 extending from the periphery to an inner portion thereof can be led to the eyeball E from the outside of the above-described light rays; therefore, the outside of the most peripheral portion of the normal image is not dark. Consequently, it is possible to make the display field angle seem to have enlarged. Moreover, the image outside the normal image is a deteriorated image which is contiguous naturally with the periphery of the normal image. Accordingly, an image with dynamic presence can be provided even if the normal display field angle is not wide.

In the above-described case, the point at which the refracting action begins may be within a range extending from a point 0.5 millimeter from the position where the principal ray exiting from the most peripheral portion of the image display device reaches the surface of the periphery bending optical device, on a side thereof that is closer to the optical axis, to a point 0.5 millimeter from that position on a side thereof that is remote from the optical axis.

Figure 62:
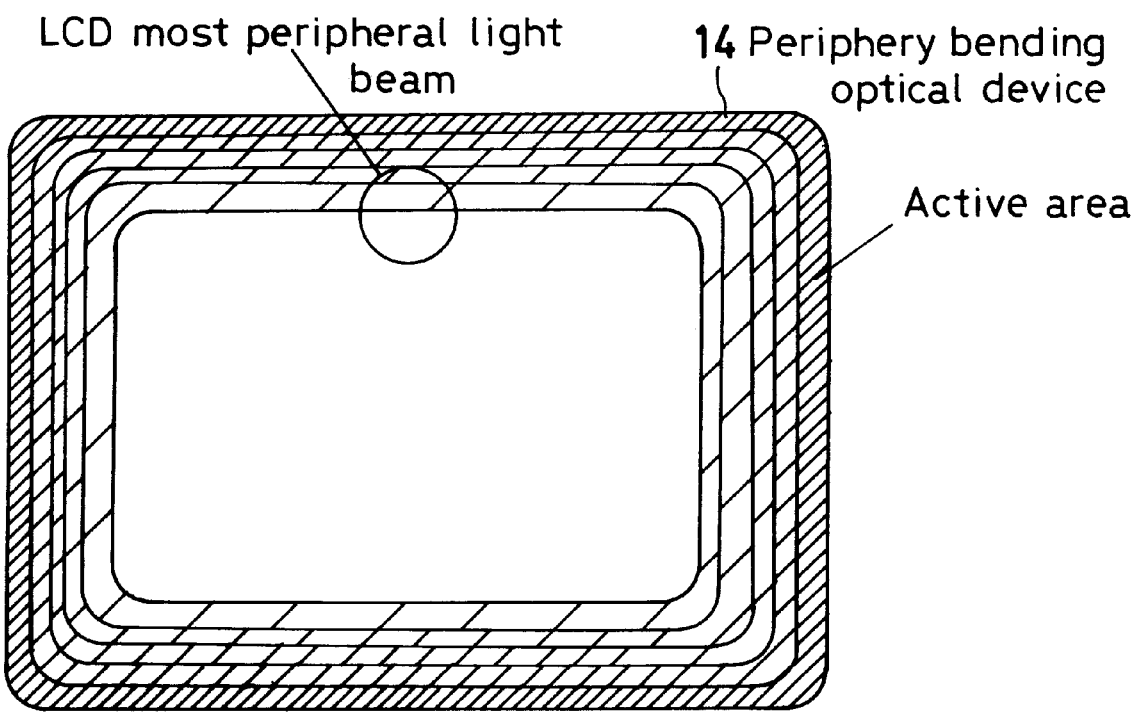
FIG. 62 is a diagram showing the way in which a half of the most peripheral light beam from the LCD impinges on the periphery bending optical device.

As stated above, the way in which the image is seen changes according to how many of rays in a light beam forming the pupil are subjected to the action of the periphery bending optical device, that is, how many of the rays pass through the periphery bending optical device. In this regard, if the periphery bending optical device is arranged such that, as shown in FIG. 62, the optical axis-side endmost portion of the periphery bending optical device is struck by the principal ray of a light beam emitted from the most peripheral portion of the image display device (the upper most peripheral light beam in the figure) in the course of traveling to the eyeball, light rays above (outside) the principal ray are subjected to the action of the periphery bending optical device, while light rays below (inside) the principal ray are not subjected to the action of the periphery bending optical device.

Therefore, the refracting action-initiating end of active area is positioned in an area within ±0.5 millimeter from the arrival position of the principal ray by taking into consideration differences among individuals and errors. By doing so, the following action can be realized.

Light rays which are not subjected to the action of the periphery bending optical device are those which form the normal image of high resolution, and light rays subjected to the action are led to the periphery of the normal image to produce the effect of enlarging the display field angle. Therefore, the image of the most peripheral portion of the normal image is formed by a light quantity which is 50% of the light beams emitted from the most peripheral portion of the image display device. An image inside the most peripheral image is formed by a larger quantity of light because the quantity of light impinging on the periphery bending optical device is less than 50% of the light beams. Accordingly, as the distance from the most peripheral portion increases inwardly toward the center, the quantity of light forming the normal image increases, whereas the quantity of improper light, which is subjected to the action of the periphery bending optical device, increases as will be clear from the graph shown in FIG. 23 (described later). On the other hand, according to the backward ray tracing, light exiting from the eyeball at an exit angle larger than that of the light beam from the most peripheral portion of the image display device is vignetted by the end portion of a concave mirror or the principal refracting surface on the basis of the above-described consideration of the size of the optical system. Therefore, the normal image is not longer present. It is possible to say that the principal refracting surface or the concave mirror serves practically as an aperture stop. The quantity of improper light increases conversely.

As will be understood from the graph of FIG. 23, the condition of the joint between the normal, or proper image and the improper image at the periphery is as follows: If the periphery bending optical device is arranged such that the action thereof starts from a more inward light ray, the field angle of the normal image becomes narrower, whereas, if the periphery bending optical device is arranged such that the action thereof starts from a more outward light ray, light rays entering the eyeball at an incident angle larger than that of light rays emitted from the most peripheral portion of the image display device would be vignetted if not subjected to the action of the periphery bending optical device. Accordingly, the light quantity still falls at the most peripheral portion of the normal image, and the rise of the graph at which light for the improper image begins to be subjected to the action of the periphery bending optical device is retarded (i.e. the incident angle increases). This causes only the whole graph to shift to the right. Accordingly, the condition of the joint between the images deteriorates. Thus, if the periphery bending optical device is arranged such that the action thereof starts from the principal ray of a light beam emitted from the most peripheral portion of the image display device upon the balance of the above-described display field angle of the normal image and the condition of the joint between the images, light can be gradually led to the eyeball from the outside of the above-described light rays by the action of the periphery bending optical device. Accordingly, the outside of the most peripheral portion of the normal image is not dark, and consequently, it is possible to make the display field angle seem to have enlarged. Moreover, the image outside the normal image is a deteriorated image which is contiguous naturally with the periphery of the normal image. Accordingly, an image with dynamic presence can be provided even if the normal display field angle is not wide.

In the above-described case, the point at which the refracting action begins may be in a range extending from a point 1.5 millimeters from the position where the principal ray exiting from the most peripheral portion of the image display device reaches the surface of the periphery bending optical device, on a side thereof that is closer to the optical axis, to a point 2.5 millimeters from that position on a side thereof that is remote from the optical axis.

Figure 63:
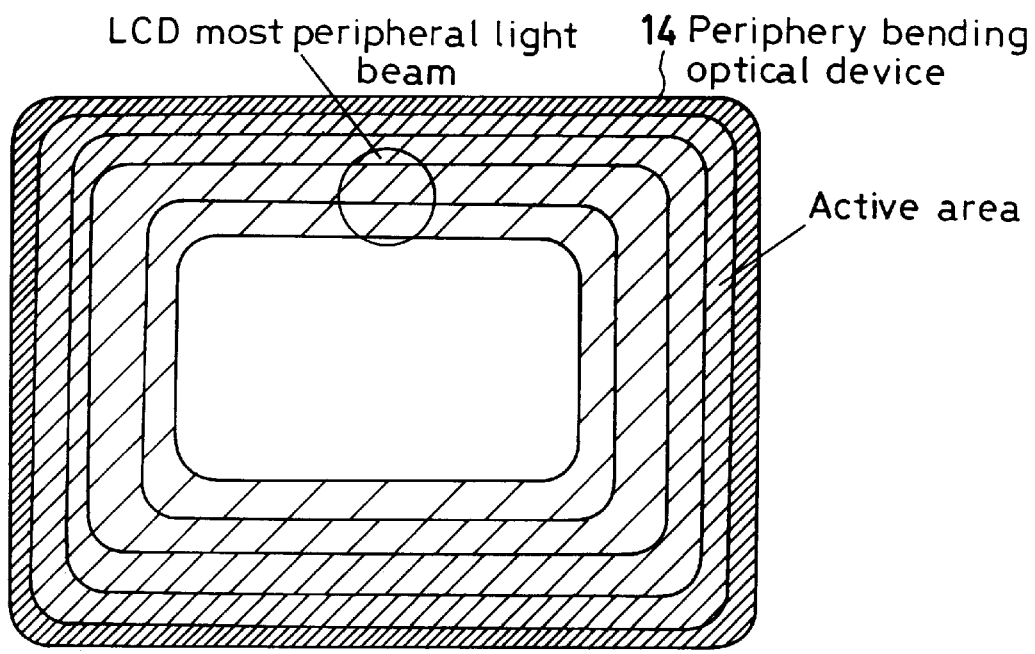
FIG. 63 is a diagram showing the way in which the whole of the most peripheral light beam from the LCD impinges on the periphery bending optical device.
Figure 64:
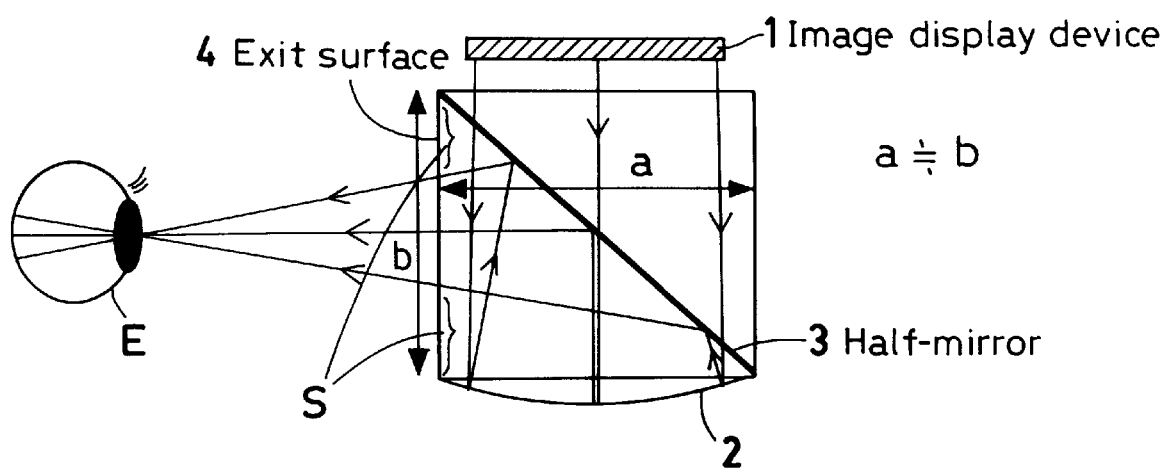
FIG. 64 is a diagram showing the arrangement of an optical system in a conventional head-mounted image display apparatus.
Figure 65:
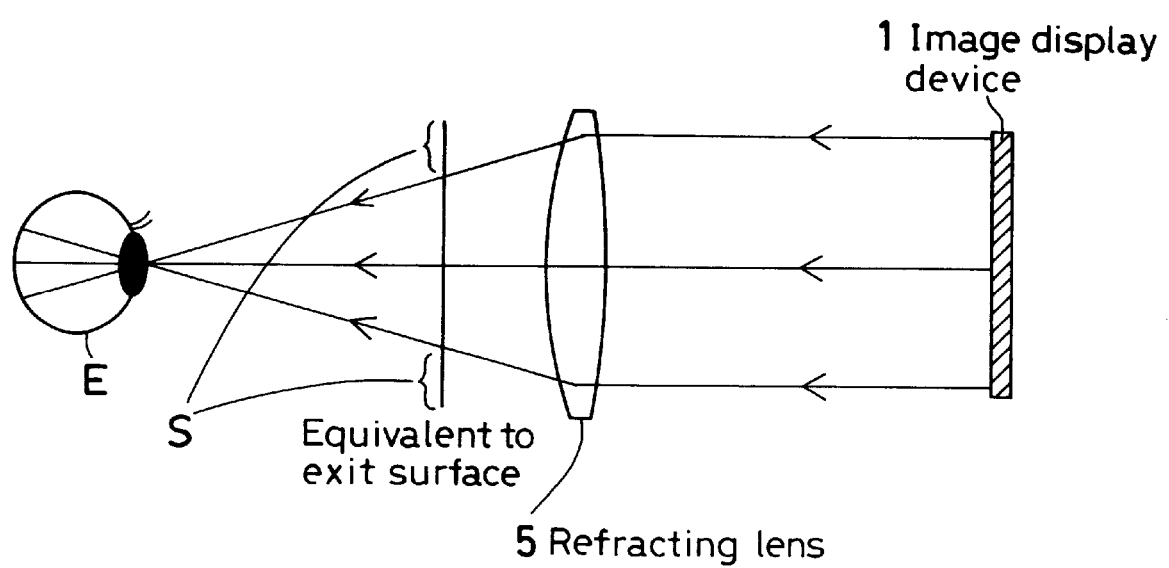
FIG. 65 is a diagram showing an equivalent optical system in which a half-mirror in FIG. 64 is not used.

As stated above, the way in which the image is seen changes according to how many of rays in a light beam forming the pupil pass through the periphery bending optical device. In this regard, the action-initiating point of the periphery bending optical device is positioned in an area within ±0.5 millimeter in the vertical and horizontal directions from a point closer to the center than the arrival position on the periphery bending optical device of a light ray exiting perpendicularly from the most peripheral portion of the image display device by a distance corresponding to a half of the beam diameter, that is, a half of the exit pupil, i.e. 2 millimeters, by taking into consideration differences among environments and differences among individuals so that the whole of a pupil-forming light beam emitted from the most peripheral portion of the image display device, including subordinate rays, impinges on the action-initiating position of the periphery bending optical device as shown in FIG. 63 (in which the upper most peripheral light beam is shown). By doing so, the following advantageous effect is obtained.

Figure 26:
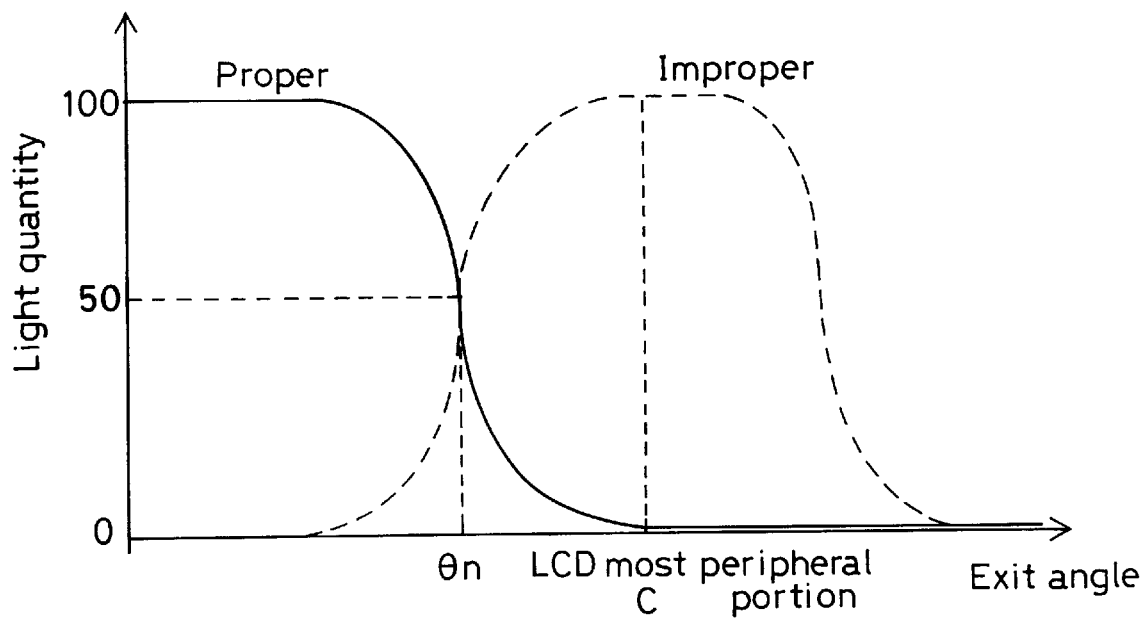
FIG. 26 is a diagram corresponding to FIG. 23, showing the relationship between the light quantity and the exit angle of light emanating from an eye in backward ray tracing in Example 10.

By positioning the action-initiating point as described above, the graph of FIG. 23 changes as shown in FIG. 26 (described later). That is, the angle of incidence on the eyeball of light passing through the action-initiating point of the periphery bending optical device becomes small, and the light quantity for the most peripheral portion becomes 0%. If this is shown by the total light quantity of the proper light quantity and the improper light quantity, the graph is flattened (see FIG. 27). Consequently, the change of the brightness does not becomes discontinuous in the vicinity of the periphery, and it is possible to make the display field angle seem to have enlarged in a natural way. Accordingly, an image with dynamic presence can be provided even if the normal display field angle is not wide.

The periphery bending optical device may be formed from a Fresnel optical element. More specifically, the periphery bending optical device is disposed on the eyeball side of the principal refracting surface in the optical system. Therefore, the eye relief, which is determined by the optical system, is reduced by an amount corresponding to the size of the periphery bending optical device. In a head-mounted image display apparatus, the eye relief is desired to be as long as possible by taking into consideration the use of a pair of glasses; therefore, it is desired to refract light efficiently by using a thin optical device. A Fresnel optical element, which is a thin optical device, enables an image with dynamic presence to be provided even if the normal display field angle is not wide without shortening the eye relief very much.

The periphery bending optical device may be formed from a diffractive optical element. As stated above, an optical device which is as thin as possible and yet capable of efficiently refracting light is suitable for use as the periphery bending optical device. A diffractive optical element, which is extremely thin, enables an image with dynamic presence to be provided even if the normal display field angle is not wide without shortening the eye relief very much.

The final exit surface, which is closest to the observer's eyeball, may be arranged to serve also as the periphery bending optical device. More specifically, when the ocular optical system includes a cemented prism, a dead space is present at the exit surface, as stated above. Moreover, the periphery bending optical device is disposed on the eyeball side of the principal refracting surface in the optical system; therefore, the eye relief, which is determined by the optical system, is reduced by an amount corresponding to the size of the periphery bending optical device, as stated above. In view of the above two points, if the periphery bending action according to the present invention is given to an optical element in the vicinity of the dead space in the prism optical system, an image with dynamic presence can be provided even if the normal display field angle is not wide without increasing the number of optical elements constituting the optical system and without narrowing the eye relief.

The arrangement of the ocular optical system may be as follows: The principal refracting surface has an aspherical surface in which a positive refracting power weakens at the periphery thereof. Further, the ocular optical system has a periphery bending optical device having a large refracting power in the positive direction to lead light beams subjected to the action at the periphery of the aspherical surface to the pupil of the observer's eyeball.

If an optical device having the principal refracting power in the ocular optical system has an aspherical surface in which a positive refracting power gradually weakens as the distance from the center of the surface increases toward the periphery thereof (in some cases, the positive refracting power changes to a negative refracting power), light beams emitted from the periphery of the image display device and passing through the peripheral aspherical surface are bend away from the optical axis. These light rays can be led to the observer's eyeball by the periphery bending optical device in which the refracting power for the peripheral area is larger in the positive direction than the refracting power for the principal display area. This means that, of light rays emitted from the periphery of the image display device, light rays subjected to the above action enter the eyeball at a larger incident angle than that of light rays not subjected to the action. Accordingly, aberrations such as astigmatism, distortion and coma occur at the periphery, and light can also be led to the dark at the boundary where the brightness contrast has heretofore been strong. More specifically, when compared to a clear image corrected for aberrations as far as the periphery without being subjected to the above action, the image projected through the above-described ocular optical system is an image in which the peripheral portion runs outwardly to make the image look as if it were expanded. Moreover, an area where there has heretofore been no image and which has been a dark area becomes satisfactorily bright. Consequently, an image having an effectively enlarged display field angle is obtained. In addition, because the periphery is gradually blurred owing to aberrations, it is possible to create conditions close to those of the human, natural field of view. Accordingly, an image with dynamic presence can be provided even if the normal display field angle is not wide.

In this case also, the ocular optical system may have an optical system including a surface which has both transmitting and reflecting actions and which is tilted with respect to both the image display device and the visual axis so as to project an enlarged image of the image displayed by the image display device.

In this case, if a negative aspherical surface is provided at the periphery of an optical system which has the principal refracting power in the ocular optical system and which has both transmitting and reflecting actions to realize compactness by leading light rays to the eye along a folded optical path, light rays passing through the aspherical surface are diverged. Further, if a power by which the diverged light rays are bent is given to an unused area or space which is inevitably present in the optical system, that is, if the periphery bending optical device is provided in such an area or space, light having an enlarged angle of incidence on the eye is led to the peripheral area of the projected image, and because this light is inferior in image-formation characteristics, an image whose periphery is effectively blurred is produced. Thus, it is possible to provide an image with dynamic presence in which the boundary isolating the image world and the real world from each other is effectively blurred.

The arrangement of the ocular optical system may be as follows: The ocular optical system has a concave mirror disposed to face the image display device and having a focal length f satisfying the condition of 15≦f≦60 (millimeters) so as to project an enlarged image of the image displayed by the image display device. The concave mirror has an aspherical surface in which a positive refracting power for the peripheral area of the image is weaker than a positive refracting power for the principal display area of the image. The ocular optical system further has a semitransparent mirror disposed between the concave mirror and the image display device so as to lead light beams reflected by the concave mirror into the observer's eyeball. Further, the ocular optical system has a periphery bending optical device disposed in an optical path extending between the semitransparent mirror and the observer's eyeball. The periphery bending optical device is arranged such that the refracting power for the peripheral area of the image is larger in the positive direction than the refracting power for the principal display area.

Thus, the ocular optical system having a half-mirror and a concave mirror is provided with an aspherical surface area in which a positive refracting power gradually weakens as the distance from the center increases toward the periphery of the concave mirror, and in some cases, the positive refracting power changes to a negative refracting power. Consequently, light beams emitted from the periphery of the image display device do not converge toward the optical axis of the concave mirror; in some cases, the light beams diverge away from the optical axis. The ocular optical system is capable of providing an image of wide field angle despite its compact structure, but at the same time, a dead space is inevitably present on the exit side of the ocular optical system. Therefore, the periphery bending optical device is provided in the vicinity of the exit side of the optical system to newly give a refracting power to the vicinity of a portion corresponding to the dead space. The aspherical surface, in which the refracting power becomes weaker as the distance from the center of the surface increases toward the periphery thereof, weakens the action by which peripheral light beams converge in comparison to light beams in the principal area. The peripheral light beams subjected to the action of the aspherical surface are led to the observer's eyeball by the positive large refracting power in the vicinity of the dead space. This means that the light beams subjected to the series of actions enter the eyeball at a larger incident angle than that of light beams not affected and forming the most peripheral portion of the normal image with high resolution. In other words, light can be properly led to the dark at the boundary portion where the brightness contrast has heretofore been strong. Consequently, it is possible to make the display field angle seem to have enlarged, and it is also possible to produce an image in which the outside of the boundary portion is gradually blurred by aberrations such as astigmatism, distortion and coma. Thus, an image with dynamic presence can be provided even if the normal display field angle is not wide.

The arrangement of the ocular optical system may be as follows: The ocular optical system has a concave mirror having an action by which the image displayed by the image display device is projected as an enlarged image. The concave mirror has a focal length f satisfying the condition of 15≦f≦60 (millimeters) and is disposed to face the observer's eyeball such that the optical axis of the concave mirror intersects a line normal to the image display device. The concave mirror has an aspherical surface in which a positive refracting power for the peripheral area of the image is weaker than a positive refracting power for the principal display area of the image. The ocular optical system further has a semitransparent mirror disposed between the observer's eyeball and the concave mirror so as to lead light beams emitted from the image display device to the concave mirror and to lead light beams reflected by the concave mirror into the observer's eyeball. Further, the ocular optical system has a periphery bending optical device disposed in an optical path extending between the semitransparent mirror and the observer's eyeball. The periphery bending optical device is arranged such that the refracting power for the peripheral area of the image is larger in the positive direction than the refracting power for the principal display area of the image.

Thus, in the ocular optical system having a half-mirror and a concave mirror, the concave mirror is provided on its peripheral portion with an aspherical surface area arranged such that a positive refracting power gradually weakens as the distance from the center increases toward the periphery of the concave mirror, as in the case of the above-described ocular optical system. Accordingly, the aspherical surface weakens the action by which light beams emitted from the periphery of the image display device converge toward the optical axis; in some cases, the peripheral light beams diverge away from the optical axis. Then, the light beams are led to the observer's eyeball by the refracting power of the periphery bending optical device provided in the vicinity of a portion corresponding to the dead space. Accordingly, light can be properly led to the dark of the boundary portion where the brightness contrast has heretofore been strong. Consequently, it is possible to make the display field angle seem to have enlarged, and it is also possible to produce an image in which the outside of the boundary portion is gradually blurred by aberrations such as astigmatism, distortion and coma. Thus, an image with dynamic presence can be provided even if the normal display field angle is not wide.

The arrangement of the ocular optical system may be as follows: The ocular optical system has a concave mirror disposed to face the image display device and having a focal length f satisfying the condition of $15 \leq f \leq 60$ (millimeters) so as to project an enlarged image of the image displayed by the image display device. The concave mirror has an aspherical surface in which a positive refracting power for the peripheral area of the image is weaker than a positive refracting power for the principal display area of the image. The ocular optical system further has a cemented prism with a semitransparent portion disposed between the concave mirror and the image display device to lead light beams reflected by the concave mirror into the observer's eyeball. Further, the ocular optical system has a periphery bending optical device disposed in an optical path extending between the cemented prism and the observer's eyeball. The periphery bending optical device is arranged such that the refracting power for the peripheral area of the image is larger in the positive direction than the refracting power for the principal display area of the image.

Thus, the ocular prism optical system having a concave mirror and a cemented prism is provided with an aspherical surface area arranged such that the refracting power at the peripheral portion of the concave mirror is weaker than that at the principal portion of the concave mirror. The aspherical surface weakens the action by which light beams emitted from the periphery of the image display device converge toward the optical axis; in some cases, the peripheral light beams diverge away from the optical axis. The ocular optical system is capable of providing an image of wide field angle despite its compact structure, but at the same time, a dead space is inevitably present on the exit side of the ocular optical system. Therefore, the periphery bending optical device is newly provided in the vicinity of a portion of the prism exit surface that corresponds to the dead space, and the light affected by the aspherical surface such that the convergence toward the optical axis is weakened is led to the observer's eyeball by the refracting power of the periphery bending optical device. Accordingly, light can be properly led to the dark at the boundary portion where the brightness contrast has heretofore been strong. Consequently, it is possible to make the display field angle seem to have enlarged, and it is also possible to produce an image in which the outside of the boundary portion is gradually blurred by aberrations such as astigmatism, distortion and coma. Thus, an image with dynamic presence can be provided even if the normal display field angle is not wide.

The arrangement of the ocular optical system may be as follows: The ocular optical system has a concave mirror having a focal length f satisfying the condition of $15 \leq f \leq 60$ (millimeters) and disposed such that the optical axis of the concave mirror intersects a line normal to the image display device so as to project an enlarged image of the image displayed by the image display device. The concave mirror has an aspherical surface in which a positive refracting power for the peripheral area of the image is weaker than a positive refracting power for the principal display area of the image. The ocular optical system further has a cemented prism with a semitransparent portion disposed between the concave mirror and the image display device to lead light beams reflected by the concave mirror into the observer's eyeball. Further, the ocular optical system has a periphery bending optical device disposed in an optical path extending between the cemented prism and the observer's eyeball. The periphery bending optical device is arranged such that the refracting power for the peripheral area of the image is larger in the positive direction than the refracting power for the principal display area of the image.

Thus, in the ocular prism optical system having a concave mirror and a cemented prism, the concave mirror is provided on its peripheral portion with an aspherical surface area arranged such that the refracting power at the peripheral portion of the concave mirror is weaker than that at the principal portion of the concave mirror, as in the case of the above-described ocular optical system. Accordingly, the aspherical surface weakens the action by which light beams emitted from the periphery of the image display device converge toward the optical axis; in some cases, the peripheral light beams diverge away from the optical axis. These light beams are led to the observer's eyeball by the refracting power of the periphery bending optical device provided in the vicinity of a portion of the prism exit surface that corresponds to the dead space. The light beams subjected to these actions enter the eyeball at a larger incident angle than that of light beams not affected and forming the most peripheral portion of the normal image with high resolution. Accordingly, light can be properly led to the dark at the boundary portion where the brightness contrast has heretofore been strong. Consequently, it is possible to make the display field angle seem to have enlarged, and it is also possible to produce an image in which the outside of the boundary portion is gradually blurred by aberrations such as astigmatism, distortion and coma. Thus, an image with dynamic presence can be provided even if the normal display field angle is not wide.

In the foregoing arrangements, the periphery bending optical device may be arranged to have a distribution of refracting power in which the refracting power becomes stronger gently as the distance from the center of the device increases toward the periphery thereof.

The bending action of the periphery bending optical device works in such a way that light rays which would otherwise be incapable of being led to the eye are led thereto by the refracting power thereof. In this regard, if the periphery bending optical device is arranged such that a stronger refracting power acts on a light ray emanating from the eye at a larger exit angle in the backward ray tracing, it is possible to lead to the eye light rays whose convergence toward the optical axis has been weakened by the aspherical surface at the periphery of the periphery bending optical device. The refracting power produced by the peripheral aspherical surface gently changes in the direction for reducing the power as the distance from the center of the surface increases toward the periphery thereof. Therefore, if the positive bending action of the periphery bending optical device is made gradually stronger as the distance from the center of the device increases toward the periphery thereof in conformity to the refracting power, light subjected to the series of actions can be led to the eye at a larger incident angle than that of light entering the eye without being subjected to the actions. Accordingly, it is possible to produce the effect that the projected image appears as if the periphery of the image were elongated and the field angle were enlarged. For example, the periphery bending optical device is arranged to have a refracting power distribution in which a light beam passing through the periphery bending optical device and further passing through the aspherical surface having a weakened refracting power in the backward ray tracing reaches a peripheral portion of the image display device. By doing so, light can be smoothly led to an area extending from the periphery of the image to the outside thereof, and hence it is possible to make the display field angle seem to have enlarged in a natural way without causing the image to become discontinuous. Thus, an image with dynamic presence can be provided even if the normal display field angle is not wide.

In the foregoing arrangements, a region on the image display device which a light beam reaches in the backward ray tracing after being subjected to the bending action of the periphery bending optical device for the peripheral area, the refracting power for which is larger than the refracting power for the principal display area, may overlap a region on the image display device which a light beam reaches in the backward ray tracing after being subjected to the bending action for the principal display area.

The fact that a region on the image display device which a light beam reaches in the backward ray tracing after being subjected to the large refracting power at the periphery of the periphery bending optical device overlaps a region on the image display device which a light beam reaches in the backward ray tracing after being subjected to the refracting power at the principal area, which is not so large as that at the periphery, means that regions where the light beams pass through the principal refracting surface in the optical system overlap each other. By providing an aspherical surface having a weakened refracting power at the periphery of the principal refracting surface, it is possible for light from the observer's eye to reach the image display device. The periphery bending optical device is arranged to have a refracting power distribution in which, in the backward ray tracing, light beams from the observer's eye can reach the image display device without being vignetted in the optical system by passing through the principal refracting surface no matter which regions they may pass through and even if the regions overlap each other. By doing to, light emitted from the image display device and passing through the periphery of the periphery bending optical device can be made incident on the eyeball at an enlarged incident angle. Accordingly, it is possible to make the display field angle seem to have enlarged without increasing the size of the optical system, and an image with dynamic presence can be provided even if the normal display field angle is not wide.

In this case also, the periphery bending optical device may be formed from a Fresnel optical element. Because the periphery bending optical device is disposed on the eyeball side of the principal refracting surface in the optical system, the eye relief, which is determined by the optical system, is reduced by an amount corresponding to the size of the periphery bending optical device. In a head-mounted image display apparatus, the eye relief is desired to be as long as possible; therefore, it is desired to refract light efficiently by using as thin an optical device as possible. A Fresnel optical element, which is a thin optical device, enables an image with dynamic presence to be provided even if the normal display field angle is not wide without shortening the eye relief very much.

The periphery bending optical device may be formed from a diffractive optical element. As stated above, an optical device which is as thin as possible and yet capable of efficiently refracting light is suitable for use as the periphery bending optical device as in the case of the above. A diffractive optical element, which is extremely thin, enables an image with dynamic presence to be provided even if the normal display field angle is not wide without shortening the eye relief very much.

In this case also, the final exit surface, which is closest to the observer's eyeball, may be arranged to serve also as the periphery bending optical device. In the above-described ocular optical system, a dead space is present at the exit surface, as stated above. Disposing an optical element between the exit surface and the eyeball causes the eye relief to be narrowed, as mentioned above. In view of the above two points, if the periphery bending action according to the present invention is given to an optical element in the vicinity of the dead space in the prism optical system, an image with dynamic presence can be provided even if the normal display field angle is not wide without increasing the number of optical elements constituting the optical system and without narrowing the eye relief.

In the present invention, the optical surface of the projection optical system that is closest to the image display device may be arranged to have an edge portion which has a refracting or reflecting action and in which the refracting power for the periphery of the image display area is larger in the positive direction than the refracting power for the principal display area. With this arrangement, it is possible to reduce the parallax of the blurred image at the periphery of the projected image, and the gap between the real world and the world of the projected image becomes smaller. Consequently, the dynamic presence is further enhanced.

In a case where the projection optical system is an ocular optical system, it may include a prism having at least three optical surfaces surrounding a medium that has a refractive index larger than 1. The prism may have a third surface which is closest to the observer's eyeball and transmits light beams from the image display device toward the observer's eyeball; a second surface which is a reflecting surface tilted with respect to the visual axis of the observer's eyeball to reflect light beams from the image display device toward the third surface; and a first surface which is a transmitting surface for leading light beams from the image display device into the prism.

By arranging the ocular optical system to include such a prism, it is possible to construct a compact and lightweight image display apparatus corrected for various aberrations and hence possible to construct an easy-to-view head-mounted image display apparatus which enables the displayed images to be favorably seen without impairing the dynamic presence.

Next, some examples of the image display apparatus according to the present invention will be described.

EXAMPLE 1

FIGS. 1(a) and 1(b) show schematically the arrangement of an image display apparatus according to Example 1 in comparison to a prior art. The image display apparatus comprises a light source 6 for illuminating light; an illumination lens 7 which collimates divergent light from the light source 6; an LCD (Liquid Crystal Display) 1 as an image display device illuminated from behind with illuminating light formed into parallel beams through the illumination lens 7; a projection lens 5' which projects an image displayed by the LCD 1; a stop 8 which limits projected light; and a screen 9 on which the image displayed by the LCD 1 is projected as an enlarged image by the projection lens 5'. FIG. 1(a) shows a conventional image display apparatus having a projection lens 5' which projects the image of the LCD 1 in such a way that the projected image is sharp as far as the periphery thereof. FIG. 1(b) shows a projection optical system according to this example which is capable of projecting the image of high dynamic presence by blurring the periphery of the displayed image. As an image display device, for example, an LCD 1 having a diagonal length of the order of several inches is used. The LCD 1 is disposed at approximately the focal point of the projection lens 5'. When the screen 9 is sufficiently distant, the stop 8 is disposed at approximately the focal point on the other side of the projection lens 5'. When the screen 9 is not sufficiently distant, an image-forming lens is disposed at that position in place of the stop 8. Thus, the image of the LCD 1 is projected onto the screen 9. In this case, if the refracting power at the peripheral portion of the projection lens 5' shown in FIG. 1(*b*) is larger than that at the principal area (central area). The image-formation characteristics of the projected image are deteriorated at the periphery thereof, as shown in FIG. 1(*b*). Accordingly, the projected image is blurred at the periphery thereof. Thus, it is possible to project an image in which the edges of the image, which would otherwise hinder an improvement in dynamic presence, are not clearly displayed.

EXAMPLE 2

Figure 2B:
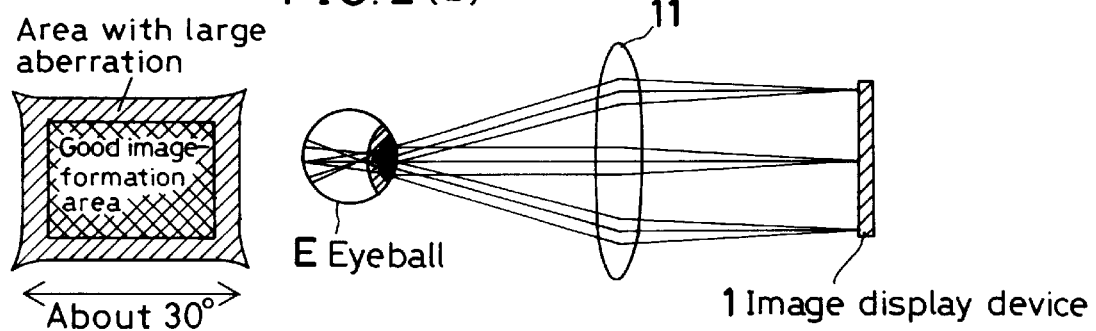
Figure 2C:
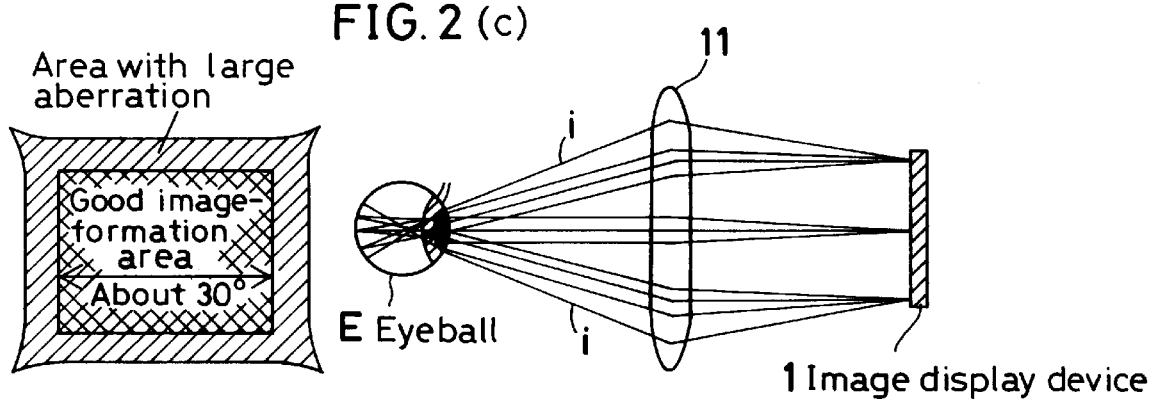

FIG. 2(*a*) shows schematically the arrangement of an image display apparatus according to a prior art which uses a spherical single lens 10 in an ocular optical system (in the right-hand part of the figure) and also shows schematically an image field displayed by the image display apparatus (in the left-hand part of the figure). FIG. 2(*b*) shows an image display apparatus using an ocular optical system 11 according to Example 2. In either case, the optical system is assumed to be one that realizes a horizontal field angle at a level of 30 degrees. An LCD used as an image display device 1 is, for example, a transmissive LCD having a diagonal length of the order of 0.7 inch. The eye relief is about 23 millimeters, and the lens thickness is about 7 millimeters. The distance from the LCD 1 to the pupil of an eyeball E is nearly 55 millimeters. In either of the figures, the optical system is seen in the horizontal direction. Assuming that the ocular optical system 11 according to this example has a pupil diameter of 4 millimeters (in the following Examples 3 to 13 also, the pupil diameter is similarly assumed to be about 4 millimeters), the effective diameter of the lens is about 18.2 millimeters [14.2 millimeters (image display device major diameter)+2×2 millimeters (pupil radius)=18.2 millimeters], and the focal length is about 26.5 millimeters.

The ocular optical system 11 comprising a single lens according to this example is arranged such that the refracting power at the peripheral portion is larger than that at a portion thereof corresponding to the principal display area. In FIG. 2(*b*), the refracting power distribution is realized by an aspherical surface having a steep gradient at the periphery thereof. It is also possible to realize the refracting power distribution by using a lens having a strong curvature at the periphery thereof, or using a lens in which the refractive index of the vitreous material is high at the periphery thereof.

By virtue of the above-described arrangement, light emitted from the periphery of the image display device 1 is bent toward the optical axis by the refracting power of the lens that forms the ocular optical system 11. In the optical system 11 according to this example in which the horizontal half field angle is 15 degrees, for example, if the refracting power at the peripheral portion of the lens, which is higher than the refracting power at the central portion thereof, is intended to begin to act at a point of 13 degrees in the half field angle, the lens should be formed into an aspherical surface configuration in which the refracting power begins to increase at a point f×tan13°=6.12 millimeters from the center of the lens. In this case, the lens 11 is designed so that principal rays pass through the boundary between the central surface portion and the aspherical surface portion of the lens 11 on the assumption that the principal rays have no tilt angle.

Consequently, aberrations such as pincushion distortion, astigmatism and coma occur at the periphery of the image field as shown in the left-hand part of FIG. 2(*b*), which shows the condition of the displayed image field, causing the image-formation characteristics to be deteriorated at the periphery of the image field. In actuality, distortion and other aberrations are produced by the spherical single lens [denoted by reference numeral 10 in FIG. 2(*a*)], causing the display field angle to become larger than the actual one. In the present invention, however, aberrations are intentionally produced; therefore, the displayed image field in the left-hand part of FIG. 2(*b*) is exaggeratedly depicted for the sake of convenience. In this case, the blur of the image begins to become conspicuous at a point of about 13 degrees in the half field angle. Thus, the peripheral area of the displayed image is blurred by aberrations, but the display field angle is slightly enlarged. The image thus obtained is shown in the left-hand part of FIG. 2(*b*). The conditions of the image, in which the periphery of the image is gradually blurred, are close to those of the human visual field, in which as the distance from the center of the visual field increases toward the periphery thereof, the resolution becomes lower, and hence the image is gradually blurred, in comparison to the image [shown in FIG. 2(*a*)] in which the boundary between the image display area and the non-image display area, that is, the peripheral frame of the image, is present with a strong contrast. Accordingly, the projected image according to this example appears natural and gives enhanced dynamic presence.

In the above-described example, the peripheral refracting power is increased with almost no change made in the size of the lens. FIG. 2(*c*) shown an example in which the size of the ocular lens 11 is increased so that an area of the image which is displayed with good resolution has the same size as in the prior art. The peripheral portion of the lens 11 which has a strong refracting power operates in such a way that, of light rays emitted from the periphery of the image display device 1, rays i (shown in the figure), which are not led to the eye in the prior art, are led to the eye. The optical system 11 is arranged such that an aspherical surface begins at a point ±7.1 millimeters from the center of the lens, which corresponds to the most peripheral portion of the image display device 1, with a view to producing the effect of enlarging the field angle without degrading the resolution very much within the horizontal field angle of 30 degrees. Consequently, the principal ray of a light beam emitted from the most peripheral portion of the image display device 1 passes exactly through the boundary of the aspherical surface. Accordingly, blur begins at this field angle, and the image outside this field angle is formed by light rays subjected to the peripheral refracting power. More specifically, the light rays subjected to the peripheral refracting power enter the eyeball E at a larger incident angle than that of the normal light rays of good image-formation characteristics, resulting in an image in which an area blurred by aberrations is present outside the original, normal image. In other words, the projected image produces the effect that the field angle seems to have enlarged, although the periphery of the image is blurred.

EXAMPLE 3

Figure 3:
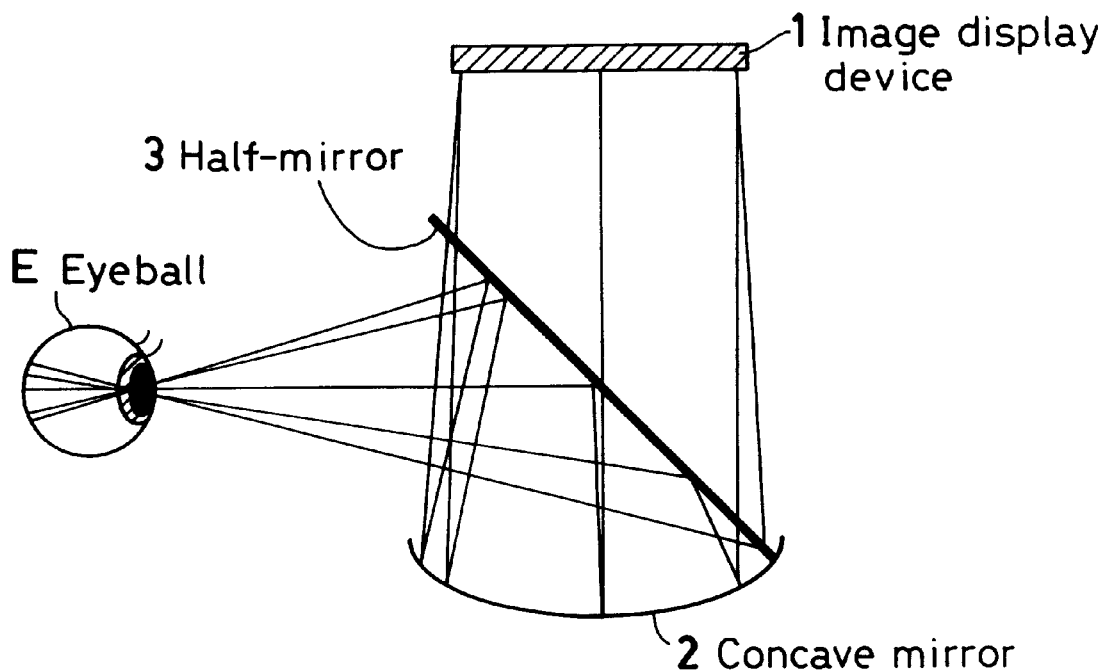
FIG. 3 is a vertical sectional view showing the arrangement of an optical system in an image display apparatus according to Example 3 of the present invention.

FIG. 3 shows the arrangement of an optical system according to Example 3. The optical system uses a half-mirror 3 and a concave mirror 2. FIG. 3 is a vertical sectional view. In this optical system, light from an image display device 1 passes through the half-mirror 3 and impinges on the concave mirror 2. Reflected light from the concave mirror 2 is reflected by the half-mirror 3 and projected into an observer's eyeball E.

As will be clear from FIG. 3, the concave mirror 2 and the half-mirror 3 are disposed such that the center axes thereof intersect each other at approximately 45 degrees. Accordingly, the optical system has an approximately square sectional configuration, including the space, with regard to the vertical relationship. The principal refracting surface in the optical system is the concave mirror 2. By the concave mirror 2, light beams emitted from the image display device 1 are formed into approximately parallel beams.

As shown in FIG. 3, the concave mirror 2 of the optical system has a configuration in which the gradient at the peripheral portion thereof is steeper than that at the central area. In light emitted from the periphery of the image display device 1, light rays reflected by the area of the concave mirror 2 that has a steep gradient are subjected to refracting power (reflective refracting power) produced by the steep configuration. As a result, aberrations such as distortion, astigmatism and coma are introduced into the image. Further, because the refracting power at the peripheral portion is large, those of light beams emitted from the periphery of the image display device 1 which emanate from the image display device 1 at such a large exit angle that they have heretofore been impossible to lead to the eyeball are also led to the eyeball E. Consequently, light can be led to the area where aberrations are introduced, and hence it is possible to produce an image in which the boundary portion is gradually blurred to become darker. Thus, an image with dynamic presence can be provided even if the normal display field angle is not wide.

Figure 4:
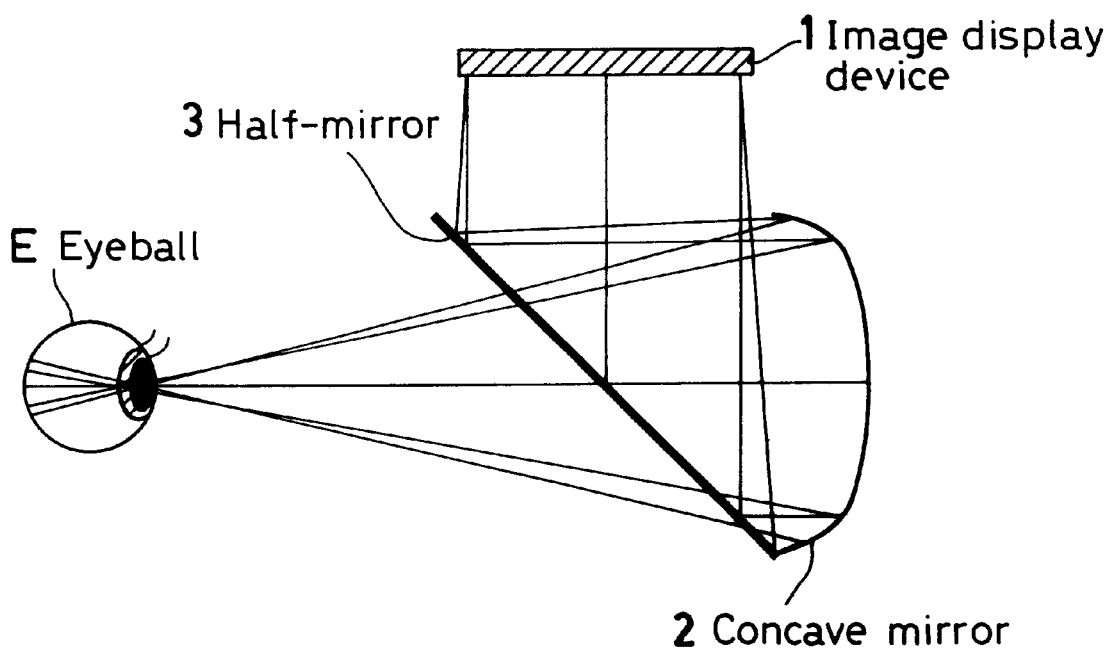
FIG. 4 is a vertical sectional view of a modification of the image display apparatus shown in FIG. 3.

In the optical system according to this example, light beams from the LCD 1 are reflected by the concave mirror 2 after passing through the half-mirror 3, and the reflected rays are reflected by the half-mirror 3 so as to be led to the eyeball E; however, the above discussion also applies to an arrangement in which, as shown in FIG. 4, light beams from the LCD 1 are first reflected by the half-mirror 3 and then pass through it.

It should be noted that the foregoing description, which has been made with regard to the vertical direction, also applies to the horizontal direction.

EXAMPLE 4

Figure 5:
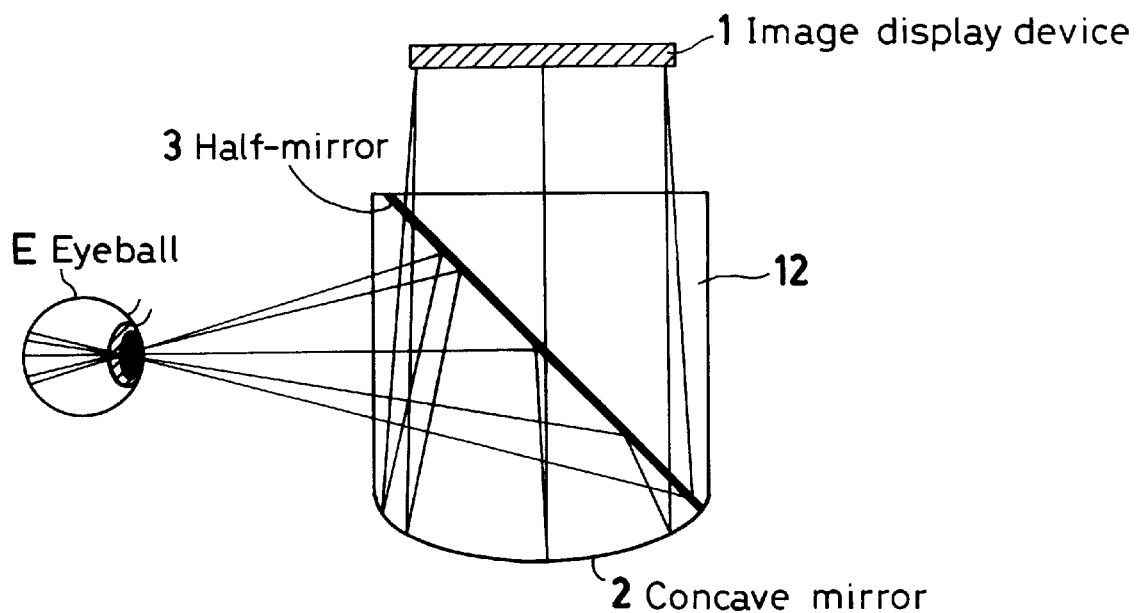
FIG. 5 is a vertical sectional view showing the arrangement of an optical system in an image display apparatus according to Example 4 of the present invention.

FIG. 5 shows the arrangement of an optical system according to Example 4. The optical system uses a concave mirror 2 and a cemented prism 12 having a half-mirror 3 comprising a dielectric multilayer film. An LCD having a diagonal length of the order of 0.7 inch is used as an image display device 1. The horizontal field angle realized by the optical system is about 35 degrees for the non-vignetted area (about 45 degrees for the entire area, including the vignetted area). FIG. 5 is a vertical sectional view.

As will be clear from FIG. 5, the concave mirror 2 and the half-mirror 3 in the optical system are disposed such that the center axes thereof intersect each other at approximately 45 degrees as in the case of the optical system shown in FIG. 3. Accordingly, the optical system has an approximately square sectional configuration with regard to the vertical relationship. As a vitreous material for the rectangular prism 12, a plastic material, which is suitable for mass-production, is used. The eye relief is about 20 millimeters. The optical system is about 20 millimeters square in a direction perpendicular to the figure. The principal refracting surface in the optical system is the concave mirror 2. The radius of curvature of the concave mirror 2 at the bottom of the prism 12 is determined so that light beams emitted from the image display device 1 are formed into approximately parallel beams by the concave mirror 2.

As shown in FIG. 5, the optical system has a configuration in which the gradient at the peripheral portion of the concave mirror 2 at the bottom of the prism 12 is steeper than that at the central area of the concave mirror 2. Light reflected by the area of the concave mirror 2 that has a steep gradient is subjected to refracting power produced by the steep configuration. As a result, aberrations such as distortion, astigmatism and coma are remarkably introduced into the peripheral portion of the projected image and also into the outside of the peripheral portion.

The size of the optical system is roughly determined by the size of the concave mirror 2 at the bottom of the prism 12. When compared to an optical system in which the size of the concave mirror 2 is the same as that in this example, but the peripheral portion of the concave mirror 2 is not steep, the optical system according to this example, in which the peripheral portion of the concave mirror 2 is steep, has its good image-formation area narrowed by the above-described aberrations. However, if the area of inferior image-formation characteristics is included, the optical system according to this example has an enlarged image area. This means that the peripheral portion of the concave mirror 2 has an increased refracting power. Thus, of light beams emitted from the periphery of the image display device 1, those which emanate from the image display device 1 at such a large exit angle that the light beams have heretofore been impossible to lead to the eyeball E can also be led to the eyeball E. Consequently, light is also led to an area outside the image area, which has heretofore been a dark area. Thus, it is possible to produce an image in which the boundary portion is gradually blurred to become darker.

The condition of the blur of the image depends upon the position in the peripheral portion of the concave mirror 2 at which the gradient begins to become steep. As has been stated above, on the assumption that the principal rays have no tilt angle, the concave mirror 2 is arranged such that the gradient begins to become steep at a position of fxtan(u) from the center, where f is the focal length of the concave mirror 2, and u is the half field angle at which blur begins. Consequently, bending starts to act from principal rays emitted from points on the image display device 1 corresponding to the determined field angle. Therefore, blur begins to become conspicuous at the positions of the principal rays. In this case, the half field angle v of the good image-formation area, which is free from aberrations produced by the action of the peripheral steep area, may be expressed by the equation v=arctan[{fxtan(u)−d/2}/f] from FIG. 5. In the equation, d is the diameter of the exit pupil of the optical system. For example, assuming that the half field angle at which blur begins in the vertical direction is 19 degrees on the basis of the above-described numerical values, the half field angle v of the good image-formation area, which is not affected by the peripheral refracting power, is 13.6 degrees.

Thus, an image with dynamic presence can be provided even if the normal display field angle is not wide by virtue of a visual field closer to the natural visual field, in which the peripheral portion is gradually blurred to become darker, than the conventional visual field in which the outside and inside of the frame around the normal image area are displayed with good image-formation characteristics and in distinct contrast to each other, which is different from the conditions of the human visual field.

Figure 6:
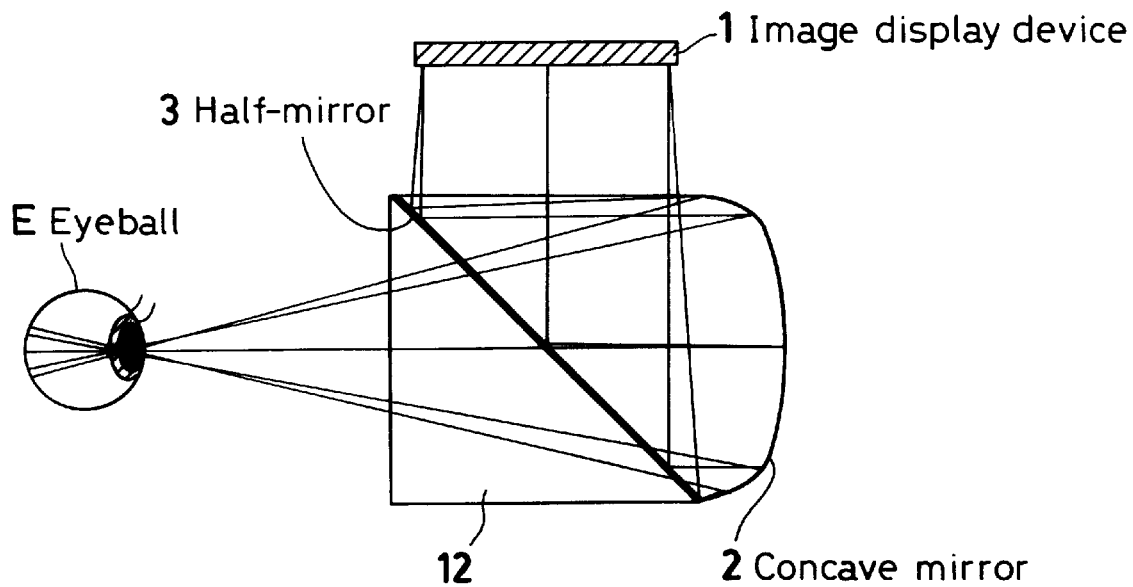
FIG. 6 is a vertical sectional view of a modification of the image display apparatus shown in FIG. 5.

In the optical system according to this example, light beams from the LCD 1 are reflected by the concave mirror 2 at the bottom of the prism 12 after passing through the half-mirror 3 in the prism 12, and the reflected beams are reflected by the half-mirror 3 so as to be led to the eyeball E; however, the above discussion also applies to an arrangement in which, as shown in FIG. 6, light beams from the LCD 1 are first reflected by the half-mirror 3 and then pass through it.

It should be noted that the foregoing description, which has been made with regard to the vertical direction, also applies to the horizontal direction.

EXAMPLE 5

Figure 7:
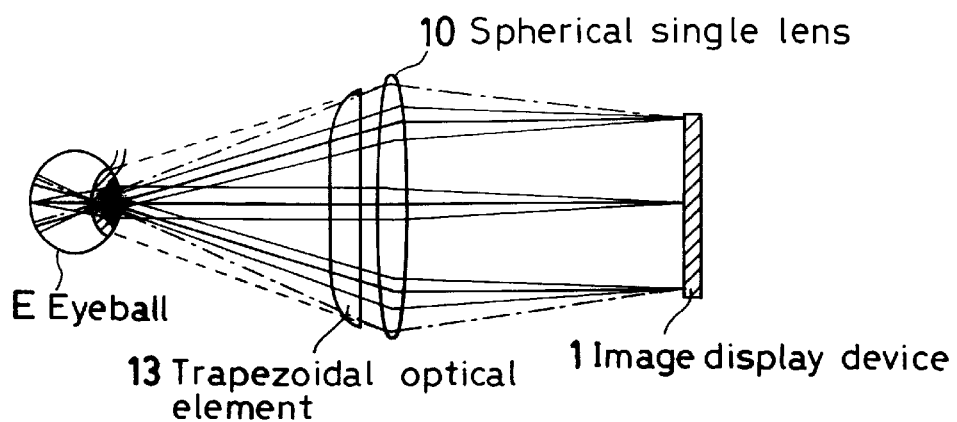
FIG. 7 is a vertical sectional view showing the arrangement of an optical system in an image display apparatus according to Example 5 of the present invention.
Figure 8:
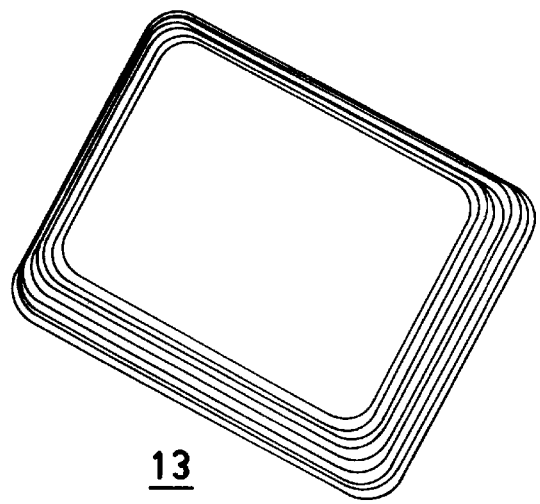
FIG. 8 is a perspective view showing the arrangement of a trapezoidal optical element.

FIG. 7 shows the arrangement of an optical system according to Example 5. The optical system comprises a combination of a spherical single lens 10 and an optical element 13 which has a refracting power at a peripheral portion thereof, or in which the refracting power at the peripheral portion is larger than that at a portion thereof corresponding to the principal display area. The optical element 13 having a larger refracting power at the peripheral portion thereof has a configuration as shown in the perspective view of FIG. 8. Basically, the optical element 13 is given a configuration approximately similar to the configuration of the boundary between an area of the projected image which is to be blurred and a normal area of the image, which needs not be blurred, that is, the configuration of the edge of a good image area, thereby allowing the refracting power to increase at a peripheral portion of the optical element 13 corresponding to the periphery of the image area. The optical element 13 is trapezoidal as seen from a horizontal direction; therefore, it will be hereinafter referred to as "trapezoidal optical element 13".

In the optical system, light beams emitted from the LCD 1 are formed into approximately parallel beams by being subjected to the refracting action of the spherical single lens 10 disposed at a position away from the LCD 1 by a distance approximately equal to the focal length thereof. Of the light beams, those which are emitted from the principal display area of the LCD 1 are led to the eyeball E without being subjected to the refracting action of the trapezoidal optical element 13 disposed in an optical path extending between the spherical single lens 10 and the eyeball E, which is present at a position away from the spherical lens 10 by a distance approximately equal to the focal length of the lens 10, whereas the light beams emitted from the peripheral portion of the LCD 1 are subjected to the refracting action of the spherical lens 10 and then bent toward the optical axis by the refracting action at the periphery of the trapezoidal optical element 13. In other words, aberrations such as distortion, astigmatism and coma are introduced into the peripheral light beams. Thus, light beams which would travel along optical paths shown by the dotted lines in FIG. 7 and not be led to the eyeball E by the spherical single lens 10 alone can be led to the eyeball E as shown by the dashed-and-dotted lines in FIG. 7.

The projected image is in the conditions that the image-formation characteristics are gradually deteriorated as the distance from the center of the image increases toward the peripheral portion thereof. However, the conditions of image are close to those of the human visual field, in which the resolution degrades and the image is gradually blurred as the distance from the center of the visual field increases toward the periphery thereof. Therefore, the projected image appears natural. Consequently, the dynamic presence is enhanced.

By designing the trapezoidal optical element 13 so that light rays subjected to the refracting power of the trapezoidal optical element 13 enter the eyeball E at a larger incident angle than that of light rays not subjected to the refracting power, it is possible to produce an image in which an area blurred by aberrations such as distortion, astigmatism and coma is present outside the image of good image-formation characteristics. In other words, the blurred area produces the effect that the field angle seems to have enlarged.

EXAMPLE 6

Figure 9:
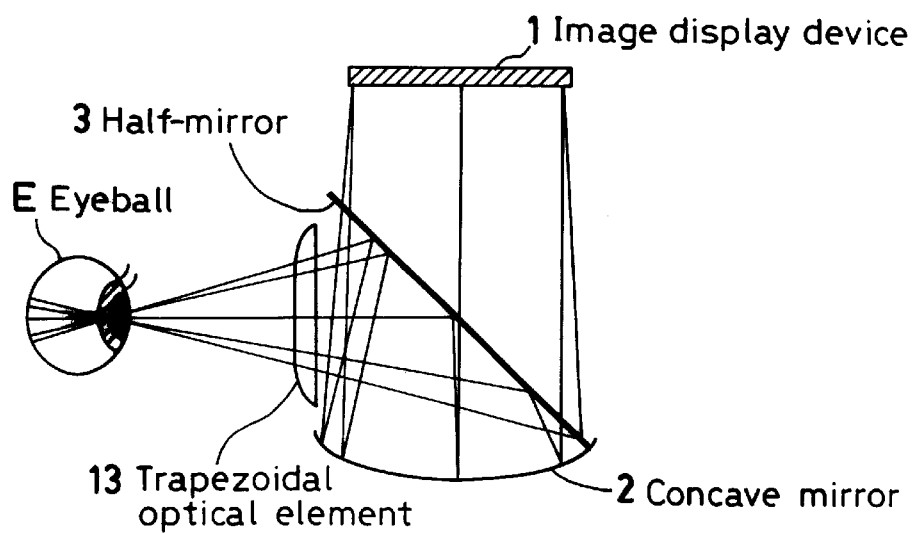
FIG. 9 is a vertical sectional view showing the arrangement of an optical system in an image display apparatus according to Example 6 of the present invention.

FIG. 9 is a vertical sectional view of an optical system according to Example 6. The optical system has a half-mirror 3 and a concave mirror 2, which are disposed such that the center axes thereof intersect each other at an angle of 45 degrees. In addition, a trapezoidal optical element 13 as used in Example 5 is disposed in an optical path extending between the half-mirror 3 and an observer's eyeball E.

Figure 10:
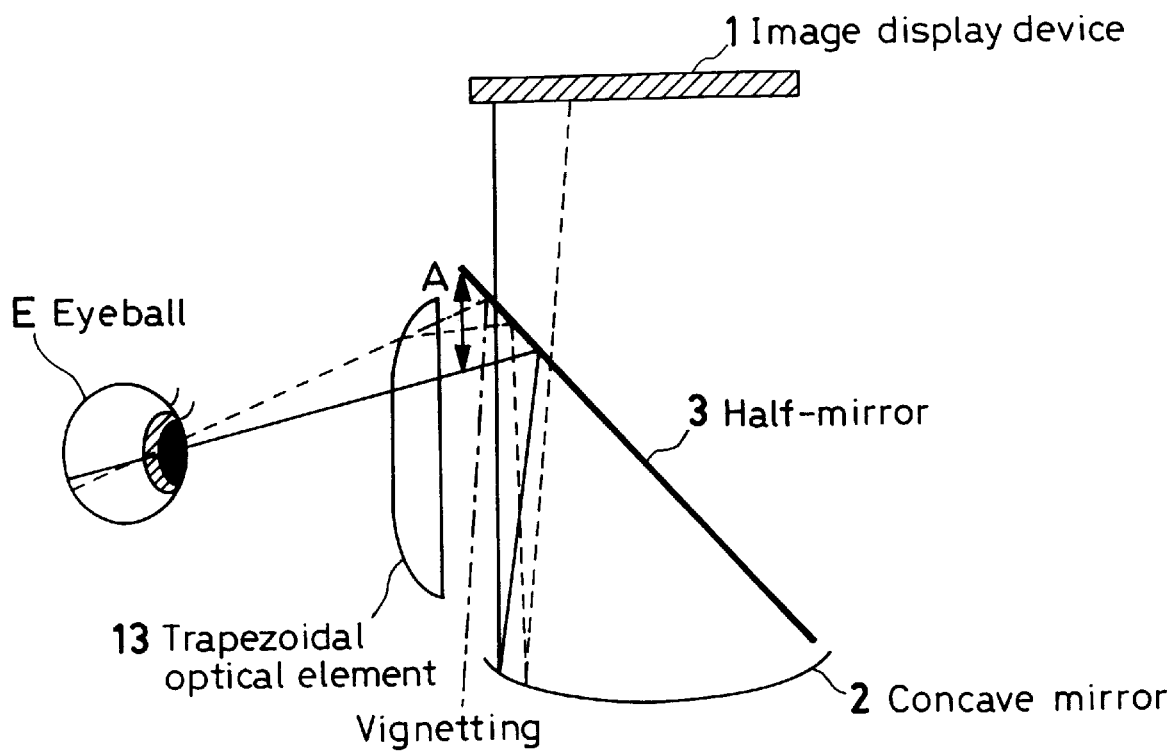
FIG. 10 is a diagram illustrating the action of a trapezoidal optical element in Example 6.
Figure 11:
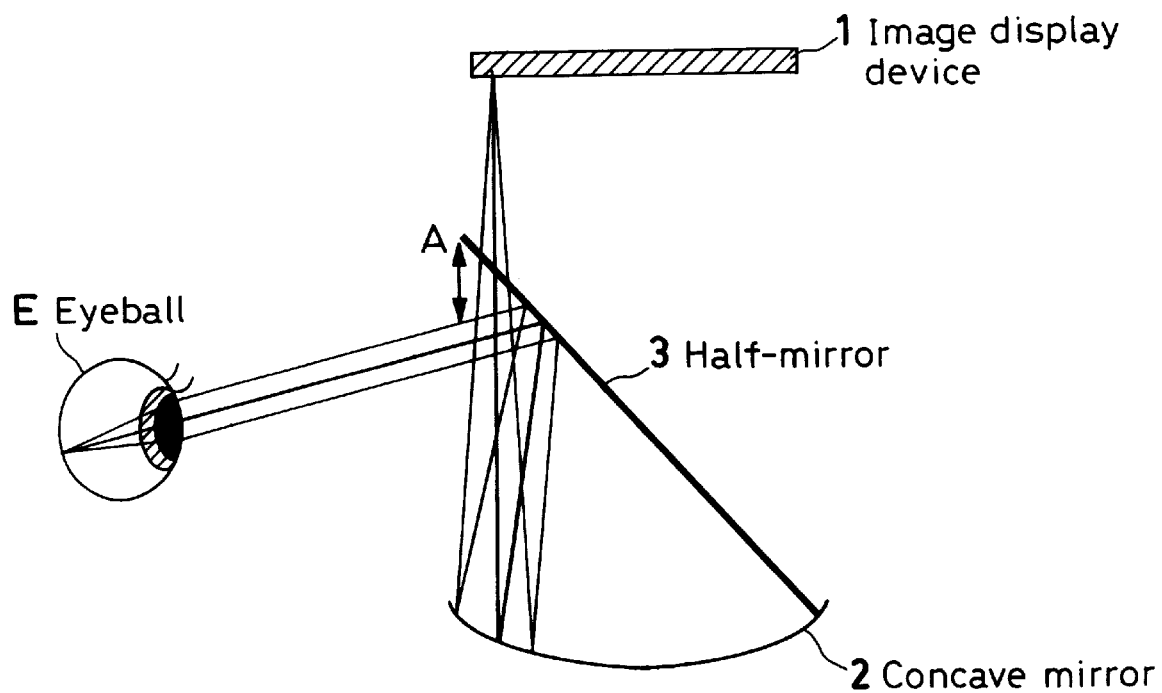
FIG. 11 is a diagram illustrating another example of a method of determining the diameter of a concave mirror in Example 6.

In the optical system having the half-mirror 3 and the concave mirror 2, a dead space is inevitably present on the exit side thereof, as has been stated above in regard to the problems associated with the prior art. According to the backward ray tracing from the observer's eyeball E, if the trapezoidal optical element 13 is not provided, as shown in FIG. 10, all light beams passing through the dead space in an area A shown in the figure are vignetted by the concave mirror 2, as shown by the dashed-and-dotted line, and do not reach the LCD 1. The reason for this is as follows: As shown in FIG. 10, the concave mirror 2, which determines the size of the optical system, has such a diameter that the concave mirror 2 leads light beams within an area extending from the center of the concave mirror 2 to the principal rays of light beams emitted from the most peripheral portion of the LCD 1, but the remaining light rays are vignetted at the concave mirror 2. Alternatively, as shown in FIG. 11, the concave mirror 2 has such a diameter that subordinate light rays needed to form a predetermined pupil are led to the eyeball E, but the remaining light rays are vignetted. In other words, the concave mirror 2 functions as an aperture stop of the optical system. The optical system according to this example is designed on the assumption that it is used in an apparatus mounted on the observer's head. Therefore, with a view to minimizing the size of the optical system, it is appropriate to set the above-described size for the concave mirror 2, which determines the size of the optical system.

In the optical system according to this example, the trapezoidal optical element 13 as a periphery bending optical device is provided in an optical path extending between the observer's eyeball E and the half-mirror 3 in the vicinity of the exit side of a portion corresponding to the above-described dead space, which is inevitably produced owing to the structure of the optical system.

In the optical system, a parallel beam of light having a sectional area substantially equal to that of the pupil of the observer's eyeball E in such conditions that an approximately central portion of the image is seen from the observer's eyeball E passes through the trapezoidal optical element 13 without being affected thereby and is reflected by the half-mirror 3 and subjected to the reflective refracting action of the concave mirror 2 to converge on the LCD 1. On the other hand, a parallel beam of light emanating from the observer's eyeball E in such conditions that the observer is looking at the periphery of the image is affected by the trapezoidal optical element 13. If the trapezoidal optical element 13 is not present, the light beam is reflected by the half-mirror 3 to travel outside the effective diameter of the concave mirror 2; therefore, it does not reach the LCD 1 (see the dashed-and-dotted line in FIG. 10). However, because the trapezoidal optical element 13 is present, the light beam is bent toward the optical axis and then reflected by the half-mirror 3 to reach a point within the effective diameter of the concave mirror 2. Then, the light beam is reflected by the concave mirror 2 to reach the LCD 1 (see the dotted line in FIG. 10). The following image peripheral effect is obtained by light beams which cannot reach the LCD 1 unless the trapezoidal optical element 13 is present.

The light beams enter the eyeball E through the dead space. Therefore, the light beams are incident on the eyeball E at a larger incident angle than that of a light beam entering the eyeball E at the largest incident angle without being vignetted when the trapezoidal optical element 13 is not present. In other words, the light beams enlarge the display field angle. As shown in FIG. 10, the light beams are not those which are emitted from the most peripheral portion of the LCD 1 but those from a portion of the LCD 1 which is closer to the center than the most peripheral portion thereof. Because the light beams subjected to the bending action of the trapezoidal optical element 13 are aberrated, the projected image is in the conditions that the image-formation characteristics are deteriorated as the distance form the center of the image increases toward the periphery thereof. In the projected image, a portion corresponding to the most peripheral portion of the image in a case where the trapezoidal optical element 13 is not present is formed by light from the most peripheral portion of the LCD 1, and the image outside the above-described portion is formed by light rays from regions on the LCD 1 which lie successively closer to the center of the LCD 1 from the most peripheral portion thereof.

Thus, light beams which have heretofore been impossible to lead to the eyeball E can be led thereto, and it is also possible to lead light to the dark at the boundary portion where the brightness contrast has heretofore been strong. Consequently, it is possible to make the display field angle seem to have enlarged, and it is also possible to produce an image in which the boundary portion is gradually blurred to become darker. Thus, an image with dynamic presence can be provided even if the normal display field angle is not wide by effectively using the dead space in the optical system.

In the optical system according to this example, light beams from the LCD 1 are reflected by the concave mirror 2 after passing through the half-mirror 3, and the reflected light beams are reflected by the half-mirror 3 so as to be led to the eyeball E; however, the above discussion also applies to an arrangement in which, as shown in FIG. 4, light beams from the LCD 1 are first reflected by the half-mirror 3 and then pass through it.

It should be noted that the foregoing description, which has been made with regard to the vertical direction, also applies to the horizontal direction.

EXAMPLE 7

Figure 12:
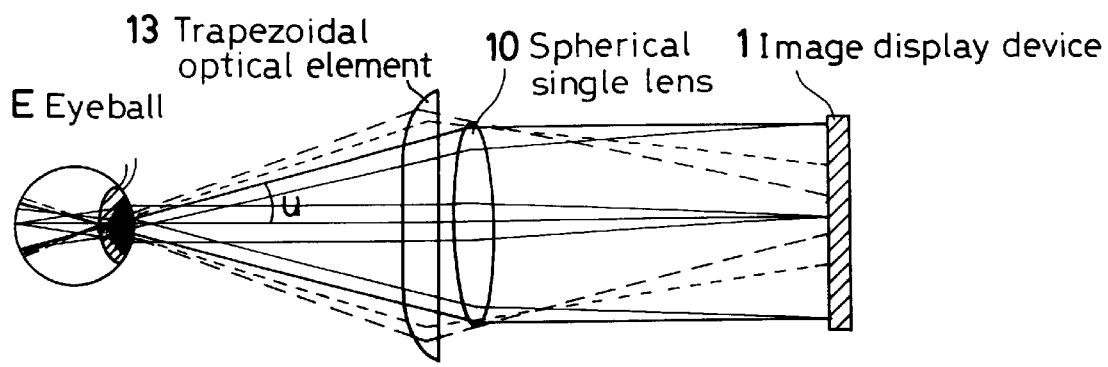
FIG. 12 is a vertical sectional view showing the arrangement of an optical system in an image display apparatus according to Example 7 of the present invention.

FIG. 12 shows the arrangement of an optical system according to Example 7. In the optical system, a spherical single lends 10 is disposed at a position away from an LCD 1 by a distance approximately equal to the focal length of the lens 10, and an observer's eyeball E is placed at a position away from the spherical single lens 10 by a distance approximately equal to the focal length of the lens 10. In an optical path extending between the spherical single lens 10 and the observer's eyeball E, a trapezoidal optical element 13 as used in Examples 5 and 6 is disposed on the eye side of the lens 10 in the vicinity of it. In the optical system, the numerical aperture is limited by the effective diameter of the single lens 10. The single lens 10 has an effective diameter so determined that the principal ray of a light beam emitted from the most peripheral portion of the LCD 1 passes through the edge of the lens 10. The trapezoidal optical element 13 is an optical element which has an aspherical surface on the periphery thereof and which has a refracting power at the peripheral area.

The exit angle at which a light ray reaching the most peripheral portion of the LCD 1 emanates from the observer's eyeball E in the backward ray tracing is equivalent to the half field angle u of the displayed image, and light rays whose exit angles are in the vicinity of the angle u or larger than it are subjected to the bending action of the trapezoidal optical element 13. As shown in FIG. 12, the bending action of the trapezoidal optical element 13 takes place in such a way that, in the backward ray tracing from the eyeball E, light rays (shown by the dotted lines in the figure) passing through the peripheral refracting portion of the trapezoidal optical element 13 reach the edge of the single lens 10.

The light rays subjected to the bending action are refracted through the edge portion of the single lens 10 to reach a portion of the LCD 1 which is inside the most peripheral portion thereof. As will be understood from FIG. 12, a light ray entering the eyeball E at a larger incident angle is one that is emitted from a point on the LCD 1 which is more inward of the periphery thereof, that is, closer to the center of the LCD 1. This means that light rays passing through the peripheral portion of the trapezoidal optical element 13 in the backward ray tracing enter the eyeball E at a larger incident angle than that of a light beam emitted from the most peripheral portion of the LCD 1. Consequently, the displayed image becomes as follows:

The displayed image forms a picture in which an image formed by light rays having image-formation characteristics deteriorated by the bending action of the trapezoidal optical element 13 is present outside the normal image formed by light rays not subjected to the bending action of the trapezoidal optical element 13 and hence having good image-formation characteristics, and the image outside the normal image is formed in such a way that, as the distance form the inner edge of the outside image increases outwardly, light rays emitted from regions on the image display device 1 which are successively closer to the center thereof form the outside image. Because the bending action of the trapezoidal optical element 13 takes place in such a way that light rays passing through the trapezoidal optical element 13 in the backward ray tracing reach the edge of the single lens 10, exit points on the LCD 1 from which light beams forming the image displayed outside the normal image emanate can be prevented from lying excessively close to the center of the LCD 1.

Strictly speaking, the peripheral portion of the normal image is gradually blurred as the distance from the center of the image field increases toward the periphery thereof by aberrations such as astigmatism, distortion and coma. The way in which the image is blurred is determined by the proportion of light beams passing through the trapezoidal optical element 13 to all the light beams emitted from the LCD 1, as shown in FIG. 12. The condition of blur of the image is determined by the position on the LCD 1 of light beams from which the refracting power at the periphery of the trapezoidal optical element 13 starts to act.

Figure 13:
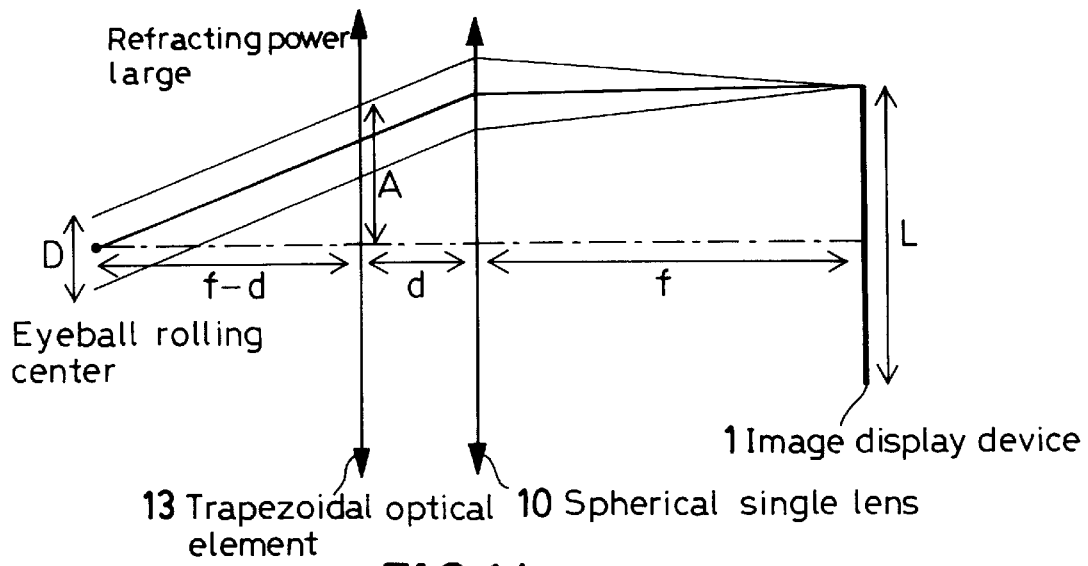
FIG. 13 is a diagram illustrating the action of the image display apparatus shown in Example 7.

Let us assume that the principal rays have substantially no tilt angle, and that L is the size of the display device 1, f is the focal length of the spherical single lens 10, D is the pupil diameter, and d is the lens separation between the spherical lens 10 and the trapezoidal optical element 13. On this assumption, when it is desired to display the image with good image-formation characteristics as far as the most peripheral portion of the LCD 1, the desired result can be obtained by arranging the trapezoidal optical element 13 such that the refracting power is increased from a peripheral portion thereof which is away from the lens center by a distance A, as shown schematically in FIG. 13. The distance A may be expressed by A=(Lf−Ld+Df)/2f from the geometric relationship in the figure.

With this arrangement, a light beam having a diameter corresponding to the pupil diameter is prevented from being subjected to the refracting power at the periphery of the trapezoidal optical element 13, and the peripheral refracting power contributes to taking of light rays outside the light rays corresponding to the pupil diameter, thereby producing the effect of enlarging the field angle.

Figure 14:
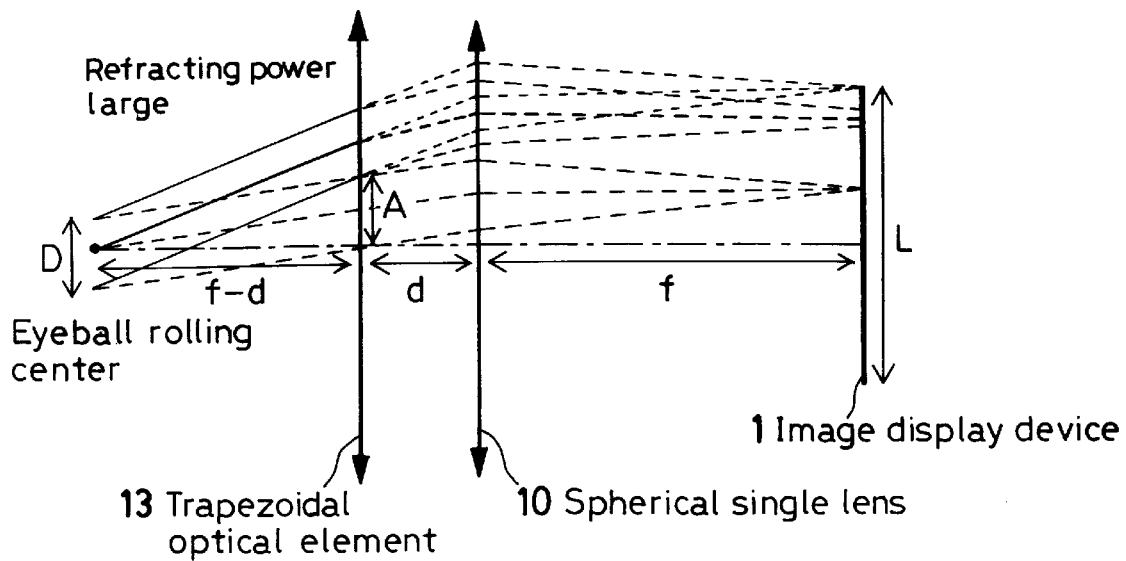
FIG. 14 is another diagram illustrating the action of the image display apparatus shown in Example 7.

To realize a condition in which the refracting power of the trapezoidal optical element 13 begins to act at a point fairly inward of the most peripheral portion of the LCD 1. e.g. the image is 100% blurred at the most peripheral portion of the LCD 1, the distance A is expressed by A=(Lf−Ld−Df)/2f from the geometric relationship in the figure. In this case, the good image-formation range is defined by the field angle shown by the dotted lines in FIG. 14. It will be clear from FIG. 14 that the field angle is $\tan^{-1}\{(A-D/2)/(f-d)\}$. In this case, the blur of the image does not begin at the most peripheral portion thereof, but begins at a position closer to the center, and the degree of blur gradually increases. Accordingly, the peripheral image can be blurred smoothly.

EXAMPLE 8

FIG. 15 is a vertical sectional view of an optical system according to Example 8. The optical system comprises a prism optical system including a cemented prism 12 with a dielectric multilayer film 3 having a half-mirror action and a concave mirror 2. The dead space on a prism exit surface 4 is formed into a Fresnel lens 14 having a function similar to that of the trapezoidal optical element 13 used in Examples 5, 6 and 7.

The concave mirror 2 at the bottom of the prism 12, which serves as an aperture stop of the optical system, has an effective diameter determined so that the principal rays of light beams emitted from the most peripheral portion of the LCD 1 just reach the edge of the concave mirror 2. The principal rays are those in the backward ray tracing. The principal rays reach the LCD 1 with a slight amount of tilt thereto owing to aberrations.

Thus, the dead space, which is inevitably present on the exit surface 4 in the prism optical system, is formed into a Fresnel lens so as to have the action of the trapezoidal optical element 13 in the foregoing Examples.

The exit angle u at which a light ray reaching the most peripheral portion of the LCD 1 in the backward ray tracing emanates from the observer's eyeball E is equivalent to the half field angle of the displayed image, and light rays whose exit angles are in the vicinity of the angle u or larger than it are subjected to the refracting action of the Fresnel lens 14. The Fresnel lens 14 has a distribution of refracting power. As shown in FIG. 15, the Fresnel lens 14 is designed so that, in the backward ray tracing from the eyeball E, all the principal rays passing through the Fresnel lens 14 reach the edge of the concave mirror 2.

The displayed image thus obtained forms a picture in which an image formed by light rays having image-formation characteristics deteriorated by the refracting action of the Fresnel lens 14 is present outside the normal image formed by light rays not subjected to the refracting action of the Fresnel lens 14 and hence having good image-formation characteristics, and the image outside the normal image is formed in such a way that, as the distance from the inner edge of the outside image increases outwardly, light rays emitted from regions on the LCD 1 which are successively closer to the center thereof form the outside image.

As will be clear from the above, because the dead space in the conventional prism optical system is given a refracting power in the form of a thin Fresnel lens 14, light can be led to a dark area outside the conventional normal image that presents a strong brightness contrast with the normal image and, consequently, it is possible to make the display field angle seem to have enlarged without increasing the size of the optical system. Moreover, the image outside the normal image is a deteriorated image which is contiguous naturally with the periphery of the normal image. Accordingly, an image with dynamic presence can be provided even if the normal display field angle is not wide.

Although in this example the peripheral refracting power is realized in the form of the Fresnel lens 14, it may be realized by a diffractive optical element, which is similarly thin and capable of refracting light by a diffractive phenomenon.

Figure 16:
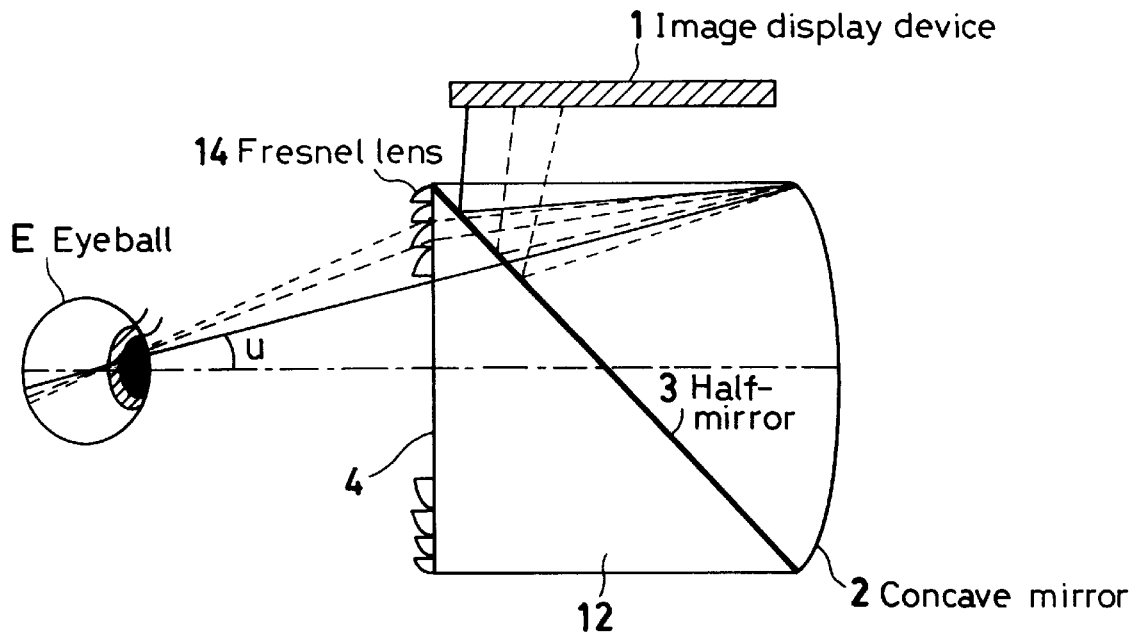
FIG. 16 is a vertical sectional view of a modification of the image display apparatus shown in FIG. 15.

In the optical system according to this example, light beams from the LCD 1 are reflected by the concave mirror 2 after passing through the half-mirror 3, and the reflected beams are reflected by the half-mirror 3 so as to be led to the eyeball E; however, the above discussion also applies to an arrangement in which, as shown in FIG. 16, light beams from the LCD 1 are first reflected by the half-mirror 3 and then pass through it.

It should be noted that the foregoing description, which has been made with regard to the vertical direction, also applies to the horizontal direction.

EXAMPLE 9

FIG. 17 is a fragmentary vertical sectional view of an optical system according to Example 9. The optical system basically conforms to the arrangement of the optical system according to Example 8. In this example, the optical system will be described specifically with regard to the Fresnel surface area in the vicinity of the dead space in the prism optical system. The range of light beams on which the Fresnel lens 14 acts depends on the area in which the Fresnel lens 14 is present. The displayed image varies according to where the Fresnel lens 14 is present.

As shown in FIG. 17, light rays that are at a large angle to the eyeball E are subjected to the action of the Fresnel lens 14, and peripheral light rays reach the LCD 1 at an angle of some degrees to it owing to aberrations. In the figure, the light ray c is a principal ray emitted from the most peripheral portion of the LCD 1 and entering the eyeball E at the largest angle among the light rays which are not subjected to the action of the Fresnel lens 14. The effective diameter of the concave mirror 2 is determined so that the light ray c passes through the edge of the Fresnel lens 14 in the backward ray tracing and is reflected by the half-mirror 3 to reach exactly the edge of the concave mirror 2.

If the Fresnel lens 14 or another light-refracting device is not present, light rays emanating from the eyeball E at an exit angle larger than that of the light ray c in the backward ray tracing are all reflected by the half-mirror 3 so as to exit from the prism 12 through the exit surface 4; therefore, none of these light rays reach the concave mirror 2. In other words, none of the light rays reach the LCD 1. Accordingly, there is no light ray that is emitted from the LCD 1 and enters the eyeball E at an angle larger than that of the light ray c, and the area of the Fresnel lens 14 in FIG. 17 is exactly a dead space.

If the Fresnel lens 14 or another light-refracting device is present, light rays emanating from the eyeball E toward the exit surface 4 at a larger exit angle (>C) than that of the light ray c are also subjected to the refracting power of the Fresnel lens 14 and hence capable of reaching the concave mirror 2 after reflecting at the half-mirror 3.

In this example, the Fresnel lens 14 is positioned so that the principal rays emitted from the most peripheral portion of the LCD 1 pass through just the inner edge of the Fresnel lens 14. Light beams emitted from the LCD 1 reach the eyeball E in the form of approximately parallel beams having a certain diameter. When a light beam emanates from the eyeball E at a certain exit angle in the backward ray tracing, because the light beam has the above-described diameter, some rays of the light beam are subjected to the action of the Fresnel lens 14 by passing through it, but the other rays do not pass through the Fresnel lens 14 and are not subjected to the action thereof despite the same exit angle. The proportion of the quantity of light subjected to the action of the Fresnel lens 14 to the quantity of light not subjected to the action thereof varies according to the exit angle from the eyeball E.

As will be clear from FIG. 17, in the case of the light beam that exits from the eyeball E at the angle C, the light ray c, which is the principal ray, passes through just the inner edge of the Fresnel lens 14; therefore, 50% of the light beam does not pass through the Fresnel lens 14 (see the non-hatched area of the light beam passing through the pupil of the eyeball E in the figure), and the remaining 50% of the light beam passes through the Fresnel lens 14 (see the hatched area of the light beam passing through the pupil of the eyeball E). This means that 50% of the light beam reaches the edge portion of the LCD 1, and the remaining 50% of the light beam is subjected to the refracting power and reaches a portion of the LCD 1 which is closer to the center than the edge thereof. In this case, the position on the LCD 1 which the half of the light beam reaches depends on the refracting power of the Fresnel lens 14.

Figure 18:
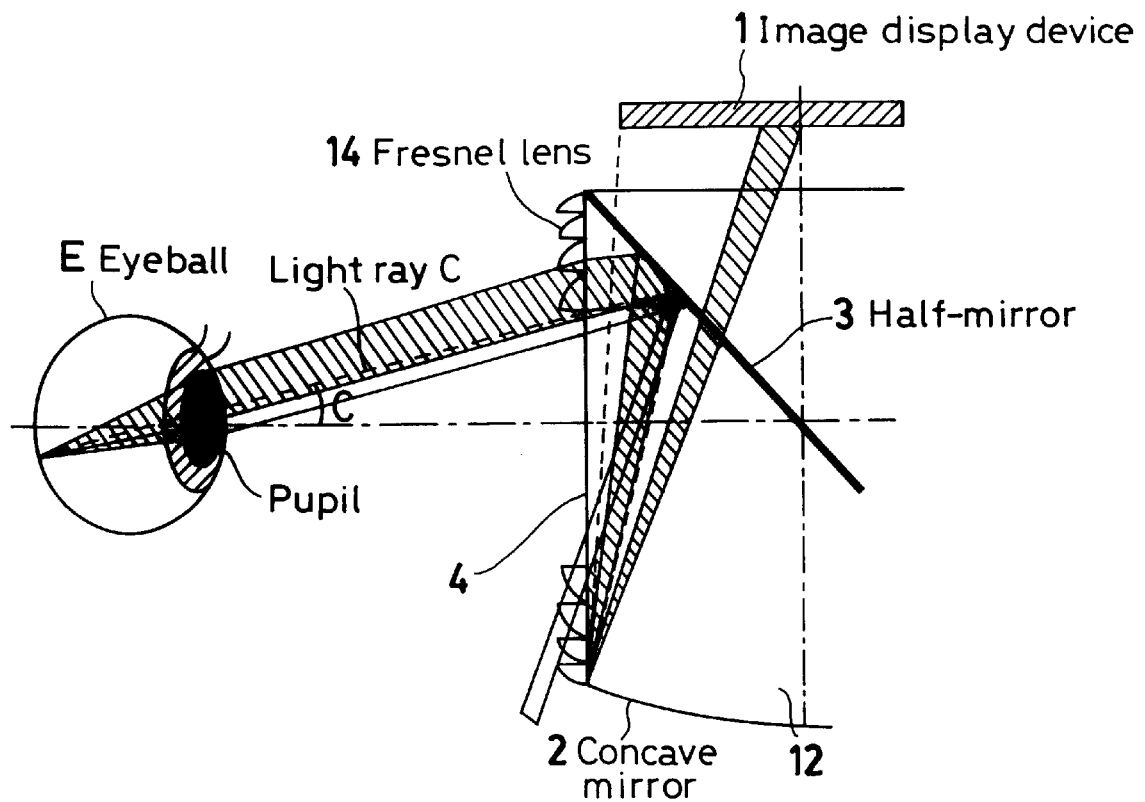
FIG. 18 is a diagram illustrating the action of a Fresnel lens in the image display apparatus according to Example 9.
Figure 19:
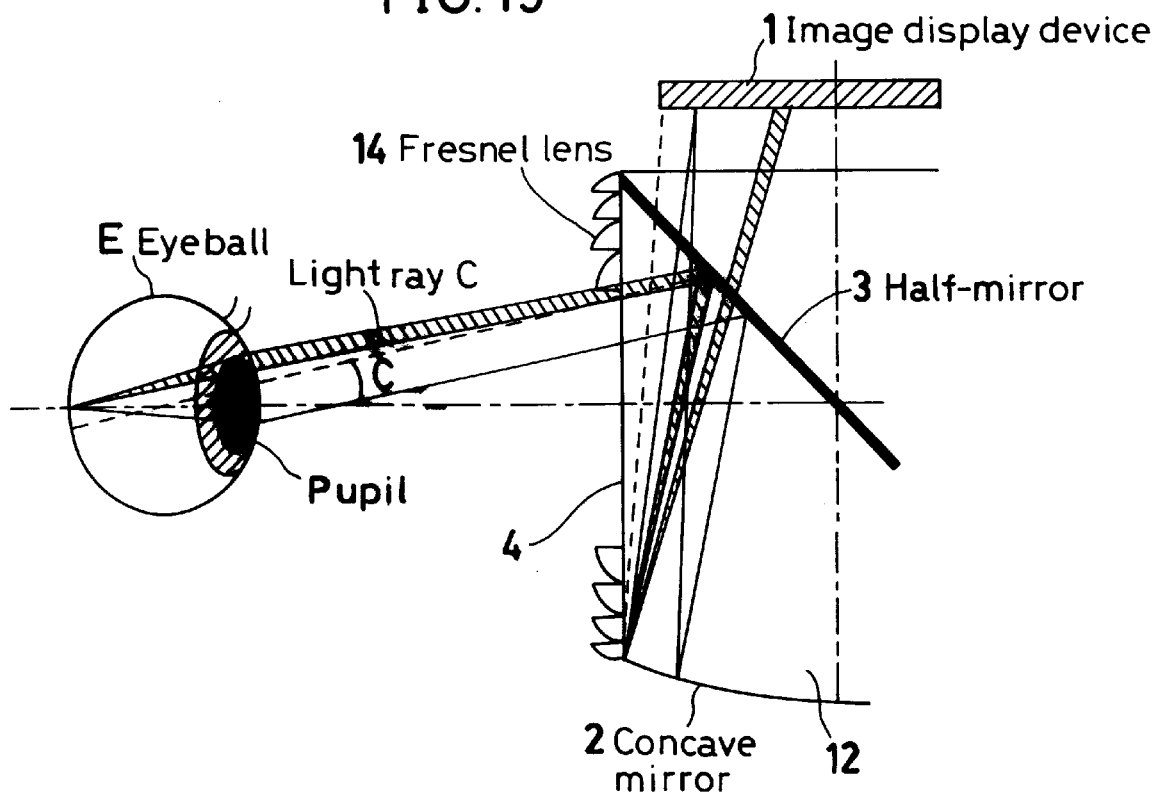
FIG. 19 is another diagram illustrating the action of a Fresnel lens in the image display apparatus according to Example 9.

As shown in FIG. 18, in the case of a light beam (shown by the dotted line) that emanates from the eyeball E at a slightly larger angle than the exit angle C of the light ray C, the proportion of the quantity of light subjected to the action of the Fresnel lens 14, which is shown by the hatched area, is larger than in the case of the light beam exiting at the angle C. Conversely, in the case of a light beam emanating from the eyeball E at a slightly smaller angle than the exit angle C as shown in FIG. 19, the proportion of the quantity of light subjected to the action of the Fresnel lens 14, which is shown by the hatched area, is smaller than in the case of the light beam exiting at the angle C.

As has been stated above, light rays passing through the Fresnel lens 14 in the backward ray tracing reach a portion of the LCD 1 which is closer to the center thereof, and the position of the LCD 1 which the light rays reach depends on the refracting power of the Fresnel lens 14 having a refracting power distribution. The refracting power distribution of the Fresnel lens 14 is preferably set such that light rays passing through the Fresnel lens 14 reach the edge of the concave mirror 2 in the backward ray tracing, with a view to forming a natural and smooth image, as described above. In this case, light rays emanating from the eyeball E at a larger exit angle reach portions of the LCD 1 which are closer to the center thereof. Moreover, because the refracting power gradually increases toward the upper side (outer side) of the Fresnel lens 14, light rays emanating from the eyeball E at a larger exit angle reach portions of the LCD 1 which are closer to the center thereof.

Figure 20:
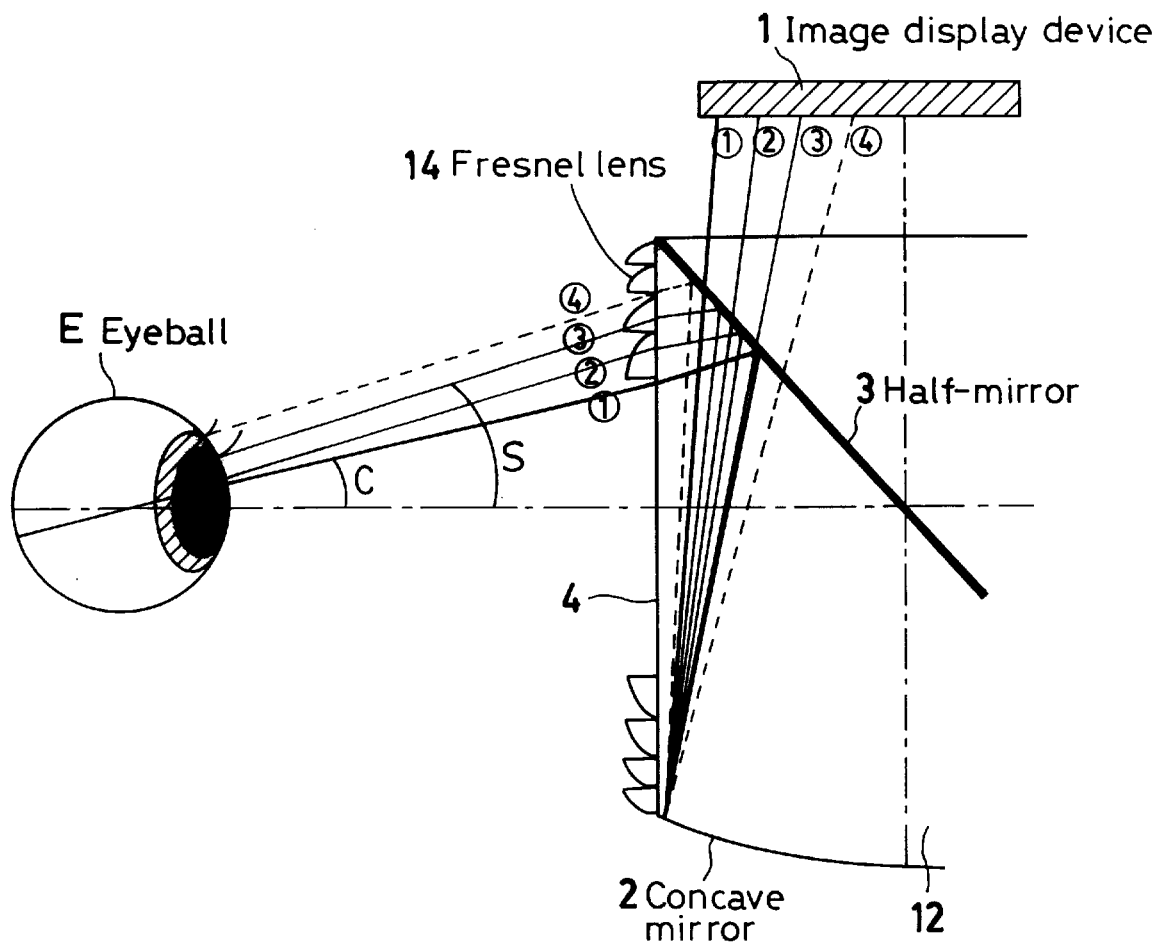
FIG. 20 is a diagram showing the path of light rays in the image display apparatus according to Example 9.
Figure 21:
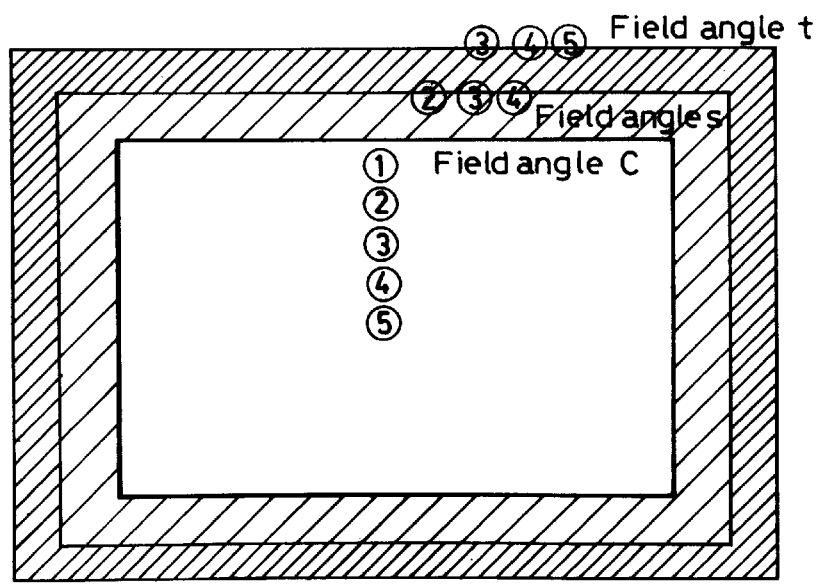
FIG. 21 is a diagram showing the image display area of an LCD in correspondence to FIG. 20.
Figure 22:
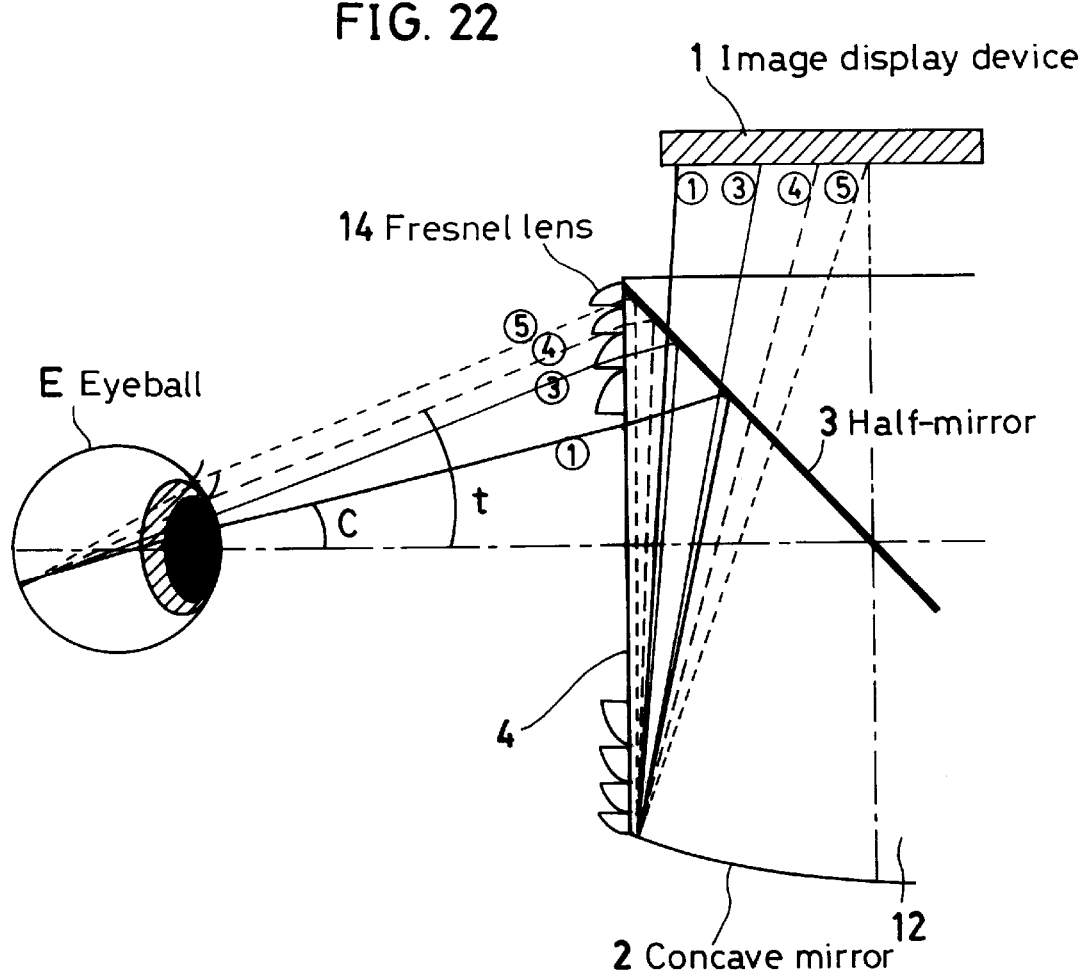
FIG. 22 is another diagram showing the path of light rays in the image display apparatus according to Example 9.

FIG. 21 shows the image display area of the LCD 1, together with the periphery thereof. As shown in the figure, the image display area is divided into five regions ①, ②, ③, ④ and ⑤ from the edge thereof. In this case, a light beam that is emitted from the most peripheral portion of the LCD 1 is denoted by ① in FIG. 20. When the projected image is viewed, the incident angle C at which the light ray ① enters the eyeball E corresponds to the field angle C of the image display area shown in FIG. 21. The image outside the field angle C is gradually blurred by the effect of the Fresnel lens 14. In the case of a light beam with a certain diameter which enters the eyeball E at a slightly larger incident angle s than the incident angle C (in FIG. 20, all the light rays ②, ② and ④ have the same angle s of incidence on the eyeball E), the arrival position on the LCD 1 differs as shown in FIG. 20 according to the passing position on the Fresnel lens 14. The proportion of the quantity of light from each region of the LCD 1 depends on the refracting power of the Fresnel lens 14 and the exit angle; as the exit angle becomes larger, the quantity of light from regions closer to the center of the LCD 1 increases. In the case of a still larger incident angle t as shown in FIG. 22, light from the regions ③, ④ and ⑤ passes through the Fresnel lens 14.

More specifically, at the angle C of the light ray c, only light rays from the most peripheral region ① of the LCD 1 pass through the Fresnel lens 14 to reach the eyeball E. At an angle larger than the angle C, the image outside the normal image is formed by light rays from regions closer to the center of the LCD 1 as the distance from the inner edge of the outside image increases outwardly. At an angle smaller than the angle C of the light ray c also, the image outside the normal image is similarly formed by light rays from various regions of the LCD 1. The proportion of the quantity of light from each region of the LCD 1 also depends on the exit angle and the refracting power of the Fresnel lens 14; as the exit angle becomes smaller, the quantity of light from regions closer to the outer edge of the LCD 1 increases.

Light corresponding to the field angle C displays the image of the most peripheral portion of the LCD 1, and the image outside the most peripheral image is formed by light rays from regions successively closer to the center of the LCD 1 from the most peripheral portion thereof. Accordingly, although the field angle is effectively enlarged, if the outside image is formed with good image-formation characteristics, it looks like a ghost image. It is therefore desirable to degrade the image-formation characteristics appropriately. The degradation of the image-formation characteristics may be realized by using the refracting power distribution of the Fresnel lens 14. Alternatively, each groove of the Fresnel lens 14 may be formed into a ripple shape, or grooves for degrading resolution may be additionally provided to extend perpendicularly to the existing grooves. Thus, the conditions of the projected image can be made close to those of the human visual field, in which the image at the periphery of the visual field is gradually blurred with distance from the center thereof because of inferior image-formation characteristics.

Figure 23:
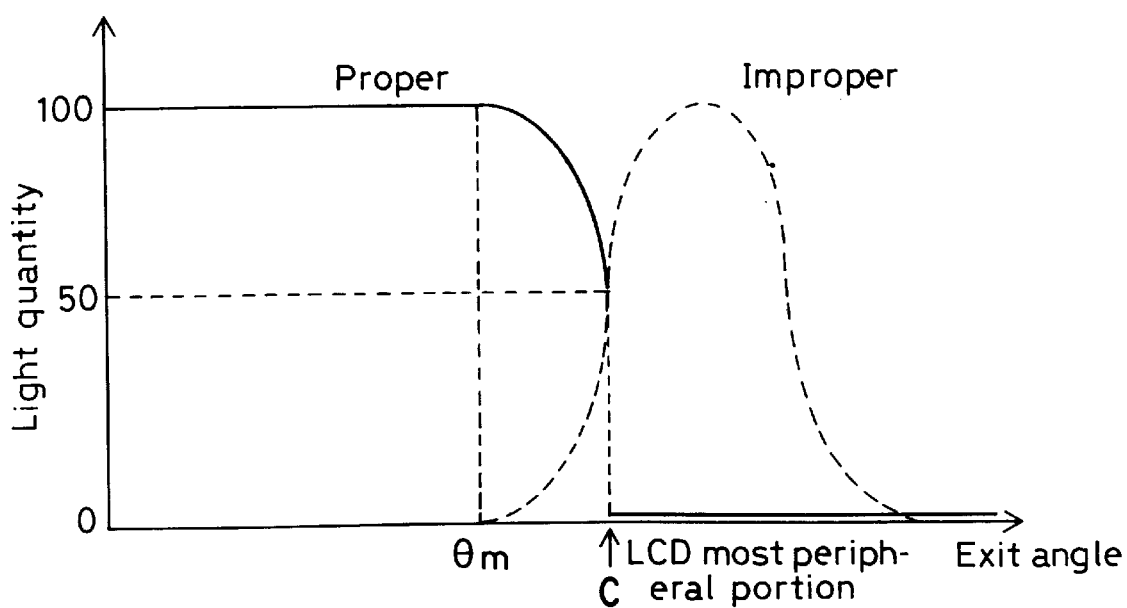
FIG. 23 is a diagram showing the relationship between the light quantity and the exit angle of light emanating from an eye in backward ray tracing in Example 9.

FIG. 23 shows a graph in which the ordinate axis represents the quantity of light, and the abscissa axis represents the exit angle of light from the eye in the backward ray tracing. The light beam shown in FIG. 17, the principal ray (central ray c) of which passes through the edge of the Fresnel lens 14, is in a state where the proportion of light rays subjected to the action of the Fresnel lens 14 is 50%, and represented by the exit angle C in the graph of FIG. 23. In the case of a light beam emanating from the eye at an exit angle larger than the angle C in the backward ray tracing, the proportion of light rays subjected to the action of the Fresnel lens 14 is larger than the above (see the state shown in FIG. 18). In the case of a light beam having an exit angle smaller than the angle C, the proportion of light rays subjected to the action of the Fresnel lens 14 is smaller than in the case of FIG. 17 (see the state shown in FIG. 19).

In the graph of FIG. 23, the curve "Proper" represents light rays not passing through the Fresnel lens 14. These light rays form an image of good image-formation characteristics. On the other hand, the curve "Improper" represents light rays passing through the Fresnel lens 14. These light rays reach a position on the LCD 1 which is closer to the center thereof than the arrival position of the light rays not passing through the Fresnel lens 14 in the backward ray tracing.

In the graph, the curve "Proper" assumes the value of 50% at the exit angle C and then abruptly falls down to zero. There is no proper light ray at an exit angle larger than the angle C. The reason for this is that, as will be understood from FIG. 18, the optical system is so designed that light rays emanating from the eyeball E at an exit angle larger than that of the light ray c will not reach the concave mirror 2 but come out of the prism 12 obliquely downward through the exit surface 4 unless subjected to the action of the periphery bending optical device 14 by passing through it, as stated above. Exit angles at which the quantity of proper light is 100% are angles at which none of the light rays within the beam diameter pass through the Fresnel lens 14. Assuming that the distance from the optical axis to the edge of the Fresnel lens 14 is B, the distance from the exit pupil to the exit surface 4 is R, and the exit pupil diameter D, an angle $\theta_m$ at which the quantity of proper light is 100% may be expressed by the equation $\theta_m = \arctan\{(B-D)/R\}$.

The curve "Improper" assumes the value of 50% at the exit angle C. Then, the curve gradually rises with the exit angle and reaches 100% at an exit angle at which all the light rays within the beam diameter pass through the Fresnel lens 14. The curve reaches the center of the peak at an exit angle at which the principal ray of the light beam passes through the center of the Fresnel lens 14. As the exit angle increases in excess of the angle at which the principal ray passes through the center of the Fresnel lens 14, the quantity of light decreases.

Figure 24:
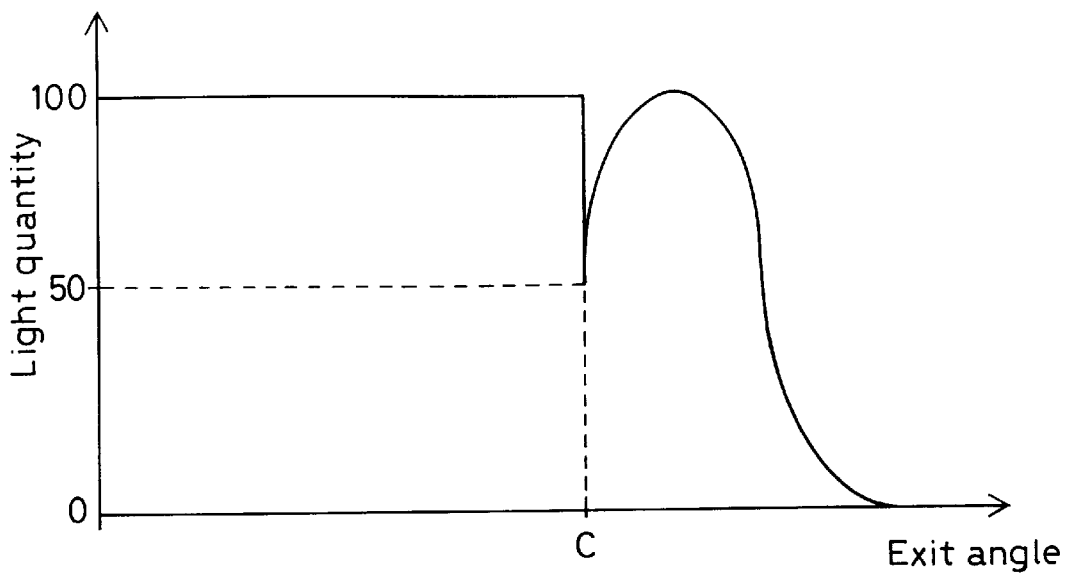
FIG. 24 is a diagram showing the total light quantity in connection with FIG. 23.

FIG. 24 is a graph showing the total light quantity as the sum total of the quantity of proper light and the quantity of improper light, which is aberrated to a considerable extent. When the exit angle only slightly exceeds an angle at which a light beam emitted from the most peripheral portion of the LCD 1 enters the eye, the image-forming light quantity becomes 50%. That is, the brightness is a half of that of a region of 100%, e.g. the center of the image. In other words, the projected image darkens at the periphery thereof at the exit angle C and brightens again at the outside of the periphery.

The foregoing description has been made according to the backward ray tracing. Let us now consider the light rays from the LCD 1 in the forward ray tracing, from a different point of view. A light beam emitted from a position on the LCD 1 which is slightly closer to the center than the most peripheral portion thereof is reflected successively by the concave mirror 2 and the half-mirror 3 and thereafter divided into light rays passing through the Fresnel lens 14 and light rays not passing through it. At this time, the light rays passing through the Fresnel lens 14 are bent toward the optical axis more than the light rays not passing through the Fresnel lens 14 and enter the eyeball E at a larger incident angle than that of the rays not passing through the Fresnel lens 14. This means that, on the retina of the eyeball E, the spot position of a light beam passing through the Fresnel lens 14 is different from the spot position of a light beam not passing through the Fresnel lens 14. More specifically, aberrations such as astigmatism, distortion and coma are introduced into the light rays passing through the Fresnel lens 14. The reason why the light rays passing through the Fresnel lens 14 are referred to as "improper rays" is that these rays form an aberrated image, which has aberrations such as astigmatism, distortion and coma, outside the image formed by the light rays not passing through the Fresnel lens 14. Thus, because the improper light rays are a group of rays having aberrations such as astigmatism, distortion and coma, a part of a beam of light rays emitted from the same point on the LCD 1 enters the eyeball E with a small amount of aberration, whereas a part of the light beam enters the eyeball E with aberrations such as astigmatism, distortion and coma introduced thereinto. Thus, the picture element on the image is recognized as a blurred point elongating radially. The improper light rays produce the advantageous effect according to the present invention.

The degree of blur depends on the proportion of light quantity, that is, the quantity of light passing through the Fresnel lens 14. A light beam emitted from the most peripheral portion of the LCD 1 contains 50% light rays having good image-forming action and 50% aberrated light rays having inferior image-forming action. As the field angle increases in excess of the above, i.e. as the distance increases outwardly from the arrival point of the above light beam in the image plane, the quantity of light having inferior image-forming action exceeds 50% and becomes larger. Therefore, the image formed by the improper light rays is distinctly recognized as a blur.

EXAMPLE 10

Figure 25:
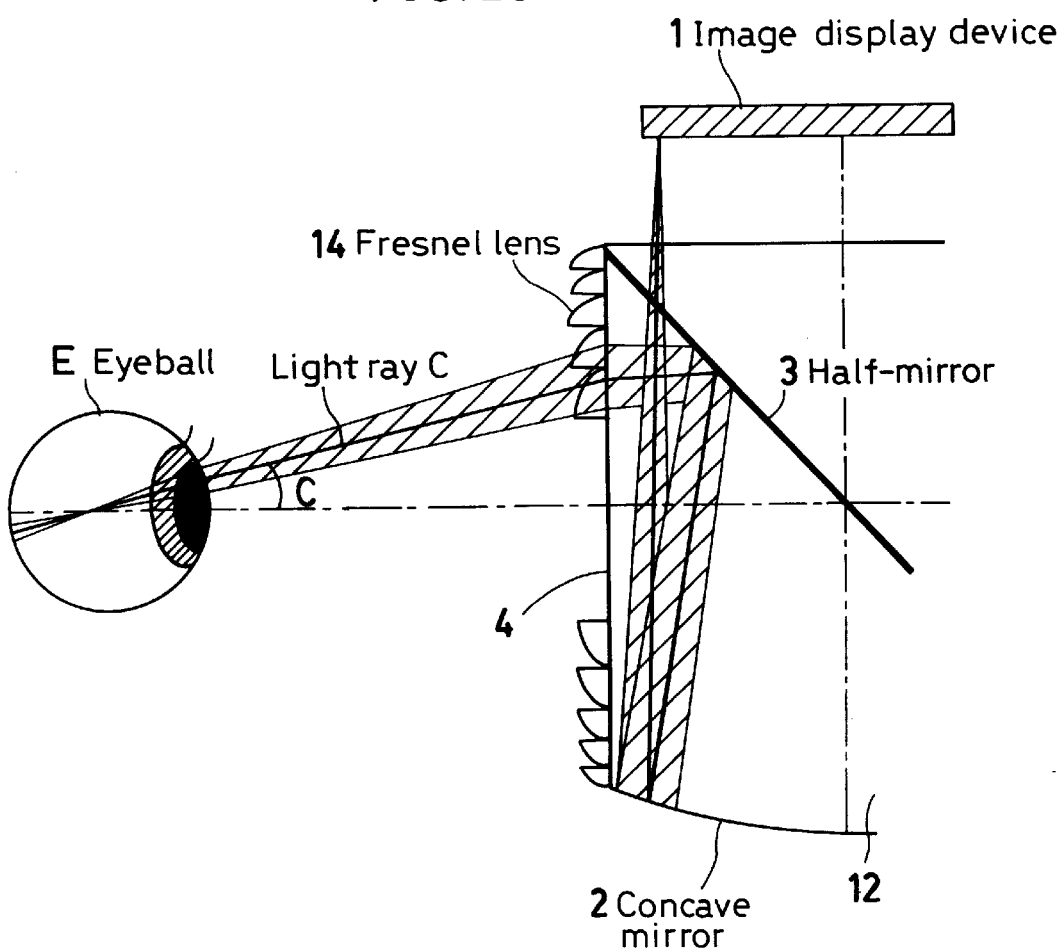
FIG. 25 is a fragmentary vertical sectional view showing the arrangement of an optical system in an image display apparatus according to Example 10 of the present invention.

FIG. 25 shows the arrangement of an optical system according to Example 10. The optical system conforms to the arrangements of the optical systems according to Examples 8 and 9 but differs therefrom in the position of the Fresnel lens 14. In Example 8, the Fresnel lens 14 is positioned so that the principal ray of a light beam emitted from the most peripheral portion of the LCD 1 passes through just the edge of the Fresnel lens 14. In this example, the Fresnel lens 14 is positioned so that the lower ray of a light beam emitted from the most peripheral portion of the LCD 1 passes through just the edge of the Fresnel lens 14. In addition, the effective diameter of the concave mirror 2 is determined so that the outermost subordinate ray in a light beam emitted from the most peripheral portion is reflected by the endmost portion of the concave mirror 2. Thus, a light beam emitted from the most peripheral portion of the LCD 1 passes through the Fresnel lens 14 in its entirety. That is, all the light beam is subjected to the action of the Fresnel lens 14. FIG. 25 illustrates a forward trace of light rays emitted from the most peripheral portion of the LCD 1.

The same description as given in Example 8 applies to this example. The relationship between the light quantity and the exit angle in this example is shown in the graph of FIG. 26. As shown in the graph, the exit angle at which the action of the Fresnel lens 14 begins to work on light rays is smaller than that in the case of the graph shown in FIG. 23. At the angle C at which a light ray from the most peripheral portion of the LCD 1 enters the eyeball E when the Fresnel lens 14 is not present, the quantity of proper light, which is not subjected to the action of the Fresnel lens 14, is 0%, whereas the quantity of improper light subjected to the action of the Fresnel lens 14 reaches 100%. Assuming that the distance from the optical axis to the edge of the Fresnel lens 14 is B, the distance from the exit pupil to the exit surface 4 is R, and the exit pupil diameter is D, the angle $\theta_n$ at which both the quantity of proper light and the quantity of improper light are 50% may be expressed by the equation $\theta_n = \arctan\{(B-D/2)/R\}$ from FIG. 25.

Figure 27:
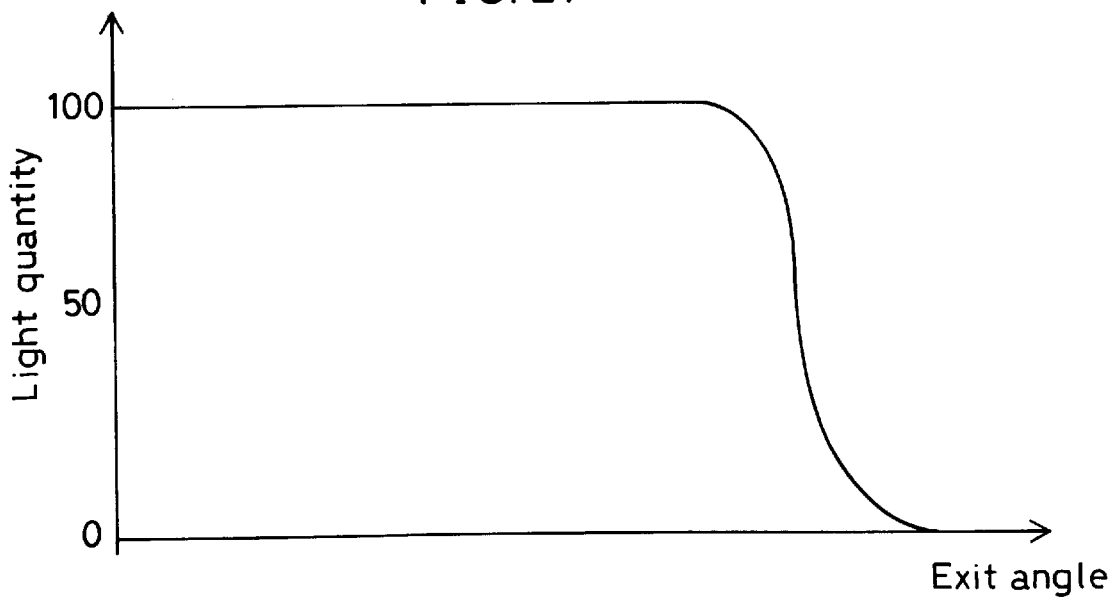
FIG. 27 is a diagram corresponding to FIG. 24, showing the overall light quantity in Example 10.

The total light quantity as the sum total of the quantities of proper and improper light is shown by the graph of FIG. 27. As will be clear from the graph, there is no unnaturalness as occurs in Example 8, in which the light quantity abruptly falls at the angle C and hence the image once darkens at the periphery thereof. However, the angle at which light rays begin being subjected to the action of the periphery bending optical device 14 to become improper rays decreases, and this means that the angle at which blur begins becomes correspondingly smaller, and hence the area of good image-formation characteristics narrows.

In short, the unnaturalness in terms of the light quantity and the extent of the good image-formation area are in a trade-off relationship to each other. The angle at which the action of the Fresnel lens 14 begins to work on light rays depends on the position of the Fresnel lens 14. Therefore, it is important to optimize the position of the Fresnel lens 14 according to the type of image to be displayed, for example. That is, in the case of an image in which the observer gazes at only the central portion thereof and only the central portion needs good image-formation characteristics, importance is attached to naturalness, and the Fresnel lens 14 should preferably be arranged to begin to act at a shallower angle. If even the peripheral portion of the displayed image needs a certain level of image-formation characteristics, the Fresnel lens 14 should preferably be positioned as shown in Example 8.

EXAMPLE 11

Figure 28:
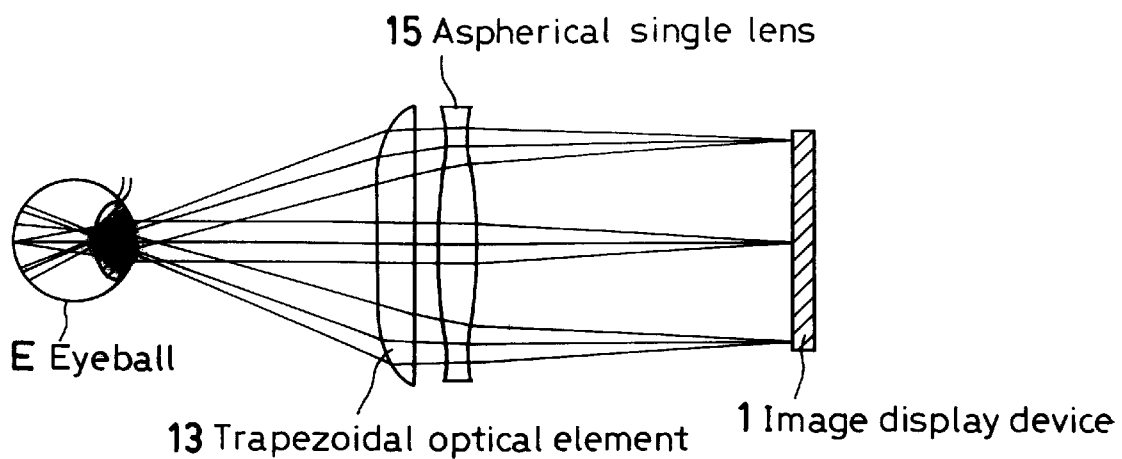
FIG. 28 is a sectional view showing the arrangement of an optical system in an image display apparatus according to Example 11 of the present invention.

FIG. 28 shows the arrangement of an optical system according to Example 11. The optical system comprises a combination of two lenses, i.e. an aspherical lens 15 having an aspherical surface in which the peripheral portion has a negative refracting power, and a lens 13 having an aspherical surface in which the peripheral portion has a large positive refracting power so that light beams refracted away from the optical axis by the negative refracting power at the peripheral portion of the lens 15 are led to an eyeball E by the action of the lens 13.

The above-described optical element (lens 13) having a large positive refracting power at the peripheral portion thereof is a trapezoidal optical element 13 similar to those used in Examples 5, 6 and so forth. The lens 15 having a negative refracting power at the peripheral portion thereof is the principal refracting device in the optical system and has an aspherical surface configuration in which the refracting power changes from a positive to a negative as the distance from the center of the lens 15 increases toward the periphery thereof.

An LCD 1 is disposed at a position away from the aspherical lens 15, which has a negative refracting power at the peripheral portion thereof, by a distance approximately equal to the focal length at the principal area of the lens 15. The observer's eyeball E is disposed on the opposite side of the aspherical lens 15, which is remote from the LCD 1, at a position approximately equal to the focal length at the principal area of the lens 15. In the principal area, the optical system exhibits image-formation characteristics similar to those of the conventional optical systems. At the periphery of the optical system, however, light is refracted away from the optical axis to diverge outwardly by being subjected to the negative refracting power of the principal refracting device 15. The light beams refracted outwardly are subjected to the refracting power of the peripheral portion of the trapezoidal optical element 13 and thus led to the eyeball E. At this time, light beams emitted from the periphery of the LCD 1 are once diverged by the negative refracting power and then led to the eyeball E from the divergent state; therefore, these light beams enter the eyeball E at a large angle. This produces the effect that the field angle of the image seems to have enlarged. The projected image is in the conditions that at the periphery thereof, the image radially elongates and gradually becomes darker. The conditions of the projected image are close to those of the human visual field, in which the resolution gradually degrades as the distance from the center of the visual field increases toward the periphery thereof, causing the peripheral image to be gradually blurred. Therefore, the image appears natural, and thus the dynamic presence is enhanced.

EXAMPLE 12

Figure 29:
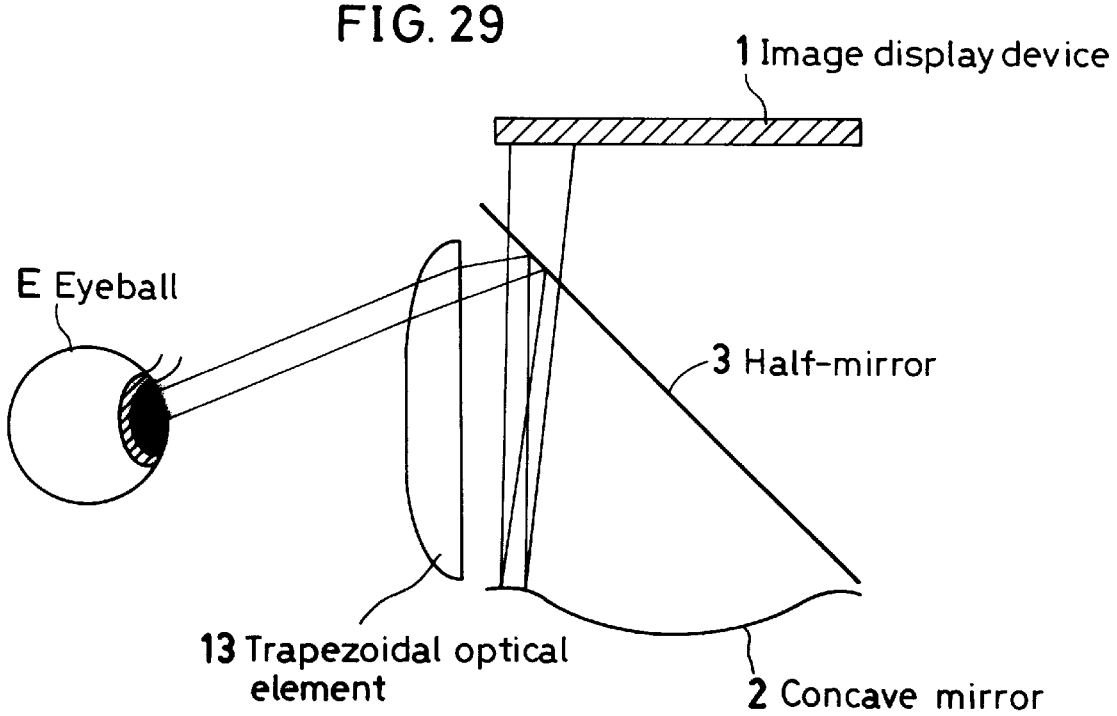
FIG. 29 is a vertical sectional view showing the arrangement of an optical system in an image display apparatus according to Example 12 of the present invention.

FIG. 29 is a vertical sectional view of an optical system according to Example 12. The optical system includes a half-mirror 3 and a concave mirror 2, which are disposed such that the center axes thereof intersect each other at an angle of 45 degrees. The optical system further includes a trapezoidal optical element 13 similar to those used in Examples 5 and so forth. The trapezoidal optical element 13 is disposed in an optical path extending between the half-mirror 3 and the observer's eyeball E. The concave mirror 2 in this optical system has an aspherical surface configuration having a negative refracting power at the periphery thereof.

In the optical system having the half-mirror 3 and the concave mirror 2, a dead space is inevitably present on the exit side thereof, as stated above in connection with the problems associated with the prior art. The trapezoidal optical element 13 is disposed in a portion corresponding to the dead space. The trapezoidal optical element 13 has an action by which, of light beams emitted from the periphery of the LCD 1, those which are bent away from the optical axis of the concave mirror 2 by being subjected to the negative refracting power at the periphery of the concave mirror 2 are led to the eyeball E. The refracting power is closely related to the effective diameter of the concave mirror 2, which is the principal factor that determines the size of the optical system.

Light beams emitted from the eyeball E in the backward ray tracing and subjected to the refracting power at the periphery of the trapezoidal optical element 13 are reflected by the half-mirror 3 toward the concave mirror 2. The concave mirror 2 has an effective diameter determined so that the light beams reflected by the half-mirror 3 in the backward ray tracing will not be vignetted. As shown in FIG. 29, light beams having a certain pupil diameter are emanated from the eyeball E in the backward ray tracing, and a light beam emanating at a large exit angle is subjected to the action of the trapezoidal optical element 13. At this time, because the light beam has a diameter of a certain size, the rays of the beam reach different positions on the concave mirror 2 after being reflected by the half-mirror 3. The arrival position of light on the LCD 1 depends on where in the peripheral portion of the aspherical concave mirror 2 the light is subjected to the refracting power. In other words, the refracting power of the concave mirror 2 varies according to the position because of the aspherical surface configuration. This means that light rays can reach the same position on the LCD 1 even if the rays emanate from the eyeball E at different exit angles.

Figure 30:
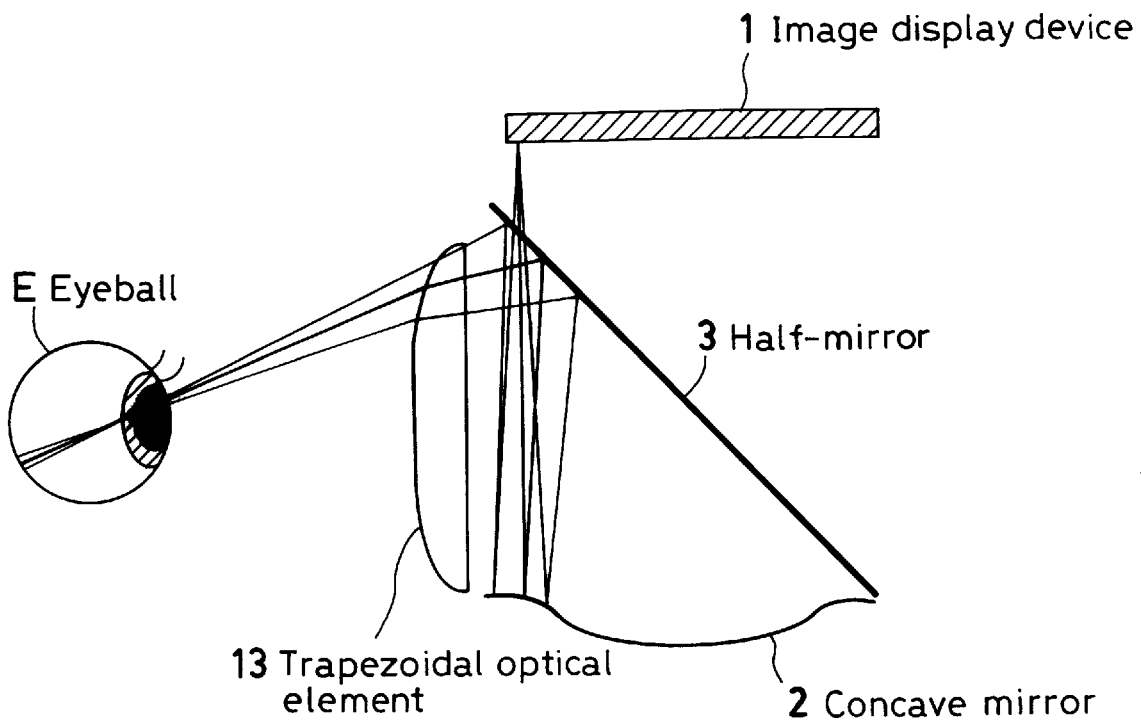
FIG. 30 is a diagram illustrating the action of the image display apparatus shown in Example 12.

According to the forward ray tracing, as shown in FIG. 30, the rays of a light beam emitted from the periphery of the LCD 1 differ from each other in the exit position on the exit surface according to the arrival position on the concave mirror 2 and hence pass through different portions of the trapezoidal optical element 13. Thus, even if emitted from the same point on the LCD 1, light rays are led to the eyeball E at different incident angle. Therefore, aberrations such as astigmatism, distortion and coma occur to a considerable extent at the periphery of the projected image, and the image appears to have elongated radially.

Regarding the light quantity, light beams, which originally have the same quantity of light, are dispersed at the peripheral portion and led to the eye at various incident angles. Therefore, the image gradually becomes darker as the distance from the center of the image increases toward the periphery thereof.

The degree at which the periphery of the image is radially blurred depends on the position of the trapezoidal optical element 13, the distribution of refracting power of the trapezoidal optical element 13 and the refracting power distribution at the periphery of the concave mirror 2.

Consequently, it is possible to make the display field angle seem to have enlarged, and it is also possible to produce an image in which the boundary portion is gradually blurred to become darker. Thus, an image with dynamic presence can be provided even if the normal display field angle is not wide.

Figure 31:
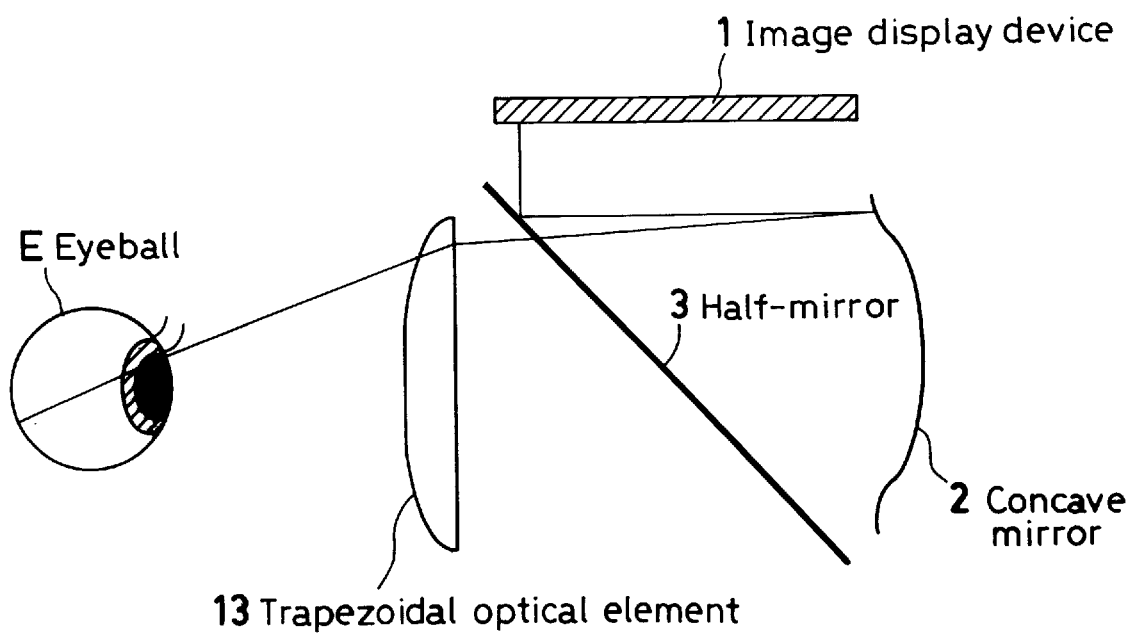
FIG. 31 is a vertical sectional view showing a modification of the image display apparatus shown in FIG. 30.

In the optical system according to this example, light beams from the LCD 1 are reflected by the concave mirror 2 after passing through the half-mirror 3, and the reflected beams are reflected by the half-mirror 3 so as to be led to the eyeball E; however, the above discussion also applies to an arrangement in which, as shown in FIG. 31, light beams from the LCD 1 are first reflected by the half-mirror 3 and then pass through it.

It should be noted that the foregoing description, which has been made with regard to the vertical direction, also applies to the horizontal direction.

EXAMPLE 13

Figure 32:
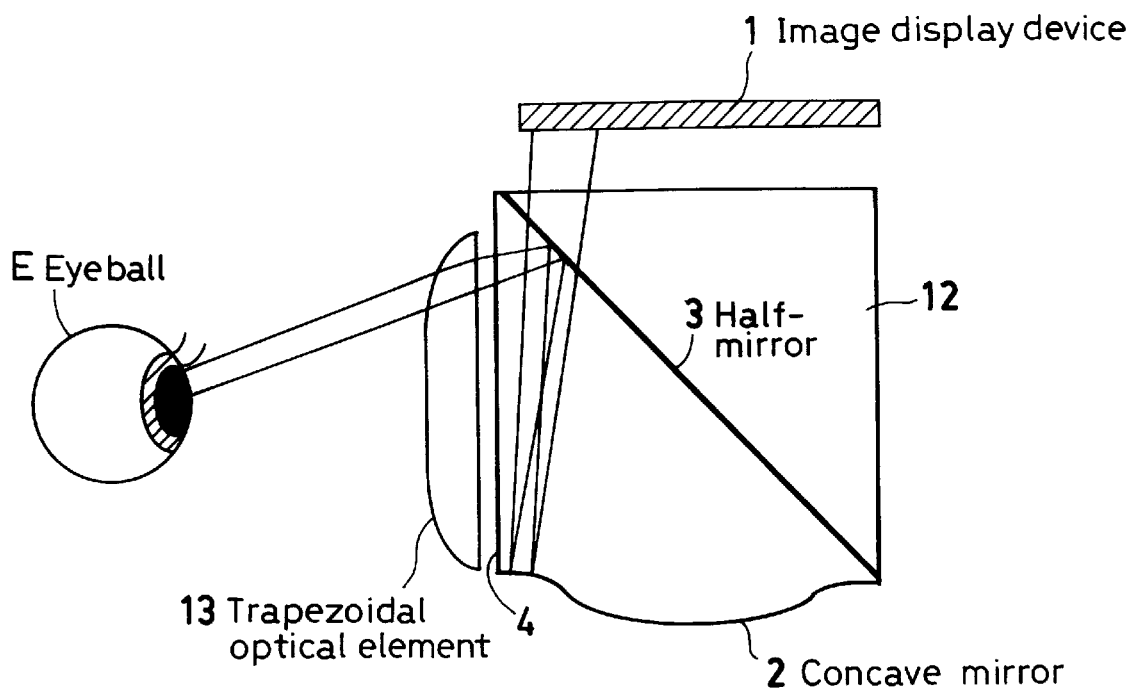
FIG. 32 is a vertical sectional view showing the arrangement of an optical system in an image display apparatus according to Example 13 of the present invention.

FIG. 32 is a vertical sectional view of an optical system according to Example 13. The optical system is a prism optical system which includes a cemented prism 12 having a half-mirror 3 and a concave mirror 2 provided in front of the cemented prism 12. The half-mirror 3 and the concave mirror 2 are disposed such that the center axes thereof intersect each other at an angle of 45 degrees. In the optical system, the periphery of the concave mirror 2 is formed into an aspherical surface configuration having a negative refracting power which gradually increases toward the periphery of the concave mirror 2. In addition, the exit surface 4 of the prism 12 is provided with a Fresnel lens (for example, see FIG. 15) having a positive refracting power by which light beams diverged outwardly by the negative refracting power at the periphery of the concave mirror 2 are led to an eyeball E. Alternatively, a trapezoidal optical element 13 is disposed at the periphery of the prism exit surface 4, as shown in the figure. In the case of the Fresnel lens, it is provided in the dead space, which is inevitably present in the prism 12, as stated above.

The refracting power of the trapezoidal optical element 13 or the Fresnel lens is closely related to the effective diameter of the concave mirror 2, which is the principal factor that determines the size of the optical system.

Light beams emitted from the eyeball E in the backward ray tracing and subjected to the refracting power of the trapezoidal optical element 13 or the Fresnel lens are reflected by the half-mirror 3 toward the concave mirror 2, which is disposed on the side of the prism 12 that is remote from the LCD 1. The concave mirror 2 has an effective diameter determined so that the light beams reflected by the half-mirror 3 in the backward ray tracing will not be vignetted.

Even if emitted from the same point on the LCD 1, light rays are led to the eyeball E at different incident angles by the action described in Example 12. Therefore, aberrations such as astigmatism, distortion and coma occur to a considerable extent at the periphery of the projected image, and the image appears to have elongated radially.

Regarding the light quantity, light beams, which originally have the same quantity of light, are dispersed at the peripheral portion and led to the eyeball E at various incident angles. Therefore, the image gradually becomes darker as the distance from the center of the image increases toward the periphery thereof. The degree at which the periphery of the image is radially blurred depends on the position of the trapezoidal optical element 13 or the Fresnel lens, the distribution of refracting power of the trapezoidal optical element 13 or the Fresnel lens and the refracting power distribution at the periphery of the concave mirror 2.

Consequently, it is possible to make the display field angle seem to have enlarged, and it is also possible to produce an image in which the boundary portion is gradually blurred to become darker. Thus, an image with dynamic presence can be provided even if the normal display field angle is not wide.

Figure 33:
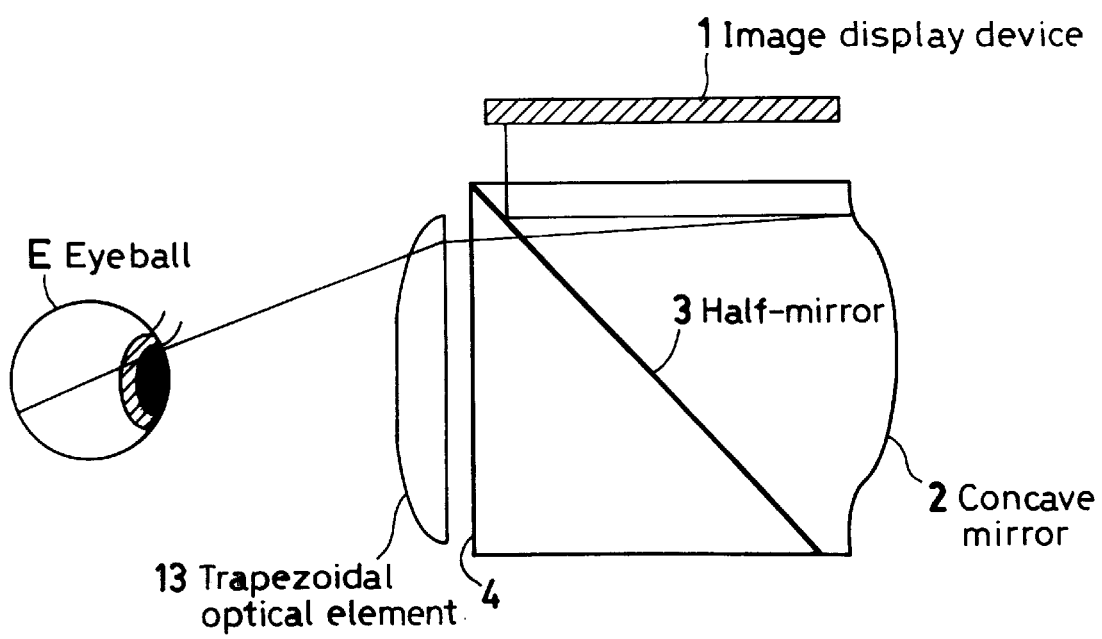
FIG. 33 is a vertical sectional view showing a modification of the image display apparatus shown in FIG. 32.

In the optical system according to this example, light beams from the LCD 1 are reflected by the concave mirror 2 after passing through the half-mirror 3, and the reflected beams are reflected by the half-mirror 3 so as to be led to the eyeball E; however, the above discussion also applies to an arrangement in which, as shown in FIG. 33, light beams from the LCD 1 are first reflected by the half-mirror 3 and then pass through it.

It should be noted that the foregoing description, which has been made with regard to the vertical direction, also applies to the horizontal direction.

EXAMPLE 14

Figure 34:
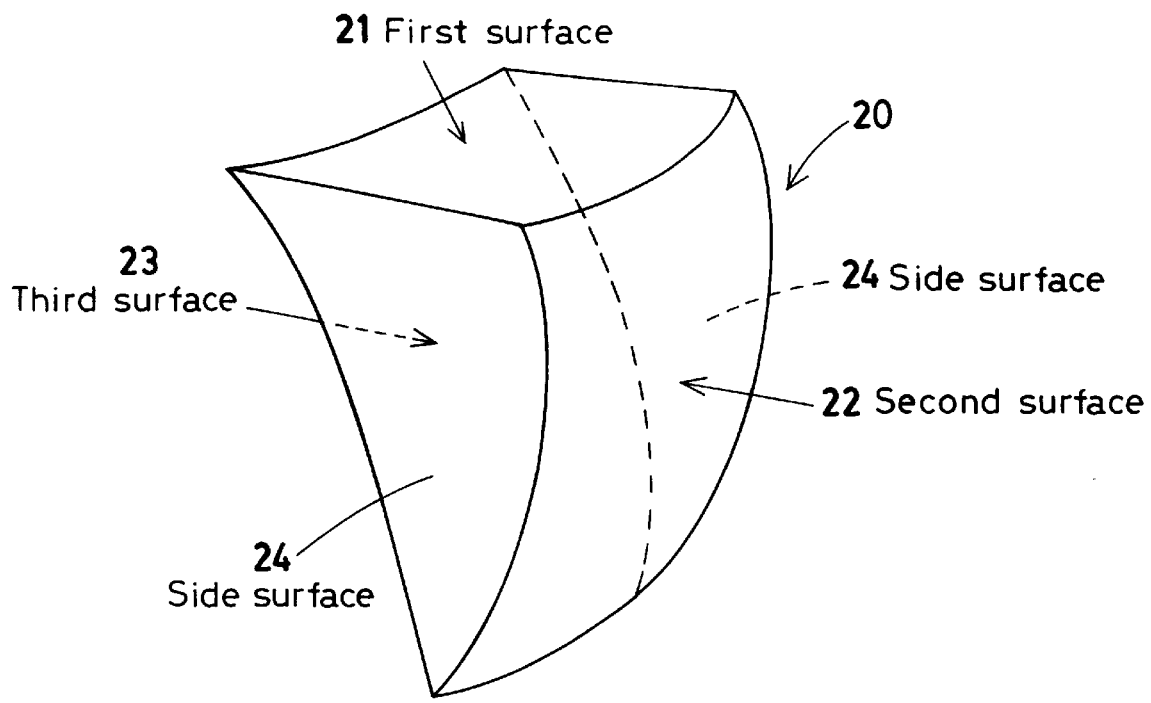
FIG. 34 is a perspective view of a decentered prism optical system used in an image display apparatus according to Example 14 of the present invention.

The following is a description of an example in which a projection optical system comprises an optical system 20 having free form surfaces as shown in the perspective view of FIG. 34. The optical system 20 is proposed in Japanese Patent Application No. 8-92300 filed by the present applicant. The optical system 20 is a decentered prism optical system comprising three optical surfaces 21, 22 and 23, and side surfaces 24 on both sides thereof. The projection optical system 20 is a compact optical system having a relatively large display field angle and capable of projecting an image sharply as far as the periphery of the image field.

Figure 35:
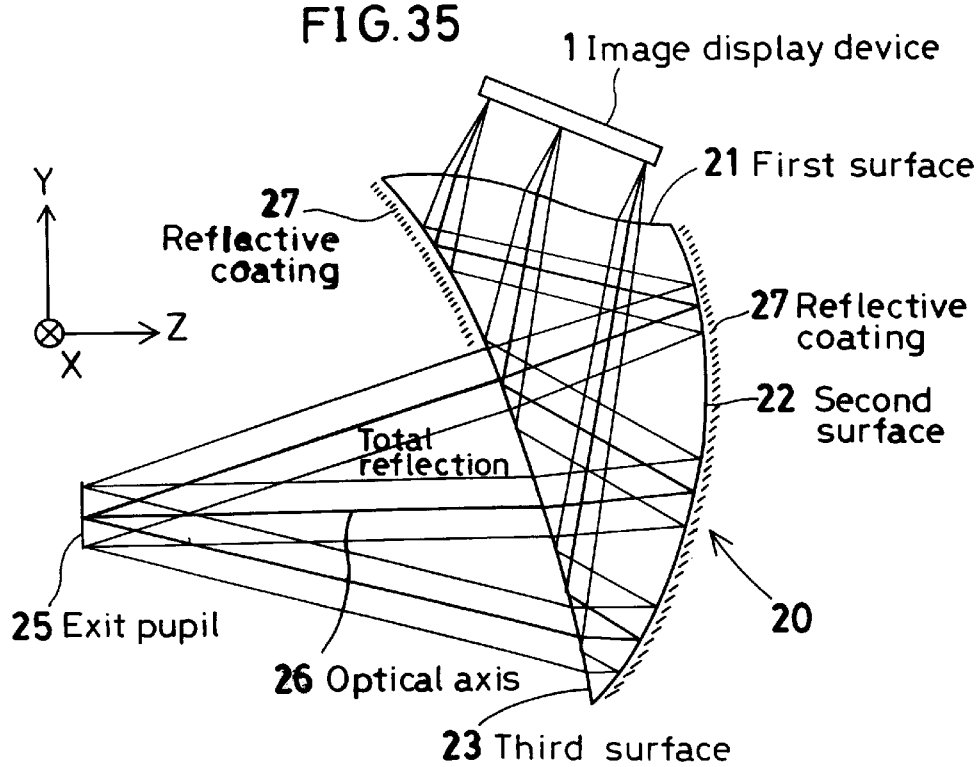
FIG. 35 is a ray diagram illustrating an optical ray trace of the decentered prism optical system.

An optical ray trace of the optical system 20 is shown in FIG. 35. In the decentered prism optical system 20, the three surfaces 21, 22 and 23 are decentered with respect to an optical axis 26, and the space formed by the three surfaces 21, 22 and 23 is filled with an optically transparent medium having a refractive index larger than 1. Assuming that an entrance surface through which light emitted from an image display device 1 enters the optical system 20 is a first surface 21, a reflecting surface on a side of the optical system 20 that is remote from an exit pupil 25 is a second surface 22, and a surface which is in close proximity to the exit pupil 25 is a third surface 23, light rays emitted from the image display device 1 travel along the following path: The light rays enter the decentered prism optical system 20 while being refracted through the first surface 21 and are internally reflected toward the second surface 22 by the third surface 23. Then, the reflected rays are internally reflected toward the third surface 23 by the second surface 22 and exit from the optical system 20 while being refracted through the third surface 23 to reach the exit pupil 25. The whole second surface 22, which is a reflecting surface, together with a surface area of the third surface 23 other than a light-transmitting region, is provided with reflective coating 27.

Let us assume that a plane containing a principal ray emitted from the center of the image display device 1 and reaching the center of the exit pupil 25 is a YZ-plane. In the YZ-plane, the direction of the observer's visual axis (coincident with the optical axis 26) when the observer having his/her pupil positioned in the exit pupil 25 gazes at the center of the image displayed on the image display device 1, that is, the direction of the principal ray exiting from the optical system, is defined as a Z-axis direction. A direction perpendicular to the Z-axis in the YZ-plane is defined as a Y-axis direction. A direction perpendicular to both the Z- and Y-axes is defined as an X-axis direction.

In FIG. 35, the decentered prism optical system 20 is arranged such that light beams emitted from the image display device 1, e.g. an LCD, are refracted by passing through the first surface 21 and reflected by the region of the third surface 23 where the reflective coating 27 is provided, or totally reflected by the region of the third surface 23 where the reflective coating 27 is not provided. The reflected rays are reflected by the second surface 22, which is provided with the reflective coating 27, and refracted by the region of the third surface 23 where the reflective coating 27 is not provided, thereby leading the rays to the observer's eye placed at the position of the exit pupil 25.

As shown in FIG. 36, the optical system 20 has a periphery bending optical device 14 disposed in the vicinity of the first surface 21, which faces the image display device 1. As shown in the perspective view of FIG. 37(a) and the YZ-sectional view of FIG. 37(b), the periphery bending optical device 14 is an element provided at the periphery thereof with lateral linear Fresnel lenses (one-dimensional Fresnel lenses) $14_1$ and longitudinal linear Fresnel lenses $14_2$. The periphery bending optical device 14 bends light rays by the linear Fresnel lenses $14_1$ and $14_2$, as described later. The ray-bending peripheral portion of the periphery bending optical device 14 does not necessarily need to be Fresnel lenses as described above. However, the periphery bending optical device 14 needs to bend light rays to a relatively large extent in the area where the linear Fresnel lenses $14_1$ and $14_2$ are provided. Therefore, if the linear Fresnel lenses $14_1$ and $14_2$ are not used, the ray-bending peripheral portion of the periphery bending optical device 14 will be a surface having a smaller radius of curvature than that of the central area because of the addition of power and have an unfavorably large thickness. Therefore, it is desirable to form the ray-bending peripheral portion by using the linear Fresnel lenses $14_1$ and $14_2$.

The periphery bending optical device 14 may be arranged to bend light rays by a diffractive action using relief patterns or gratings in place of the linear Fresnel lenses $14_1$ and $14_2$.

FIGS. 37(a) and 37(b), the periphery bending optical device 14 has the linear Fresnel lenses $14_1$ and $14_2$ provided on a flat plate. However, the plate, which serves as a base, may be arranged to have an aspherical surface or a free form surface for the purpose of improving the image-formation characteristics of the image. In the case of a flat plate, if the first surface 21 of the optical system 20, which is the original projection optical system, is a flat surface (see FIG. 36), the periphery bending optical device 14 is favorably brought into close contact with the first surface 21 when it is disposed immediately in front of and in close proximity to the first surface 21 of the optical system 20. Thus, the dead space disappears. In this case, aberrations related to the image formation by the decentered prism optical system 20 must be corrected by the second and third surfaces 22 and 23.

Figure 38:
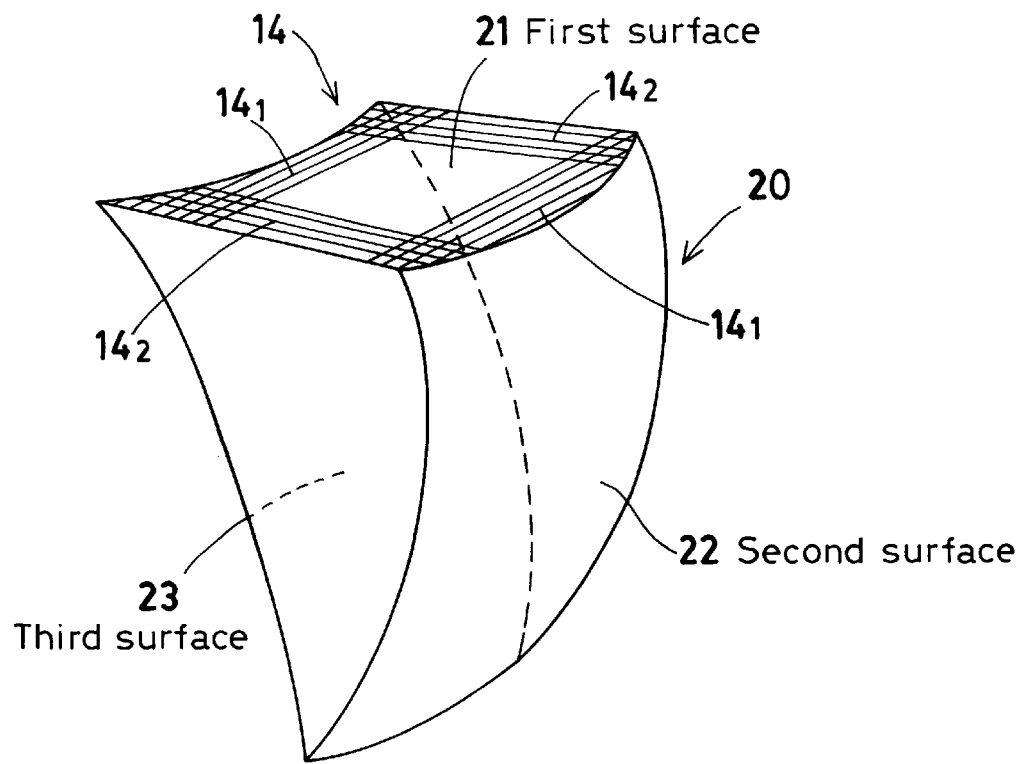
FIG. 38 is a perspective view of an optical system in an image display apparatus according to another form of Example 14.

As shown in FIG. 38, the action of the periphery bending optical device 14 may be assigned to the first surface 21 of the decentered prism optical system 20. More specifically, the projection optical system is not divided into two members, i.e. the decentered prism optical system 20 and the periphery bending optical device 14, but the periphery of the first surface 21 of the decentered prism optical system 20 is provided with the linear Fresnel lenses $14_1$ and $14_2$ to bend light rays. Alternatively, the periphery of the first surface 21 is provided with relief patterns or gratings to bend light rays by a diffractive action.

Figure 39:
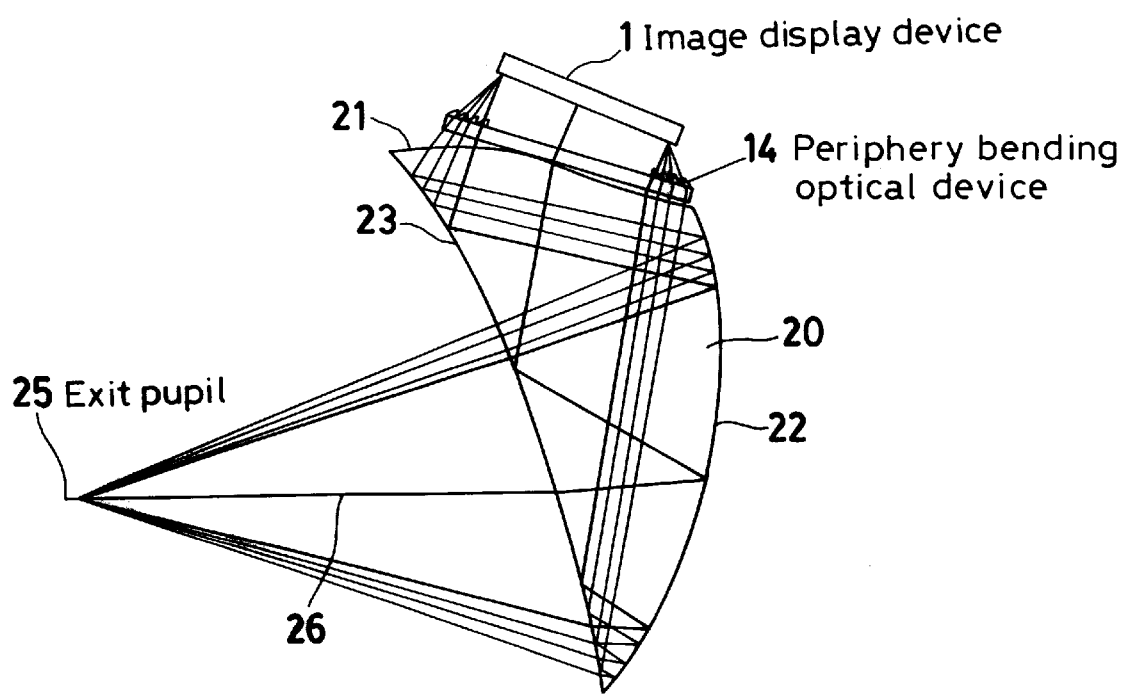
FIG. 39 is a sectional view showing the arrangement of an optical system of an image display apparatus according to another form of Example 14 in a case where the first surface of the decentered prism optical system is not flat.
Figure 40:
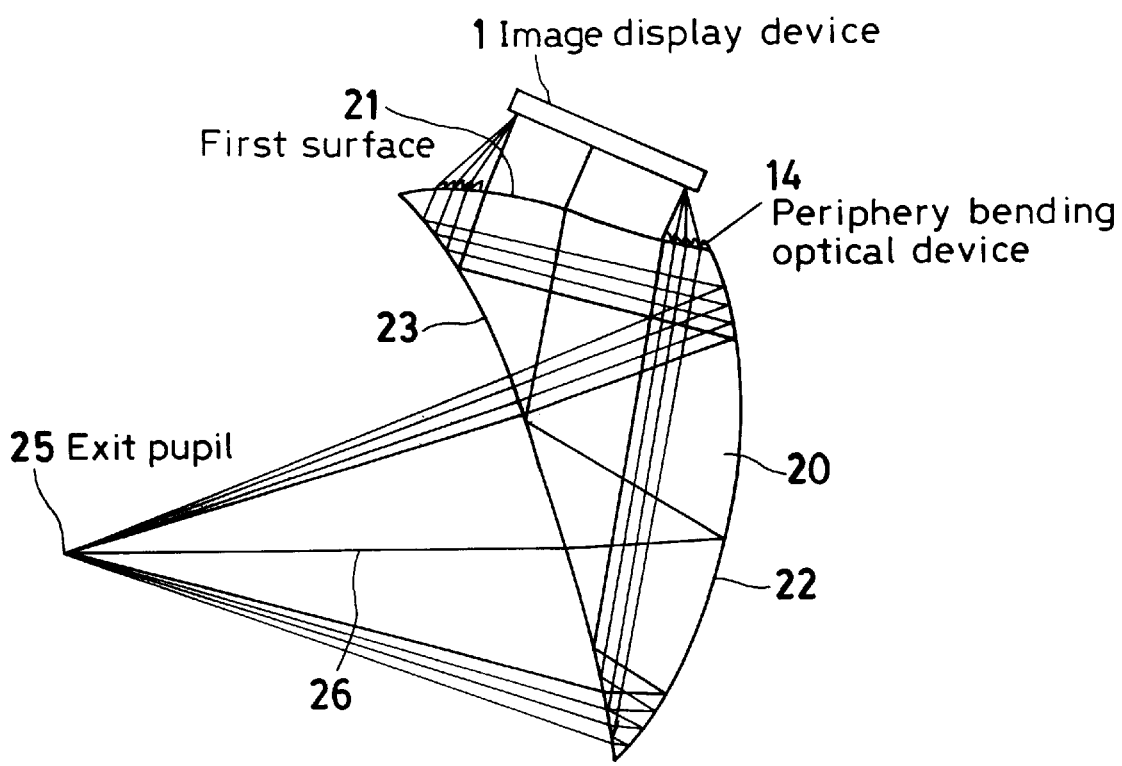
FIG. 40 is a sectional view showing the arrangement of an optical system of an image display apparatus according to still another form of Example 14 in a case where the first surface of the decentered prism optical system is not flat.

In the example shown in FIG. 36, the first surface 21 of the optical system 20 is a flat surface, whereas in the example shown FIG. 39, the first surface 21 is not flat. In this case, aberrations related to the image formation by the decentered prism optical system 20 can be corrected even more favorably, so that it is possible to improve the image-formation characteristics in the area blurred at the periphery thereof. An example in which the action of the periphery bending optical device 14 is assigned to the first surface 21 is shown in FIG. 40.

Figure 41:
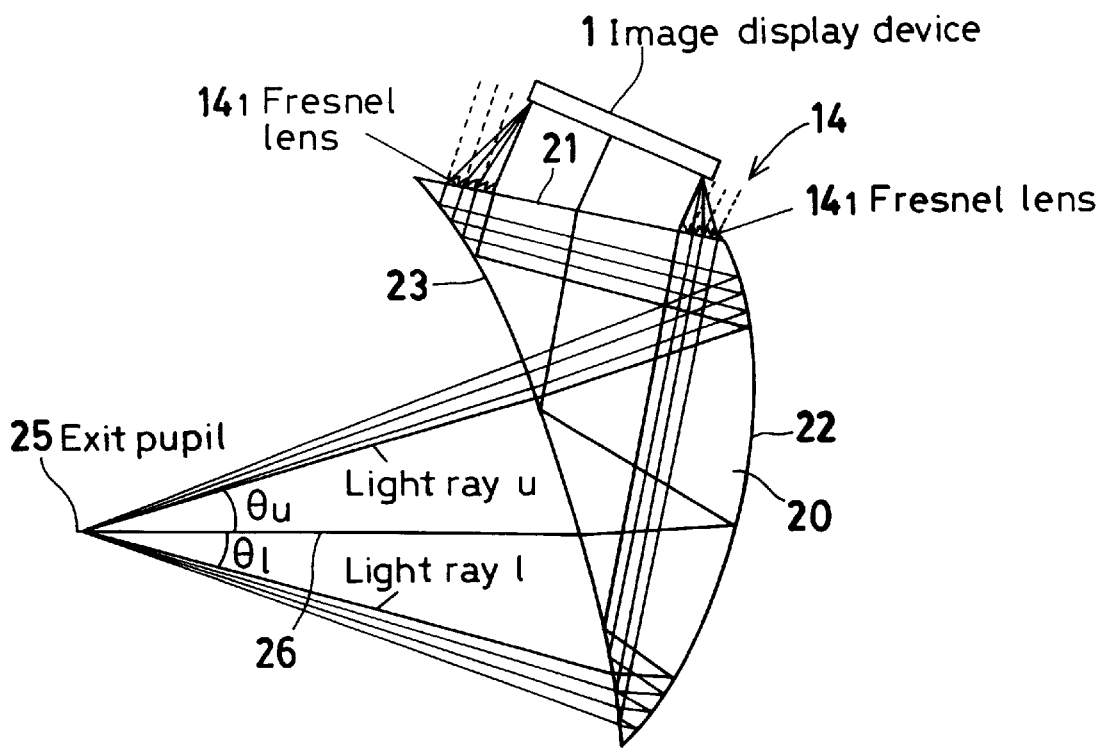
FIG. 41 is a ray diagram illustrating the trace of marginal rays to describe the action of Example 14.

Next, the optical system according to this example will be described with regard to a typical arrangement in which the first surface 21 of the decentered prism optical system 20 is formed from a flat surface, and the action of the periphery bending optical device 14 is assigned to the linear Fresnel lenses $14_1$ and $14_2$ provided directly on the surface 21, which faces the image display device 1. FIG. 41 is a YZ-sectional view illustrating an optical ray trace of an arrangement in which the peripheral light beam-bending action is assigned to the projection optical system 20. Referring to only the vertical direction, light beams of field angles above the field angle of a light ray u as seen from the exit pupil 25 in the figure and light beams of field angles below the field angle of a light ray 1 as seen from the exit pupil 25 in the figure are led to the edges of the image display device 1 by the light-bending action of the periphery bending optical device 14 provided on the surface 21 facing the image display device 1 or disposed between the surface 21 and the image display device 1. In the following description, the image display device 1 is represented by an LCD, and the periphery bending optical device 14 by a Fresnel lens. In FIG. 41, only light rays from the center of the exit pupil 25 are depicted.

If the periphery bending optical device 14 is not present, the light rays emanating from the center of the exit pupil 25 in the backward ray tracing reach respective points outside the LDC 1, as shown by the dotted lines. In other words, when the periphery bending optical device 14 is not provided, there is no light above the light ray u and below the light ray 1 in the forward ray tracing; therefore, there is no image in that portion (outside the normal image).

The addition of the Fresnel lens 14 enables the above-described light rays to be led to the center of the exit pupil 25, that is, the observer's eyeball. Accordingly, there are light rays even in an area where there would otherwise be no image. Referring to FIG. 41, in which only light rays from the center of the exit pupil 25 are depicted, all the light rays form an image in which information from the edges of the LCD 1, i.e., the most peripheral portion of the displayed image, is projected to elongate outwardly of the normal field angle (θu and θl shown in FIG. 41).

Figure 42:
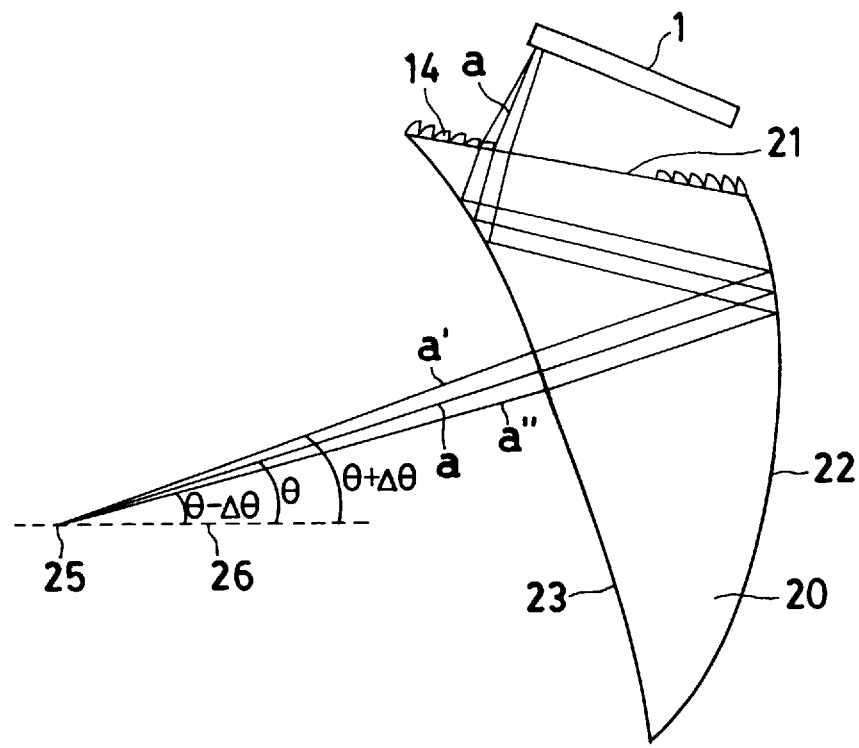
FIG. 42 is a diagram showing the paths of principal rays incident on the observer's pupil at field angles θ, (θ+Δθ) and (θ−Δθ), respectively.
Figure 43:
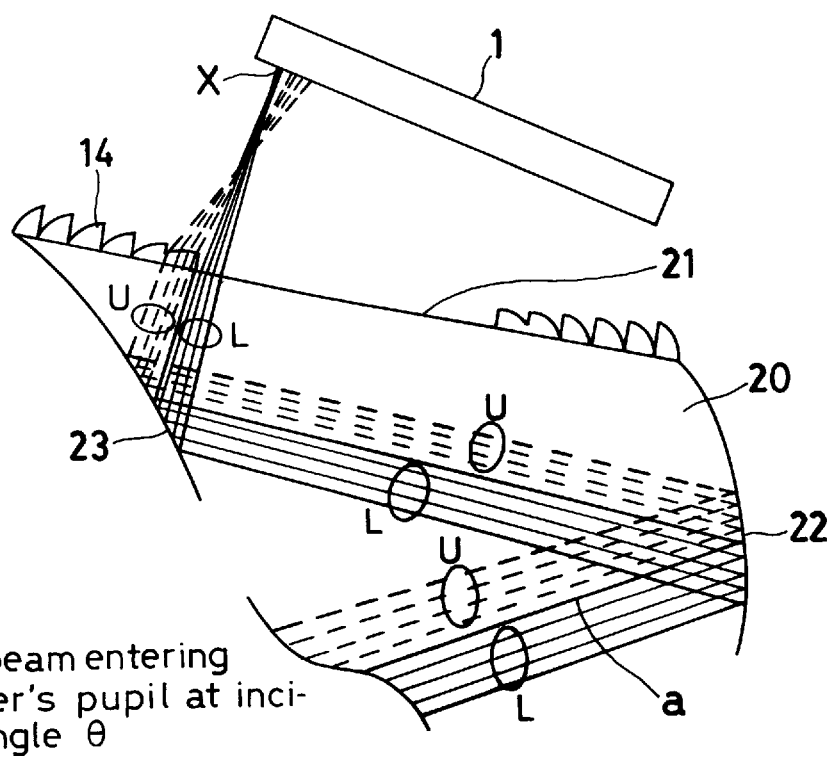
FIG. 43 is a diagram schematically showing the path of a light beam incident on the observer's pupil at a field angle θ.
Figure 44:
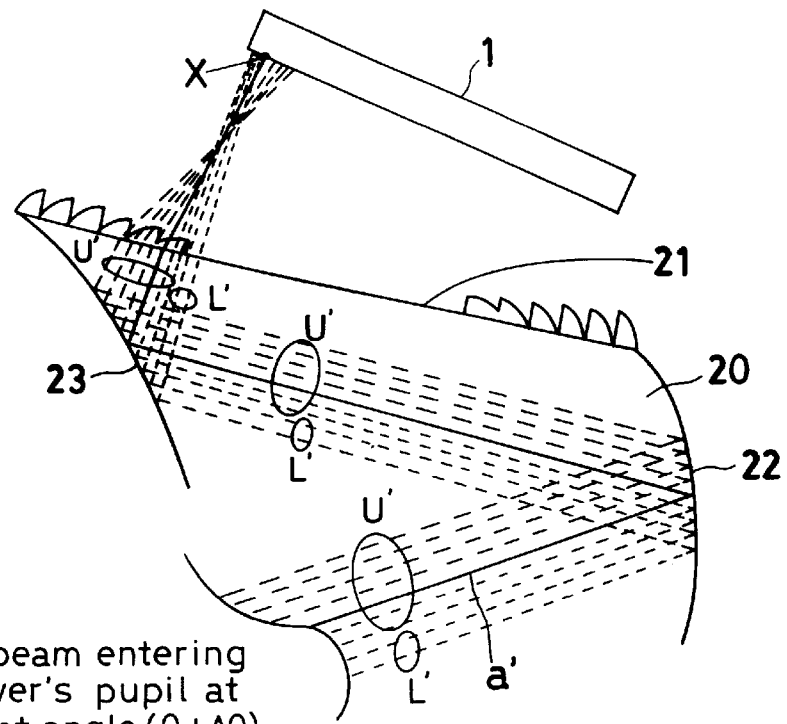
FIG. 44 is a diagram schematically showing the path of a light beam incident on the observer's pupil at a field angle (θ+Δθ).
Figure 45:
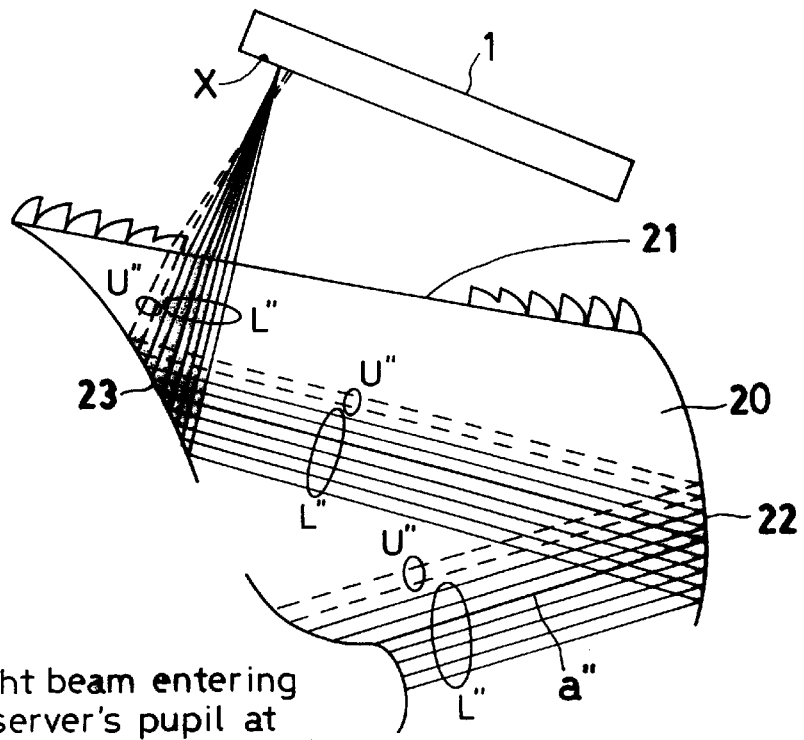
FIG. 45 is a diagram schematically showing the path of a light beam incident on the observer's pupil at a field angle (θ−Δθ).

The description with regard to the vertical direction will be given below more specifically. As shown in FIG. 42, of light rays from the center of the exit pupil 25, a light ray a of field angle (angle of incidence on the observer's pupil) θ is a ray emanating from the most peripheral portion of the display area of the LCD 1 when the Fresnel lens 14 is not added. Let us assume that an area to which a power is newly added by providing the Fresnel lens 14 is an area through which light rays corresponding to a field angle above the principal ray (light ray passing through the center of the exit pupil 25) a of the light beam of field angle θpass. The field angle (θ+Δθ) is a field angle above the field angle θ by Δθ. The field angle (θ−Δθ) is a field angle below the field angle θ by Δθ. Although only the principal ray a of field angle θ, the principal ray a' of field angle (θ+Δθ) and the principal ray a" of field angle (θ−Δθ) are depicted in FIG. 42, each light beam has a beam diameter (4 millimeters in general) corresponding to a bundle of light rays actually entering the observer's pupil. FIGS. 43, 44 and 45 schematically show the paths of light beams entering the observer's pupil at respective field angles θ, (θ+Δθ) and (θ−Δθ).

FIG. 43 illustrates an optical ray trace when the angle of incidence on the observer's eye, that is, the field angle, is θ. Referring to the figure, the Fresnel lens 14 is provided so that, in the backward ray tracing from the exit pupil 25 to the image display device 1, the principal ray a of a light beam of field angle θ which has a certain beam diameter reaches the edge X of the display area of the LCD 1. It should be noted that the principal ray a is herein defined as a light ray passing through the center of the exit pupil 25.

By virtue of the presence of the Fresnel lens 14 at the above-described position, a ray bundle U above the principal ray a in the exit pupil is subjected to the action of the Fresnel lens 14, whereas a ray bundle L below the principal ray a is not subjected to the action of the Fresnel lens 14. The lower ray bundle L converges to form an image on the edge X of the LCD 1, and the upper ray bundle U reaches a position closer to the enter than the edge X of the LCD 1. Accordingly, a portion of the image that corresponds to the field angle θ is formed in such a way that about 50% of that portion of the image is formed by information from the edge X of the LCD 1, and the remainder is formed by false information from a position other than the edge X of the LCD 1. Therefore, a half of this portion of the image is not forming an image. In other words, when observed, the image corresponding to the field angle θ appears in such a way that a half of it is blurred.

FIG. 44 illustrates an optical ray trace when the angle of incidence on the observer's eye, that is, the field angle, is (θ+Δθ). In the figure, an upper ray group U' including the principal ray a' is subjected to the action of the Fresnel lens 14, whereas a lower ray group L' is not subjected to the action of the Fresnel lens 14. In this case, the principal ray a' reaches the edge X of the LCD 1. Light rays above the principal ray a' which are subjected to the action of the Fresnel lens 14 reach a position closer to the center than the edge X of the LCD 1. Light rays below the principal ray a' do not reach the display area of the LCD 1 whether or not the light rays pass through the Fresnel lens 14. The reason for this is as follows: When the Fresnel lens 14 is not present, the light rays of this field angle reach a position outside the display area of the image display device 1, that is, in an area where no image is present when the image is seen, according to the backward ray tracing from the eye. Therefore, the light rays do not reach the display area of the LDC 1 unless they pass through the Fresnel lens 14. Further, the Fresnel lens 14 has a power distribution so set that the principal rays of field angles above θ reach the most peripheral portion of the LCD 1. Therefore, even if light rays pass through the Fresnel lens 14, at the field angle of (θ+Δθ) discussed herein, light rays below the principal ray a' pass through a portion of the Fresnel lens 14 that has a power too small for the light rays to reach the display area of the LCD 1, and do not reach the display area of the LCD 1. Accordingly, the light rays shown by the dotted lines in FIG. 44 are not present. This means the reduction in the quantity of light, which has been described above by using FIGS. 23 and 24. The image at a position corresponding to the field angle (θ+Δθ) appears in such a way that most of it is blurred.

FIG. 45 illustrates an optical ray trace when the angle of incidence on the observer's eye, that is, the field angle, is (θ−Δθ). In the figure, an upper ray group U" is subjected to the action of the Fresnel lens 14, whereas a lower ray group L", including the principal ray a" is not subjected to the action of the Fresnel lens 14. In this case, the principal ray a" reaches a point inside the edge X of the LCD 1. The reason for this is as follows: The principal ray a of field angle θ reaches the edge X of the LCD 1; therefore, a light ray of smaller field angle than θ reaches a point inside the edge X of the LCD 1 if it is not subjected to any action. The upper ray group U", which is subjected to the action of the Fresnel lens 14, reaches a position closer to the center than the arrival position of the principal ray a". The lower ray group L", which does not pass through the Fresnel lens 14, reaches the arrival position of the principal ray a" on the LCD 1. Accordingly, when the image corresponding to the field angle (θ−Δθ) enters the eye, the greater part of the image consists of information from the arrival position of the principal ray a" on the LCD 1, and the remainder of the image consists of information from a position slightly different from the arrival position of the principal ray a". In other words, the image appears to be slightly blurred.

Thus, it is possible to produce an image which is gradually blurred as the distance from the center of the image increases toward the periphery thereof.

Moreover, an image that extends over only the field angle θ is the Fresnel lens 14 is not present can be led to the eye, including light beams of field angles larger than θ, by the addition of the Fresnel lens 14. That is, an image is present at the periphery of the image of field angle θ. In other words, the projected image gives the impression that the field angle seems to have enlarged. More specifically, the impression of the projected image differs according to whether or not an image is present (light is led to the observer's pupil) at the periphery of the displayed image field whether blurred or resolved. The observer mostly gazes at the central portion of the image field. Therefore, the observer has the impression that the image extends to the additional image at the periphery of the image field as long as the resolution of the peripheral image is disregarded. Further, if the image is gradually blurred as the distance from the center of the image increases toward the periphery thereof, the conditions of the image become close to those of the actual visual field of a human being, in which the resolution gradually degrades as the distance from the center of the visual field increases toward the periphery thereof. Accordingly, the observer can enjoy viewing images under even more natural conditions.

Regarding the reduction of the light quantity, the discussion given using FIGS. 23 and 24 also applies in this case.

The way in which the image is blurred is determined by the position of the Fresnel lens 14, that is, the position at which the action of the Fresnel lens 14 begins, and the distribution of refracting power. In other words, the condition of blur of the image is determined by the position on the LCD 1 of light beams at which the action of the Fresnel lens 14 begins to work and the intensity of the applied action. In this regard also, the description given in Example 10 applies to this example.

Although in the foregoing description the distribution of refracting power is so set that the principal ray at each field angle that passes through the center of the pupil reaches the edge of the LCD because the sensitivity is generally high at the pupil center, it should be noted that the refracting power distribution may be changed according to the desired way of blurring the image.

As has been described above with reference to FIGS. 24 and 27, the naturalness of the way in which the light quantity of the peripheral image reduces and the extent of the good image-formation area are in a trade-off relationship to each other. In other words, if the way in which the light quantity of the peripheral image reduces is made natural, the good image-formation area narrows. Therefore, it is important to optimize the position of the Fresnel lens 14 and the refracting power distribution according to each particular case.

Although in the foregoing only the upper side in the YZ-plane has been discussed, the same discussion can be applied to the lower side in the YZ-plane and also to the XY-plane.

It should be noted that in Examples 1 to 13 peripheral light rays are bent at a position in the vicinity of an element having the principal refracting power in the optical system or a position close to the observer's eyeball E, whereas in Example 14 light rays are bent at a position relatively close to the image display device 1, which is an object plane. Accordingly, in Example 14 the fringes (grooves) of the Fresnel lens 14 may be undesirably seen because the Fresnel lens surface lies at a position close to the object plane. Therefore, it is desirable to set the pitch of the Fresnel lens 14 so fine that the fringes (grooves) cannot readily be recognized, thereby preventing the observed image from appearing unnatural. If the pitch of the Fresnel lens 14 is made fine, the diffractive action is enhanced, and the image is blurred even more naturally.

Figure 46:
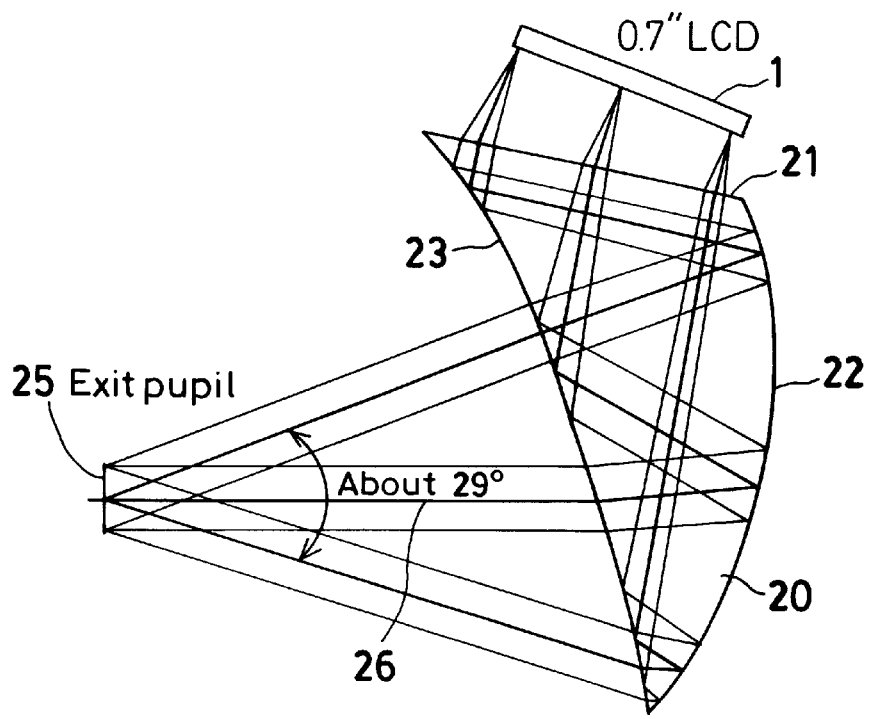
FIG. 46 is a sectional view taken along a YZ-plane, showing an example that uses a 0.7-inch diagonal LCD with an aspect ratio of 4:3.

Next, an example using the actual numerical values will be shown. As shown in FIG. 46, which is a YZ-sectional view, a projection optical system comprises a decentered prism optical system 20 having a focal length of the order of 20 millimeters and including decentered free form surfaces. The optical system 20 has a flat first surface 21 as a surface facing an LCD 1. The eye relief is 28 millimeters, and the distance from the LCD 1 to the flat surface 21 facing the LCD 1, i.e. working distance, is of the order of 5 millimeters. If an LCD 1 having a diagonal length of 0.7 inch and an aspect ratio of 4:3 is used as an image display device 1 under the described conditions, an image having a horizontal field angle of about 38 degrees and a vertical field angle of about 29 degrees can be displayed when no Fresnel lens is present.

Figure 47:
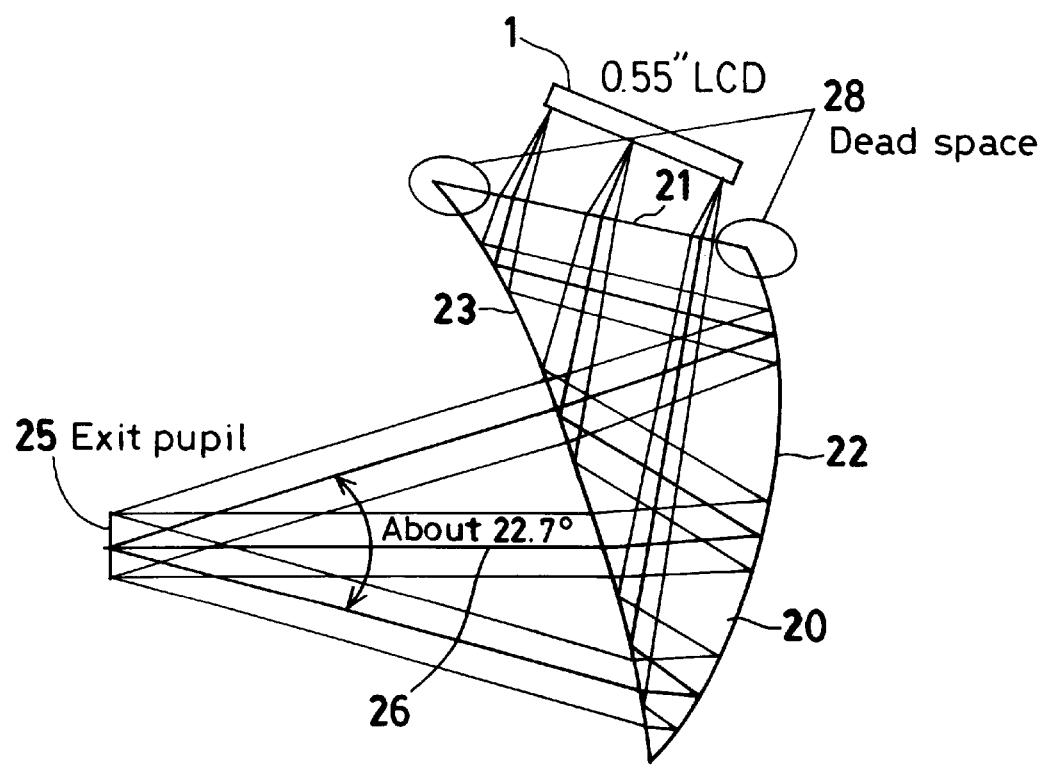
FIG. 47 is a sectional view taken along a YZ-plane, showing an example of FIG. 46 in a case where a 0.55-inch diagonal LCD is used.

If an LCD 1 having a diagonal length of 0.55 inch is used as an image display device 1 as shown in FIG. 47, which is a YZ-sectional view, a dead space 28, where no light rays pass, is produced on the first surface 21. By utilizing the dead space 28, a Fresnel lens 14 according to the present invention is provided on the first surface 21, thereby obtaining an optical system capable of displaying an image which is blurred at the periphery thereof.

Figure 48:
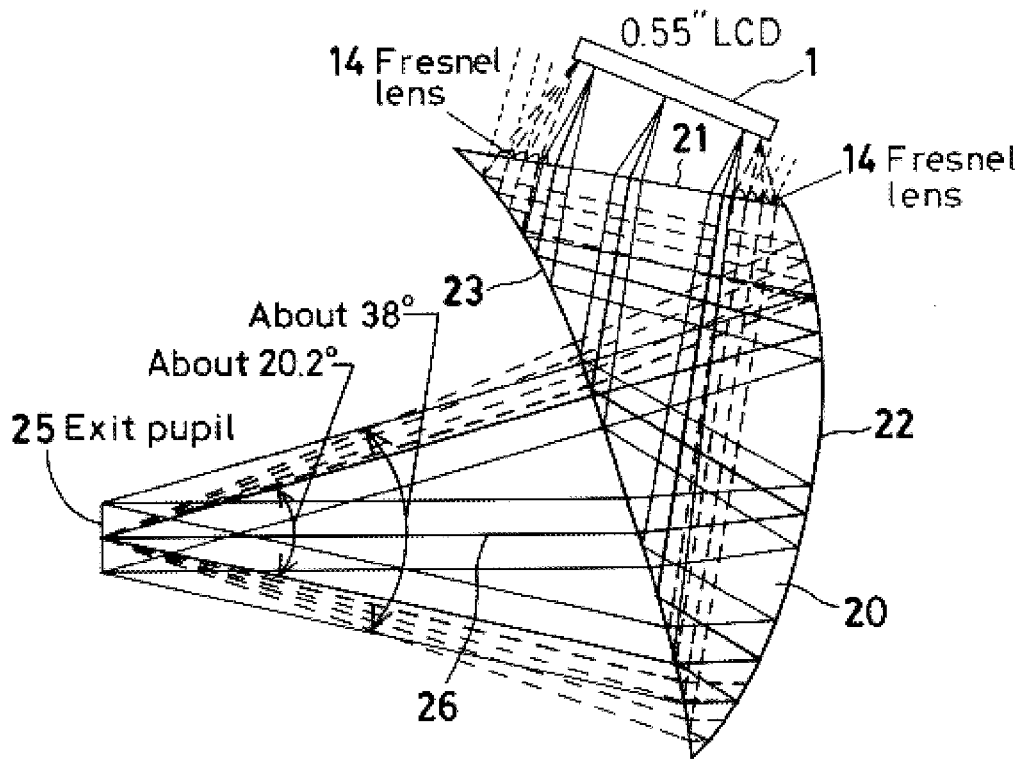
FIG. 48 is a ray diagram illustrating an optical ray trace in the YZ-plane in a case where a Fresnel lens is provided in the arrangement shown in FIG. 47.
Figure 49:
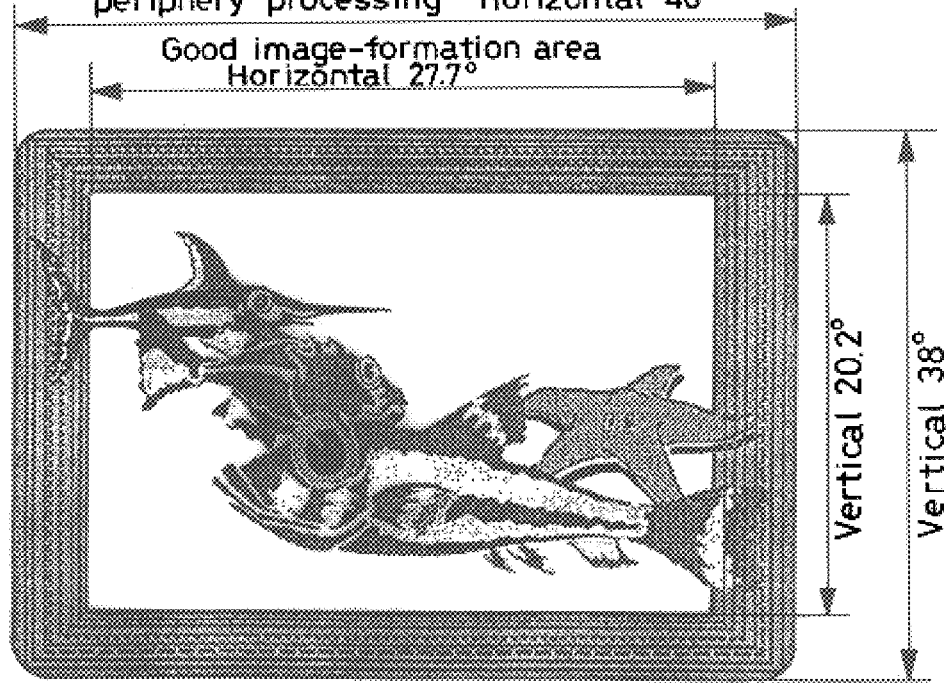
FIG. 49 is a diagram showing the displayed image field obtained in the case of FIG. 48.

If an LCD 1 having a diagonal length of 0.55 inch is used without providing the Fresnel lens 14, an image having a horizontal field angle of about 30 degrees and a vertical field angle of about 22.7 degrees is displayed. By providing the Fresnel lens 14, the image gradually becomes darker as the distance from the center of the image increases toward the periphery thereof. If the Fresnel lens 14 is provided so that the inner edges of the Fresnel lens 14, at which the Fresnel lens action begins, lie at the positions where the principal rays of ±15 degrees in the horizontal field angle and the principal rays of ±11.36 degrees in the vertical field angle pass, respectively, an image having a horizontal field angle of about 46 degrees and a vertical field angle of about 38 degrees is displayed including a blurred image. Accordingly, it becomes possible to display an image giving the impression that the field angle has enlarged effectively. In the displayed image, the good image-formation area, which is only slightly blurred, has a horizontal field angle of about 27.7 degrees and a vertical field angle of about 20.2 degrees. FIG. 48 illustrates an optical ray trace in the YZ-plane of the above-described arrangement, and FIG. 49 shows the condition of the displayed image field.

Thus, the field angle can be effectively enlarged without a change in the size of the optical system by optically processing the periphery of the visual field according to the present invention. Moreover, because the periphery of the field is blurred, an image having high dynamic presence can be displayed.

The table below shows display field angles for the three different diagonal lengths: 0.7 inch; 0.55 inch; and 0.55 inch (with the field periphery processing).

| Diagonal length of image display device | 0.7" | 0.55" | 0.55" (field periphery processing) |
|---|---|---|---|
| Horizontal field angle | 38° | 30° | 46° |
| Vertical field angle | 29° | 22.7° | 38° |

Figure 50:
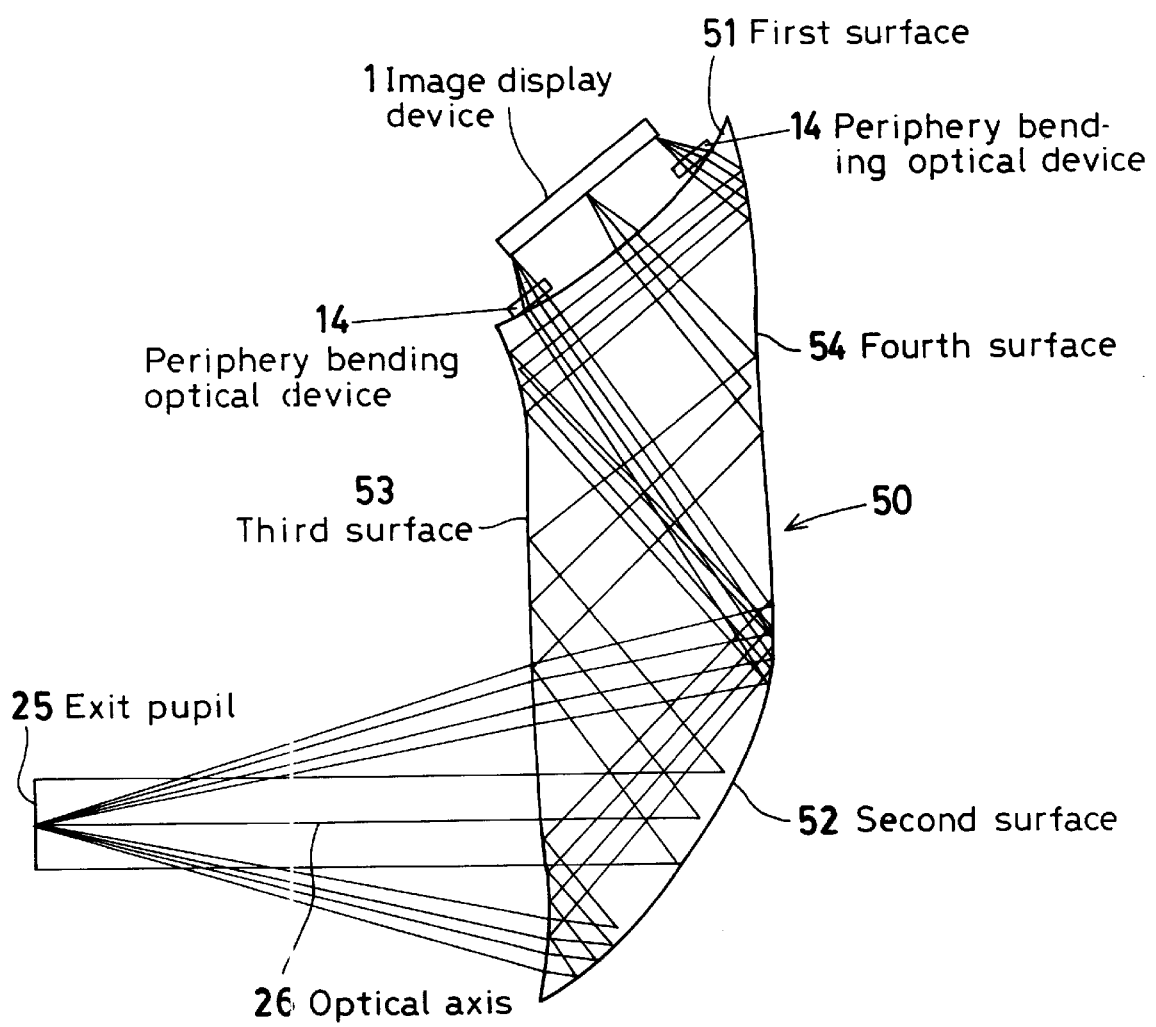
FIG. 50 is a ray diagram showing a modification of the decentered prism optical system used in Example 14.

The periphery bending optical device 14 according to the present invention can be applied not only to the above-described projection optical system comprising the decentered prism optical system 20, which has three surfaces 21, 22 and 23 and performs two internal reflections, but also to a projection optical system comprising a decentered prism optical system which performs three or more internal reflections, e.g. a decentered prism optical system 50 as shown in the ray path diagram of FIG. 50, which has four surfaces 51, 52, 53 and 54 and performs three internal reflections. In the decentered prism optical system 50, shown in FIG. 50, the four surfaces 51, 52, 53 and 54 are decentered with respect to an optical axis 26, and the space formed by the four surfaces is filled with an optically transparent medium having a refractive index larger than 1. Assuming that an entrance surface through which light emitted from an image display device 1 enters the decentered prism optical system 50 is a first surface 51, a reflecting surface on a side of the optical system 50 that is remote from an exit pupil 25 is a second surface 52, a surface which is in close proximity to the exit pupil 25 is a third surface 53, and a reflecting surface disposed between the first surface 51 and the second surface 52 to face the third surface 53 is a fourth surface 54, light rays emitted from the image display device 1 travel along the following path: The light rays enter the decentered prism optical system 50 while being refracted through the first surface 51 and are internally reflected toward the third surface 53 by the fourth surface 54. The reflected rays are internally reflected toward the second surface 52 by the third surface 53. Then, the reflected rays are internally reflected toward the third surface 53 by the second surface 52 and exit from the optical system 50 while being refracted through the third surface 53 to reach the exit pupil 25.

Figure 51:
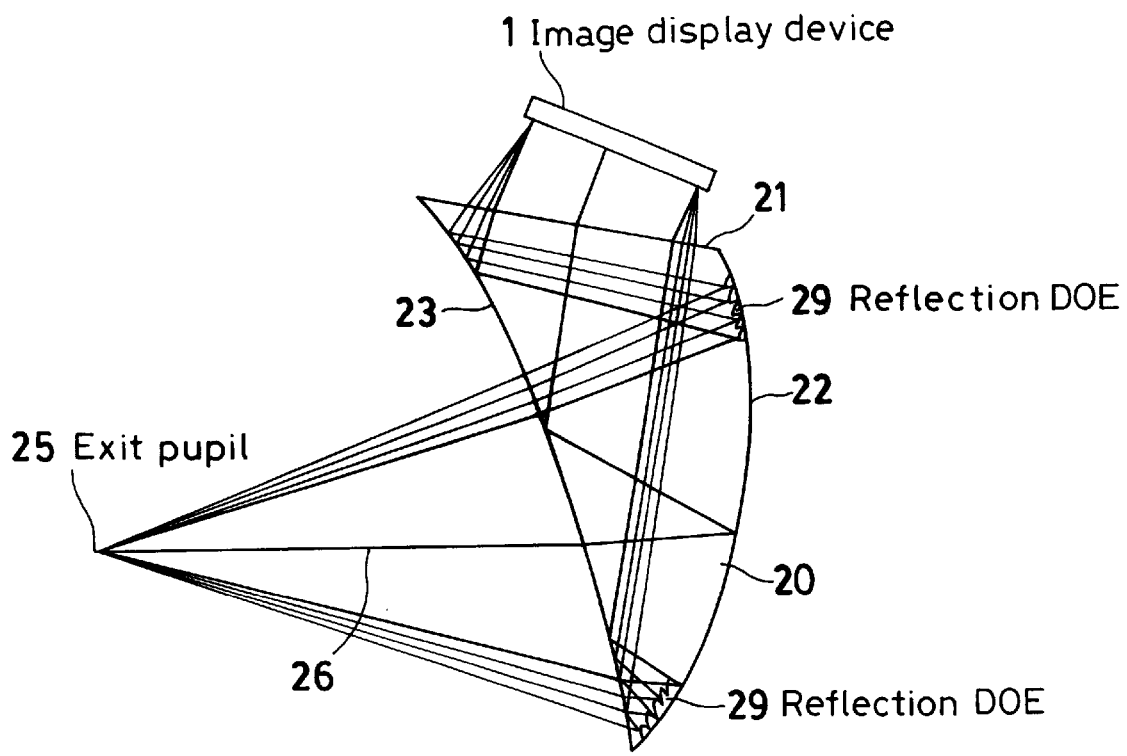
FIG. 51 is a sectional view showing a modification of the image display apparatus according to Example 14.
Figure 52:
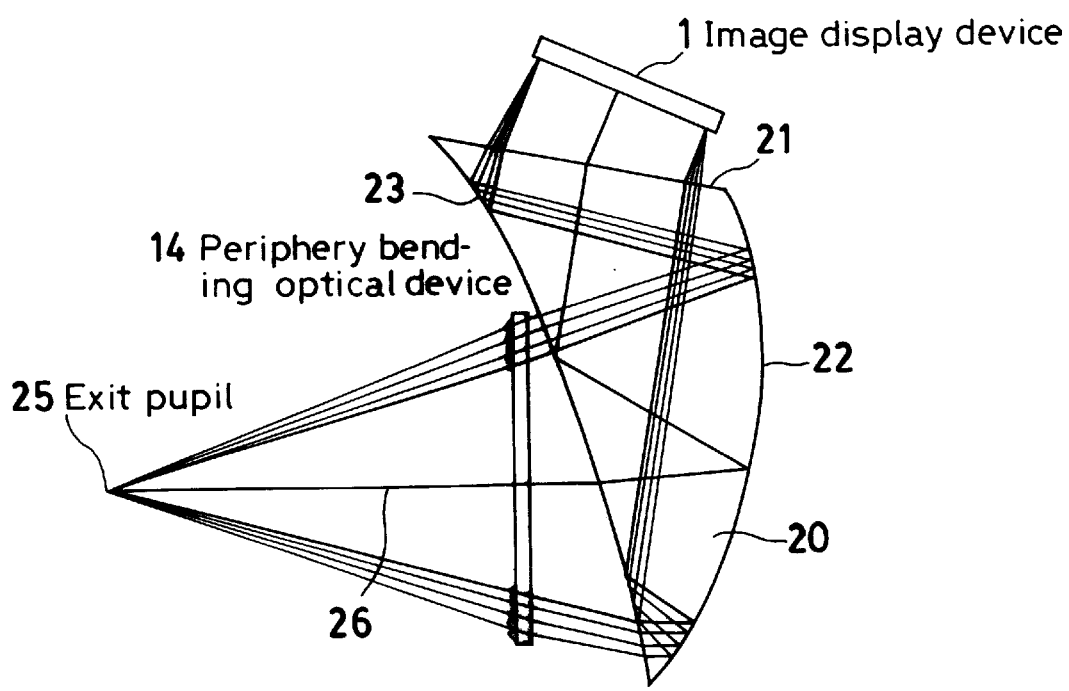
FIG. 52 is a sectional view showing another modification of the image display apparatus according to Example 14.

Thus, the present invention is not necessarily limited to the foregoing examples but can be modified in a variety of ways. For example, as shown in FIG. 51, a reflection DOE (Diffractive Optical Element) 29 may be provided on the peripheral portion of the second surface 22 of the decentered prism optical system 20. As shown in FIG. 52, a periphery bending optical device 14 may be disposed between the third surface 23 of the decentered prism optical system 20 and the observer's eyeball (exit pupil 25). With the arrangements according to these examples also, advantageous effects as detailed above can be obtained.

Next, a numerical example will be described in which a decentered prism optical system 20 as shown in FIG. 38 is used as an ocular optical system. More specifically, the decentered prism optical system 20 has three surfaces 21, 22 and 23 decentered with respect to the optical axis 26. The space formed by the three surfaces is filled with an optically transparent medium having a refractive index larger than 1. The decentered prism optical system 20 is used in a head-mounted image display apparatus, in which light rays emitted from an image display device 1 enter the decentered prism optical system 20 while being refracted through the first surface 21 and are internally reflected toward the second surface 22 by the third surface 23. Then, the reflected rays are internally reflected toward the third surface 23 by the second surface 22 and exit from the optical system 20 while being refracted through the third surface 23 to reach the exit pupil 2, thereby projecting an image displayed by the image display device 1 on the retina in an observer's eyeball through the observer's pupil placed at the exit pupil 25. In this example, a linear Fresnel lens is provided on the first surface 21 as a periphery bending optical device 14.

Figure 53:
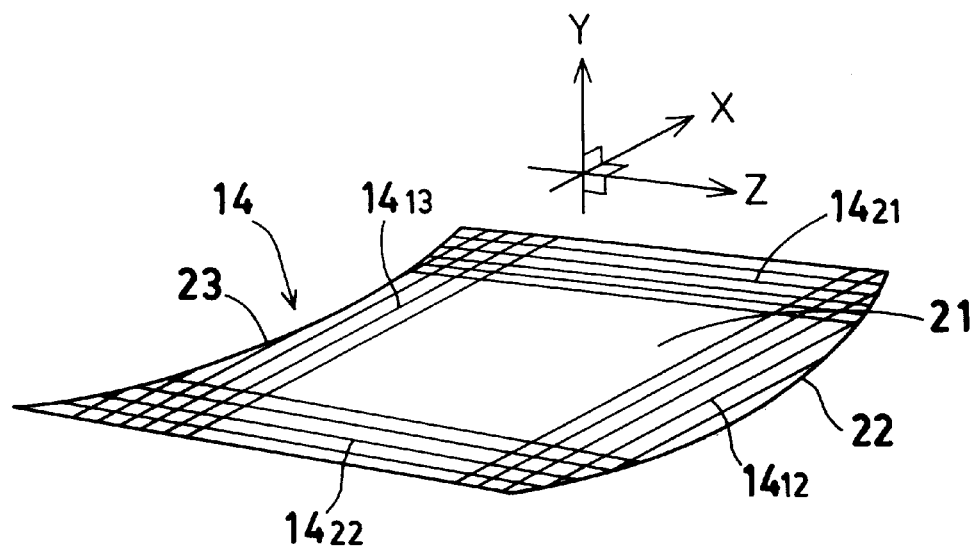
FIG. 53 is a diagram illustrating a linear Fresnel lens in a numerical example of Example 14.

Let us define the liner Fresnel lens provided on the first surface 21 in order to clarify the following description. A coordinate system is defined with regard to the first surface 21 as shown in FIG. 53. Linear Fresnel lenses are provided on the periphery of the first surface 21. More specifically, linear Fresnel lenses $14_{12}$ and $14_{13}$ having grooves extending along the X-axis are provided on both end portions in the Z-axis direction of the first surface 21, and linear Fresnel lenses $14_{21}$ and $14_{22}$ having grooves extending along the Z-axis are provided on both end portions in the X-axis direction of the first surface 21. The linear Fresnel lens $14_{12}$, which is provided on the second surface-side (22) end portion in the Z-axis direction, and the linear Fresnel lens $14_{13}$, which is provided on the third surface-side (23) end portion in the Z-axis direction, are different in arrangement from each other. The linear Fresnel lenses $14_{21}$ and $14_{22}$, which are provided on both end portions in the X-axis direction, have the same arrangement. Therefore, the linear Fresnel lenses $14_{21}$ and $14_{22}$ are hereinafter represented by the linear Fresnel lens $14_{21}$. It should be noted that, in the following numerical example, the linear Fresnel lenses $14_{12}$, $14_{13}$, $14_{21}$ and $14_{22}$ are represented by cylindrical surfaces.

Figure 54:
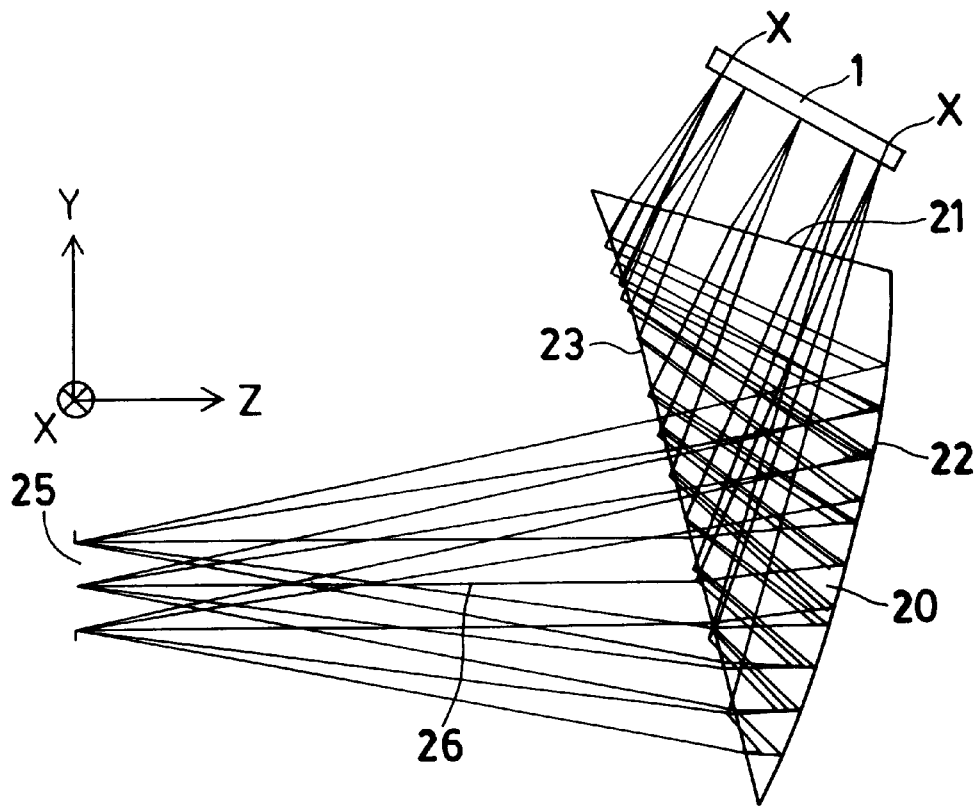
FIG. 54 is a side view of a basic form of a decentered prism optical system in the numerical example of Example 14.

Next, a coordinate system used in the following numerical example will be described. Constituent parameters in the numerical example (described later) are given in the backward ray tracing as shown in FIG. 54. The center of the exit pupil 25 of the decentered prism optical system 20 is defined as the origin of the optical system. An axial principal ray passing through the center (origin) of the exit pupil 25 is defined as an optical axis 26. A direction in which the axial principal ray travels along the optical axis 26 from the exit pupil 25 is defined as a Z-axis direction. A direction extending through the center of the exit pupil 25 perpendicularly to the Z-axis in a plane in which light rays are bent by the decentered prism optical system 20 is defined as a Y-axis direction. A direction extending through the center of the exit pupil 25 perpendicularly to both the Y- and Z-axes is defined as an X-axis direction. A direction in which the Z-axis extends from the exit pupil 25 to the decentered prism optical system 20 is defined as a positive direction of the Z-axis. A direction extending from the optical axis 26 toward the image display device 1 is defined as a positive direction of the Y-axis. A direction in which the X-axis constitutes a right-handed system in combination with the Y- and Z-axes is defined as a positive direction of the X-axis. It should be noted that ray tracing is carried out by backward tracing from the exit pupil 25 of the decentered prism optical system 20, which is defined as the object side, toward the decentered prism optical system 20.

Regarding decentered surfaces, each surface is given displacements in the X-, Y- and Z-axis directions of the vertex position of the surface from the center of the exit pupil 25, which is the origin of the decentered prism optical system 20, and tilt angles of the center axis of the surface [the Z-axes of Eqs. (a), (b) and (c) shown below with respect to free form surfaces and cylindrical surfaces] with respect to the X-, Y- and Z-axes ($\alpha$, $\beta$, and $\gamma(°)$, respectively). In this case, positive $\alpha$ and $\beta$ mean counterclockwise rotation relative to the positive directions of the corresponding axes, and positive $\gamma$ means clockwise rotation relative to the positive direction of the Z-axis. In addition, the radius of curvature of each spherical surface, surface separation, refractive index of each medium, and Abbe's number are given according to the conventional method.

The configuration of a free form surface, which is a rotationally asymmetric surface, is defined by the following equation. The Z-axis of the defining equation is the axis of the rotationally asymmetric surface.

$$Z = \Sigma_n \Sigma_m C_{nm} X^n Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry free form surface (i.e. a free form surface having only one plane of symmetry) is defined by the equation expressing the free form surface, when symmetry produced by the plane of symmetry is to be obtained in the direction X, all terms with odd-numbered powers of X are made zero (for example, the coefficients of the terms with odd-numbered powers of X are set equal to zero). To obtain symmetry produced by the plane of symmetry in the direction Y, all terms with odd-numbered powers of Y are made zero (for example, the coefficients of the terms with odd-numbered powers of Y are set equal to zero).

Assuming that k=7 (polynomial of degree 7), for example, a plane-symmetry free form surface which is symmetric with respect to the direction X is expressed by an expanded form of the above equation as follows:

$$Z = C_2 + \tag{a}$$

-continued $$C_3Y + C_4X +$$

$$C_5Y^2 + C_6YX + C_7X^2 +$$

$$C_8Y^3 + C_9Y^2X + C_{10}YX^2 + C_{11}X^3 +$$

$$C_{12}Y^4 + C_{13}Y^3X + C_{14}Y^2X^2 + C_{15}YX^3 + C_{16}X^4 +$$

$$C_{17}Y^5 + C_{18}Y^4X + C_{19}Y^3X^2 + C_{20}Y^2X^3 +$$

$$C_{21}YX^4 + C_{22}X^5 +$$

$$C_{23}Y^6 + C_{24}Y^5X + C_{25}Y^4X^2 + C_{26}Y^3X^3 +$$

$$C_{27}Y^2X^4 + C_{28}YX^5 + C_{29}X^6 +$$

$$C_{30}Y^7 + C_{31}Y^6X + C_{32}Y^5X^2 + C_{33}Y^4X^3 +$$

$$C_{34}Y^3X^4 + C_{35}Y^2X^5 + C_{36}YX^6 + C_{37}X^7$$

In the above defining Eq.(a), the coefficients $C_4$, $C_6$, $C_9$, ... of the terms with odd-numbered powers of X are set equal to zero (see the numerical example described later). It should be noted that coefficients concerning aspherical surfaces which are not shown in the constituent parameters (shown later) are zero.

The configuration of a cylindrical surface (linear Fresnel lens) $14_{21}$ having a generator along the Z-axis is defined by the following equation. The Z-axis of the defining equation is the axis of the cylindrical surface.

$$Z=(X^2/R_x)/[1+\{1-(1+K)(X^2/R^2)\}^{1/2}]+A_4X^4+A_6X^6+A_8X^8+A_{10}X^{10} \quad (c)$$

where X is a direction perpendicular to Z; $R_x$ is a paraxial curvature radius in a section perpendicular to the generator; P is a conical coefficient; and $A_4$, $A_6$, $A_8$, and $A_{10}$ are aspherical coefficients, respectively.

The configuration of each of cylindrical surfaces (linear Fresnel lenses) $14_{12}$ and $14_{13}$ having a generator along the X-axis is defined by the following equation. The Z-axis of the defining equation is the axis of the cylindrical surface.

$$Z=(Y^2/R_y)/[1+\{1-P(Y^2/R^2)\}^{1/2}]+A_4Y^4+A_6Y^6+A_8Y^8+A_{10}Y^{10} \quad (b)$$

where Y is a direction perpendicular to Z; $R_y$ is a paraxial curvature radius in a section perpendicular to the generator; P is a conical coefficient; and $A_4$, $A_6$, $A_8$, and $A_{10}$ are aspherical coefficients, respectively.

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

Figure 55:
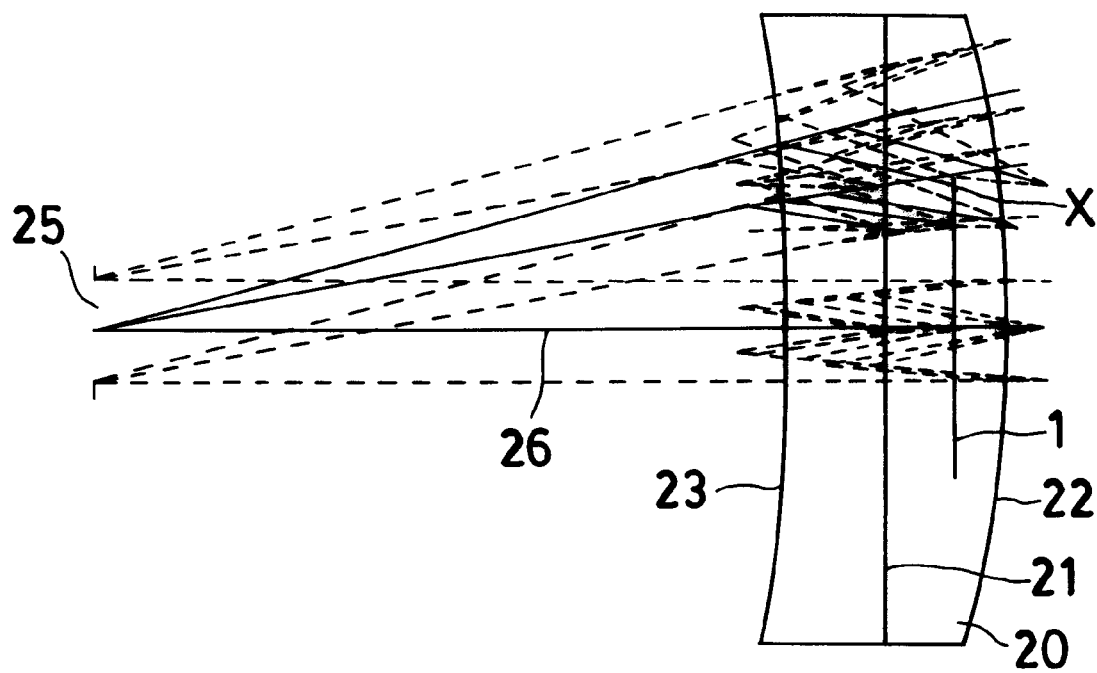
FIG. 55 is a plan view of the basic form of the decentered prism optical system in the numerical example of Example 14.

FIG. 54 is a side view of the basic form of the decentered prism optical system 20 according to the above-described numerical example before the linear Fresnel lenses $14_{21}$, $14_{12}$ and $14_{13}$ are provided, as seen from a direction along the X-axis. FIG. 55 is a plan view of the decentered prism optical system 20 as seen from a direction opposite to the Y-axis, which illustrates optical paths. Numerical data concerning the decentered prism optical system 20 will be shown later as basic numerical data. The decentered prism optical system 20 has three surfaces 21, 22 and 23. The space formed by the three surfaces 21, 22 and 23 is filled with a transparent medium having a refractive index larger than 1. A bundle of light rays emanating from an object (not shown) travels along the optical axis 26 and passes through the exit pupil 25 of the decentered prism optical system 20. Then, the light rays enter the decentered prism optical system 20 through the third surface 23, which has both transmitting and reflecting actions. The incident rays are reflected toward the exit pupil 25 by the second surface 22, which is a reflecting surface having only a reflecting action and disposed on a side of the optical system 20 that is remote from the exit pupil 25. The reflected rays are reflected away from the exit pupil 25 by the third surface 23. The reflected rays pass through the first surface 21, which has only a transmitting action, and reach the display surface of the image display device 1, which is disposed at the position of the image plane. It should be noted that reference character X in the figures denotes the edges of the display area of the image display device 1. The first surface 21 is a flat surface, and the second and third surfaces 22 and 23 are free form surfaces defined by Eq.(a). As the image display device 1, an LCD 1 having a diagonal length of 0.55 inch is used as stated above. Thus, an image having a horizontal field angle of about 30 degrees and a vertical field angle of about 22.7 degrees is displayed.

Figure 56:
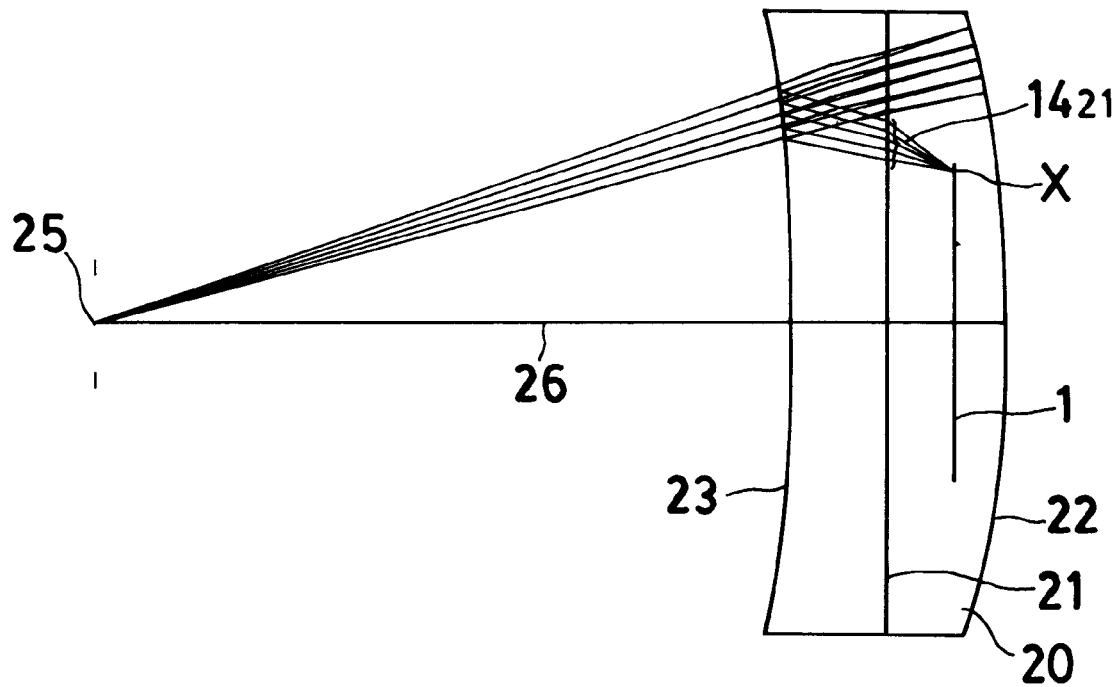
FIG. 56 is a plan view showing the optical path of a light beam passing through the linear Fresnel lens at the left edge of the decentered prism optical system in the numerical example of Example 14.

FIG. 56 is a plan view of the decentered prism optical system 20 according to the above-described numerical example, as seen from a direction opposite to the Y-axis, which illustrates the optical path of a light beam passing through the center of the exit pupil 25 of the optical system 20 and further passing through the linear Fresnel lens (cylindrical surface) $14_{21}$ provided on the first surface 21. Numerical data in backward ray tracing concerning light rays traveling along the optical path illustrated in FIG. 56 will be shown later as left edge numerical data. In this case, light rays at a leftward (+X direction) field angle of 15 degrees or more reach the edge X of the display area of the LCD 1.

Figure 57:
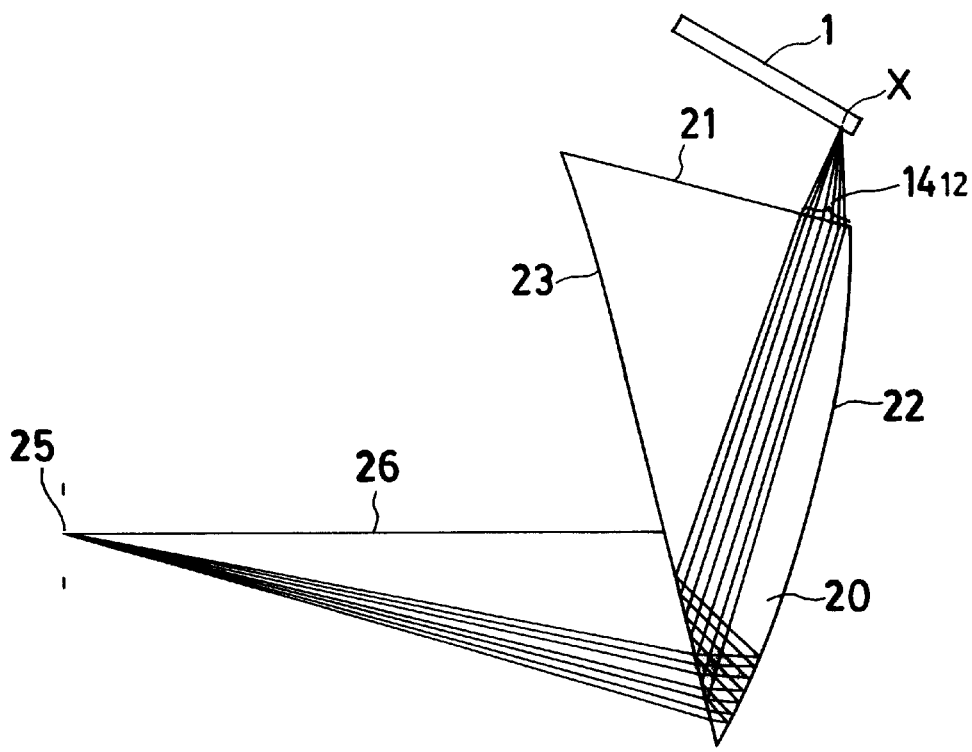
FIG. 57 is a side view showing the optical path of a light beam passing through the linear Fresnel lens at the lower edge of the decentered prism optical system in the numerical example of Example 14.

FIG. 57 is a side view of the decentered prism optical system 20 according to the above-described numerical example, as seen from a direction along the X-axis, which illustrates the optical path of a light beam passing through the center of the exit pupil 25 of the optical system 20 and further passing through the linear Fresnel lens (cylindrical surface) $14_{12}$ provided on the first surface 21. Numerical data in backward ray tracing concerning light rays traveling along the optical path illustrated in FIG. 57 will be shown later as lower edge numerical data. In this case, light rays at a downward (-Y direction) field angle of 11.36 degrees or more reach the edge X of the display area of the LCD 1.

Figure 58:
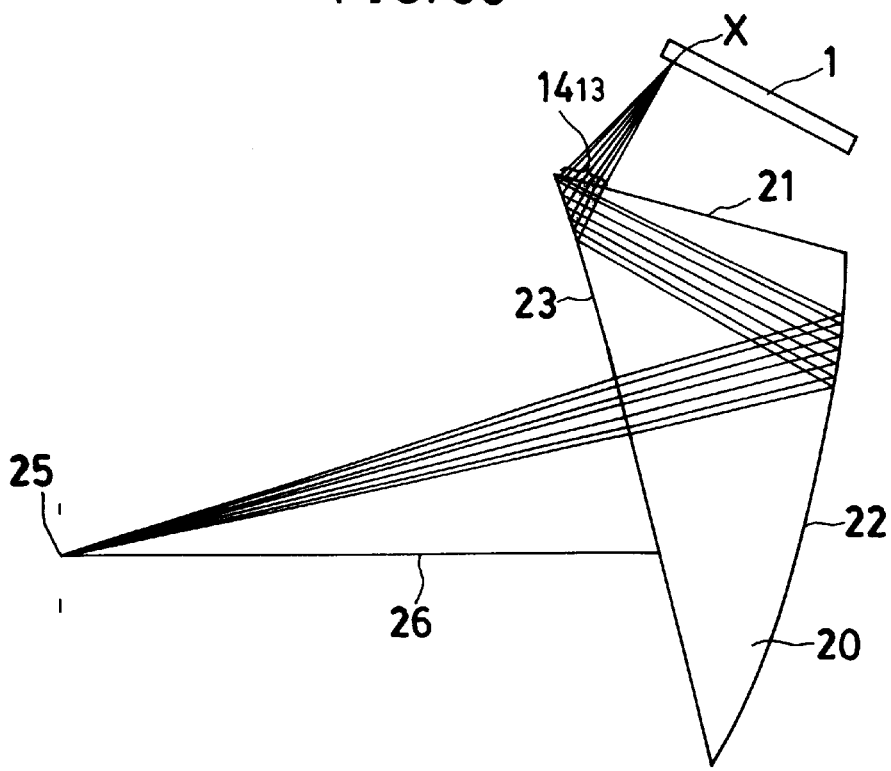
FIG. 58 is a side view showing the optical path of a light beam passing through the linear Fresnel lens at the upper edge of the decentered prism optical system in the numerical example of Example 14.

FIG. 58 is a side view of the decentered prism optical system 20 according to the above-described numerical example, as seen from a direction along the X-axis, which illustrates the optical path of a light beam passing through the center of the exit pupil 25 of the optical system 20 and further passing through the linear Fresnel lens (cylindrical surface) $14_{13}$ provided on the first surface 21. Numerical data in backward ray tracing concerning light rays traveling along the optical path illustrated in FIG. 58 will be shown later as upper edge numerical data. In this case, light rays at a upward (+Y direction) field angle of 11.36 degrees or more reach the edge X of the display area of the LCD 1.

The basic numerical data, left edge numerical data, lower edge numerical data and upper edge numerical data are shown below. In each data, a rotationally asymmetric surface is denoted by FFS (Free Form Surface).

Basic Numerical Data

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | ∞ | | (3) | | |
| Image plane | ∞ | | (4) | | |

FFS[1]

$C_5$ −2.2539 × 10⁻³  $C_7$ −4.7615 × 10⁻³  $C_8$ −6.8111 × 10⁻⁵
$C_{10}$ −7.4284 × 10⁻⁵  $C_{12}$ 9.0073 × 10⁻⁷  $C_{14}$ −9.9240 × 10⁻⁶
$C_{16}$ −1.4950 × 10⁻⁵  $C_{17}$ 6.0486 × 10⁻⁸  $C_{19}$ −2.3396 × 10⁻⁷
$C_{21}$ −6.4039 × 10⁻⁷

FFS[2]

$C_5$ −9.1711 × 10⁻³  $C_7$ −1.1006 × 10⁻²  $C_8$ −2.9533 × 10⁻⁵
$C_{10}$ 7.4822 × 10⁻⁶  $C_{12}$ 8.0184 × 10⁻⁷  $C_{14}$ −6.1788 × 10⁻⁶
$C_{16}$ −5.5257 × 10⁻⁶  $C_{17}$ −6.5900 × 10⁻⁸  $C_{19}$ 6.4109 × 10⁻⁸
$C_{21}$ 5.6308 × 10⁻⁸

Displacement and tilt(1)

X 0.000  Y 7.060  Z 27.143
α 14.55  β 0.00  γ 0.00

Displacement and tilt(2)

X 0.000  Y 0.532  Z 35.732
α −16.40  β 0.00  γ 0.00

Displacement and tilt(3)

X 0.000  Y 15.845  Z 30.993
α 74.99  β 0.00  γ 0.00

Displacement and tilt(4)

X 0.000  Y 20.969  Z 33.716
α 61.01  β 0.00  γ 0.00

Left Edge Numerical Data

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | $R_x$ 4.87015 $R_y$ ∞ (Cylindrical Surface) | | (3) | | |
| Image plane | ∞ | | (4) | | |

FFS[1]

$C_5$ −2.2539 × 10⁻³  $C_7$ −4.7615 × 10⁻³  $C_8$ −6.8111 × 10⁻⁵
$C_{10}$ −7.4284 × 10⁻⁵  $C_{12}$ 9.0073 × 10⁻⁷  $C_{14}$ −9.9240 × 10⁻⁶
$C_{16}$ −1.4950 × 10⁻⁵  $C_{17}$ 6.0486 × 10⁻⁸  $C_{19}$ −2.3396 × 10⁻⁷
$C_{21}$ −6.4039 × 10⁻⁷

FFS[2]

$C_5$ −9.1711 × 10⁻³  $C_7$ −1.1006 × 10⁻²  $C_8$ −2.9533 × 10⁻⁵
$C_{10}$ 7.4822 × 10⁻⁶  $C_{12}$ 8.0184 × 10⁻⁷  $C_{14}$ −6.1788 × 10⁻⁶
$C_{16}$ −5.5257 × 10⁻⁶  $C_{17}$ −6.5900 × 10⁻⁸  $C_{19}$ 6.4109 × 10⁻⁸
$C_{21}$ 5.6308 × 10⁻⁸

Aspherical Coefficients

Surface No.: 5

K = −1.000000
$A_4$ = −0.102281 × 10⁻²
$A_6$ = −0.137911 × 10⁻⁴
$A_8$ = 0.238680 × 10⁻⁶
$A_{10}$ = −0.912822 × 10⁻⁹

Displacement and tilt(1)

X 0.000  Y 7.060  Z 27.143
α 14.55  β 0.00  γ 0.00

Displacement and tilt(2)

X 0.000  Y 0.532  Z 35.732
α −16.40  β 0.00  γ 0.00

Displacement and tilt(3)

X 0.000  Y 15.845  Z 30.993
α 74.99  β 0.00  γ 0.00

Displacement and tilt(4)

X 0.000  Y 20.969  Z 33.716
α 61.01  β 0.00  γ 0.00

Lower Edge Numerical Data

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | $R_x$ ∞ $R_y$ 3.17947 (Cylindrical Surface) | | (3) | | |
| Image plane | ∞ | | (4) | | |

FFS[1]

$C_5$ −2.2539 × 10⁻³  $C_7$ −4.7615 × 10⁻³  $C_8$ −6.8111 × 10⁻⁵
$C_{10}$ −7.4284 × 10⁻⁵  $C_{12}$ 9.0073 × 10⁻⁷  $C_{14}$ −9.9240 × 10⁻⁶
$C_{16}$ −1.4950 × 10⁻⁵  $C_{17}$ 6.0486 × 10⁻⁸  $C_{19}$ −2.3396 × 10⁻⁷
$C_{21}$ −6.4039 × 10⁻⁷

FFS[2]

$C_5$ −9.1711 × 10⁻³  $C_7$ −1.1006 × 10⁻²  $C_8$ −2.9533 × 10⁻⁵
$C_{10}$ 7.4822 × 10⁻⁶  $C_{12}$ 8.0184 × 10⁻⁷  $C_{14}$ −6.1788 × 10⁻⁶
$C_{16}$ −5.5257 × 10⁻⁶  $C_{17}$ −6.5900 × 10⁻⁸  $C_{19}$ 6.4109 × 10⁻⁸
$C_{21}$ 5.6308 × 10⁻⁸

Aspherical Coefficients

Surface No.: 5

K = −1.000000
$A_4$ = −0.492120 × 10⁻²
$A_6$ = 0.632099 × 10⁻⁴
$A_8$ = −0.601587 × 10⁻⁶
$A_{10}$ = 0.362703 × 10⁻⁸

Displacement and tilt(1)

X 0.000  Y 7.060  Z 27.143
α 14.55  β 0.00  γ 0.00

Displacement and tilt(2)

X 0.000  Y 0.532  Z 35.732
α −16.40  β 0.00  γ 0.00

Displacement and tilt(3)

X 0.000  Y 15.845  Z 30.993
α 74.99  β 0.00  γ 0.00

Displacement and tilt(4)

X 0.000  Y 20.969  Z 33.716
α 61.01  β 0.00  γ 0.00

Upper Edge Numerical Data

| Surface No. | Radius of curvature | Surface separation | Displacement and tilt | Refractive index | Abbe's No. |
|---|---|---|---|---|---|

-continued

| Object plane | ∞ | -1000.00 | | | |
|---|---|---|---|---|---|
| 1 | ∞(Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | $R_x$ ∞ | | (3) | | |
| | $R_y$ 3.54363 (Cylindrical Surface) | | | | |
| Image plane | ∞ | | (4) | | |

FFS[1]

| | | | | | |
|---|---|---|---|---|---|
| $C_5$ | $-2.2539 \times 10^{-3}$ | $C_7$ | $-4.7615 \times 10^{-3}$ | $C_8$ | $-6.8111 \times 10^{-5}$ |
| $C_{10}$ | $-7.4284 \times 10^{-5}$ | $C_{12}$ | $9.0073 \times 10^{-7}$ | $C_{14}$ | $-9.9240 \times 10^{-6}$ |
| $C_{16}$ | $-1.4950 \times 10^{-5}$ | $C_{17}$ | $6.0486 \times 10^{-8}$ | $C_{19}$ | $-2.3396 \times 10^{-7}$ |
| $C_{21}$ | $-6.4039 \times 10^{-7}$ | | | | |

FFS[2]

| | | | | | |
|---|---|---|---|---|---|
| $C_5$ | $-9.1711 \times 10^{-3}$ | $C_7$ | $-1.1006 \times 10^{-2}$ | $C_8$ | $-2.9533 \times 10^{-5}$ |
| $C_{10}$ | $7.4822 \times 10^{-6}$ | $C_{12}$ | $8.0184 \times 10^{-7}$ | $C_{14}$ | $-6.1788 \times 10^{-6}$ |
| $C_{16}$ | $-5.5257 \times 10^{-6}$ | $C_{17}$ | $-6.5900 \times 10^{-8}$ | $C_{19}$ | $6.4109 \times 10^{-8}$ |
| $C_{21}$ | $5.6308 \times 10^{-8}$ | | | | |

Aspherical Coefficients

Surface No.: 5

$K = -1.000000$
$A_4 = -0.484716 \times 10^{-2}$
$A_6 = 0.692953 \times 10^{-4}$
$A_8 = -0.456325 \times 10^{-6}$
$A_{10} = 0.971400 \times 10^{-9}$ Displacement and tilt(1)

| X 0.000 | Y 7.060 | Z 27.143 |
|---|---|---|
| α 14.55 | β 0.00 | γ 0.00 |

Displacement and tilt(2)

| X 0.000 | Y 0.532 | Z 35.732 |
|---|---|---|
| α −16.40 | β 0.00 | γ 0.00 |

Displacement and tilt(3)

| X 0.000 | Y 15.845 | Z 30.993 |
|---|---|---|
| α 74.99 | β 0.00 | γ 0.00 |

Displacement and tilt(4)

| X 0.000 | Y 20.969 | Z 33.716 |
|---|---|---|
| α 61.01 | β 0.00 | γ 0.00 |

Incidentally, it is possible to construct a head-mounted image display apparatus for a single eye by preparing any one of the foregoing image display apparatuses according to the present invention. Alternatively, it is possible to construct a head-mounted image display apparatus for both eyes by preparing a pair of image display apparatuses according to the present invention for the left and right eyes, and supporting them apart from each other by the interpupillary distance, i.e. the distance between the two eyes. In this way, it is possible to form a stationary or portable image display apparatus which enables the observer to see with a single eye or both eyes.

Figure 59:
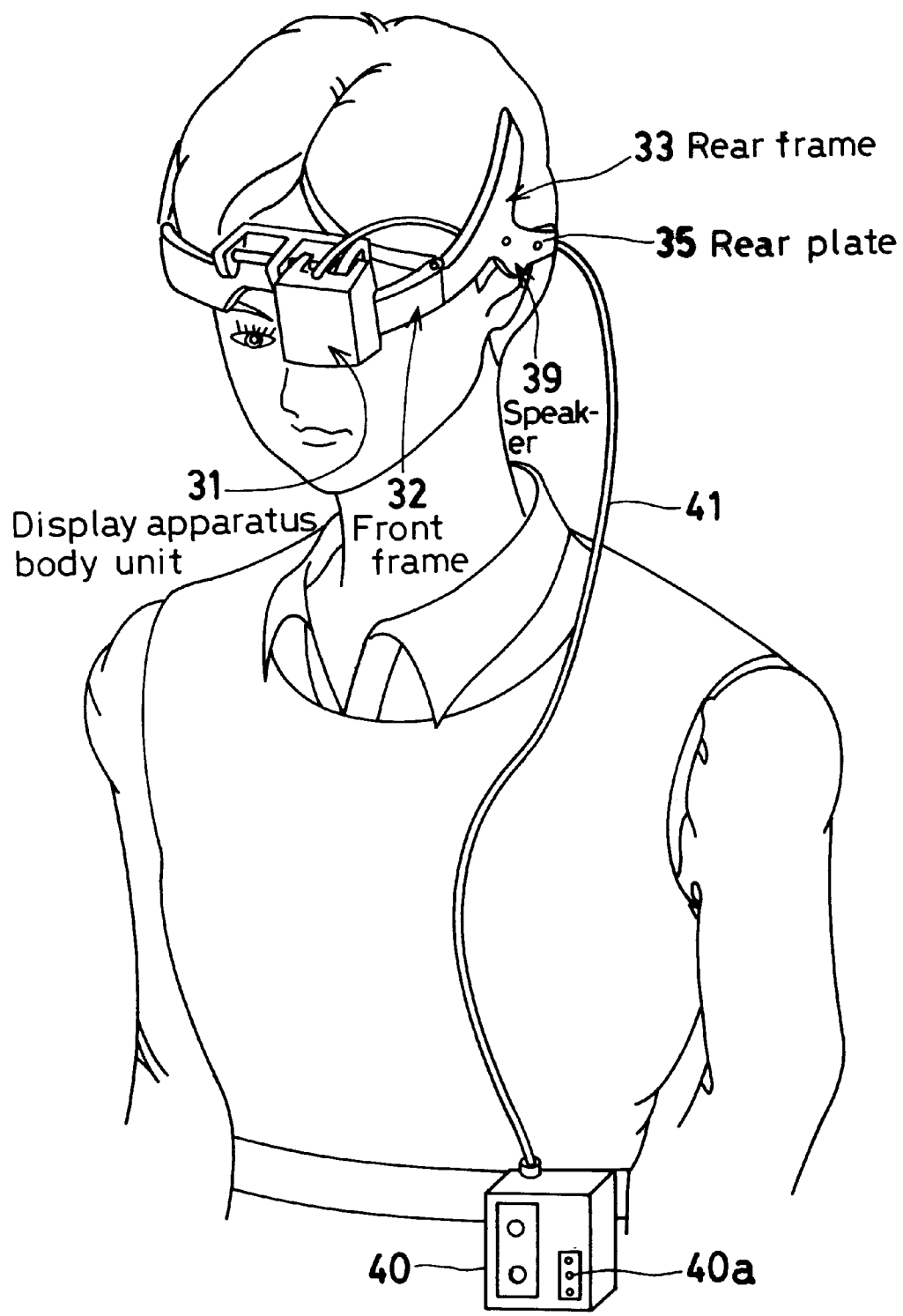
FIG. 59 is a diagram showing an image display apparatus according to the present invention as arranged in the form of a system for a single eye.
Figure 60:
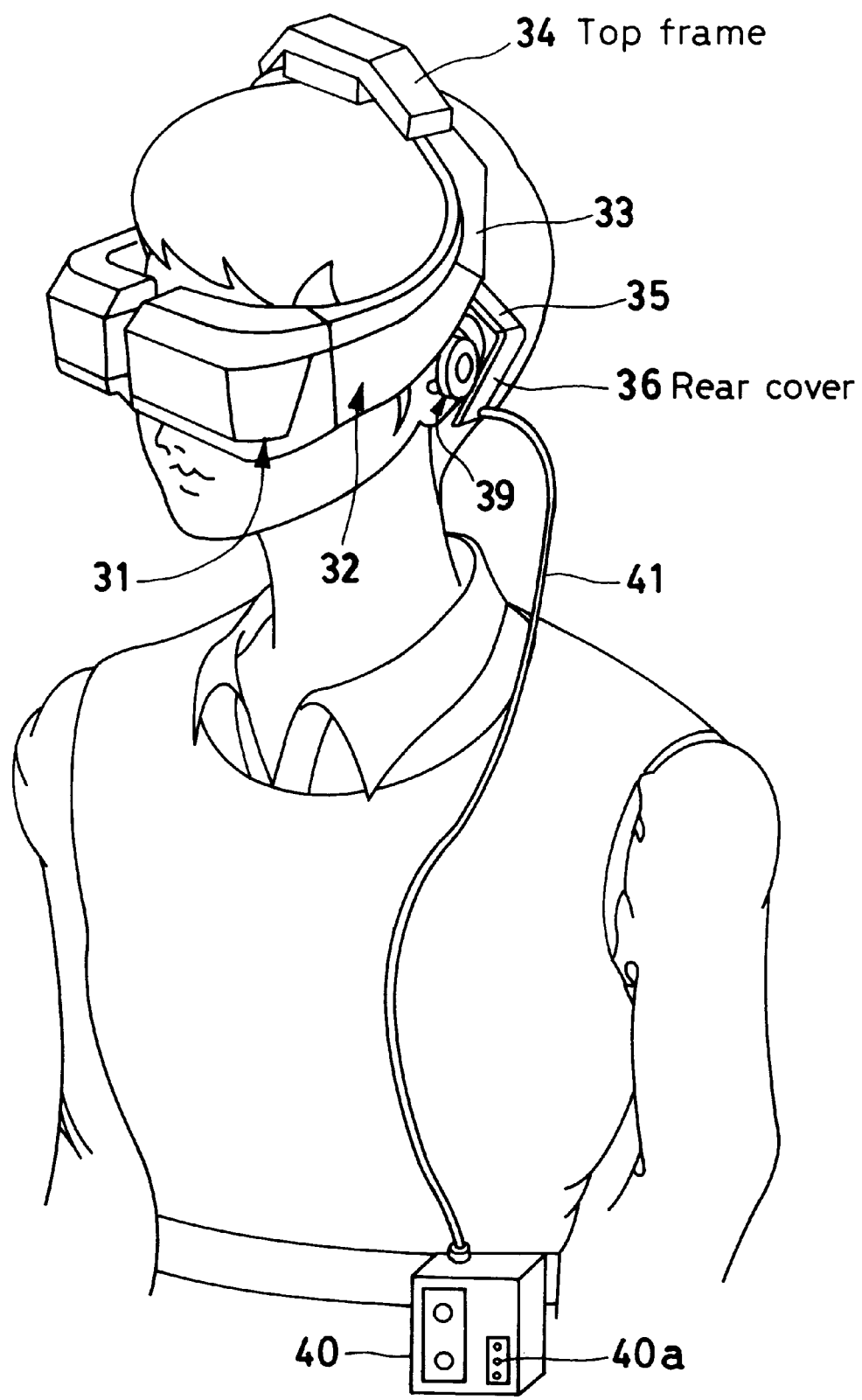
FIG. 60 is a diagram showing an image display apparatus according to the present invention as arranged in the form of a system for both eyes.

FIG. 59 shows an image display apparatus designed for a single eye (in this case, the apparatus is designed for the left eye), and FIG. 60 shows an image display apparatus designed for both eyes. In FIGS. 59 and 60, reference numeral 31 denotes a display apparatus body unit. In the case of FIG. 59, the display apparatus body unit 31 is supported by a support member through the observer's head such that the display apparatus body unit 31 is held in front of the observer's left eye. In the case of FIG. 60, the display apparatus body unit 31 is supported by a support member through the observer's head such that the display apparatus body unit 31 is held in front of both the observer's eyes. The support member has a pair of left and right front frames 32 each joined at one end thereof to the display apparatus body unit 31. The left and right front frames 32 extend from the observer's temples to the upper portions of his/her ears, respectively. A pair of left and right rear frames 33 are joined to the other ends of the left and right front frames 32, respectively, and extend over the left and right side portions of the observer's head. In the case of FIG. 60, the support member further has a top frame 34 joined at both ends thereof to the other ends of the left and right rear frames 33, respectively, such that the top frame 34 supports the top of the observer's head.

A rear plate 35 is joined to one front frame 32 near the joint to the rear frame 33. The rear plate 35 is formed from an elastic member, e.g. a metal leaf spring. In the case of FIG. 60, a rear cover 36, which constitutes a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. In the case of FIG. 60, the cable 41 extends through the top frame 34, the rear frames 33, the front frames 32 and the rear plate 35 and projects to the outside from the rear end of the rear cover 36. In the case of FIG. 59, the cable 41 projects from the rear end of the rear plate 35. The cable 41 is connected to a video reproducing unit 40. It should be noted that reference numeral 40a in the figures denotes a switch and volume control part of the video reproducing unit 40.

The cable 41 may have a jack and plug arrangement attached to the distal end thereof so that the cable 41 can be detachably connected to an existing video deck. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the image display apparatus may be arranged to receive external radio signals through an antenna connected thereto.

In the foregoing Examples 2 to 14, a stop 8 may be disposed in place of the observer's eyeball (exit pupil) so as to project an image onto a screen 9 as in Example 1. In this case also, it is possible to display an image which appears to be natural under conditions close to those of the human visual field.

Thus, it is possible according to the present invention to project an image in which a blurred image is present at the periphery of a proper image displayed in a good image-formation condition by virtue of the arrangement of an optical system as described above in Examples 1 to 14. Because the edges of the image, which cause the dynamic presence to be impaired, are not clearly displayed, the reality and dynamic presence of the displayed image can be improved.

Although the image display apparatus according to the present invention has been described by way of some embodiments, it should be noted that the present invention is not necessarily limited to these embodiments and that various changes and modifications may be imparted thereto.

As will be clear from the foregoing description, it is possible according to the present invention to provide an image display apparatus, e.g. a head-mounted image display apparatus, which is capable of displaying an image with dynamic presence even if the observation field angle is not wide, and which is easy to view and unlikely to cause the observer's eye to be fatigued.

What we claim is:

1. An image display apparatus comprising image display means that displays an image, and a projection optical system that projects said image, wherein said projection optical system has an edge portion having a refracting or reflecting action, said edge portion being arranged such that a refracting power for a periphery of any image display area is larger in a positive direction than a refracting power for a principal display area, wherein said projection optical system is an ocular optical system that projects said image onto a retina in an observer's eyeball and that includes a surface which has both transmitting and reflecting actions and which is tilted with respect to both said image display device and a visual axis so as to project an enlarged image of said image displayed by said image display device;

wherein said ocular optical system has a concave mirror disposed to face said image display means and having a focal length f satisfying a condition of $15 \leq f \leq 60$ millimeters so as to project an enlarged image of said image displayed by said image display means, said ocular optical system further having a semitransparent mirror disposed between said concave mirror and said image display means so as to lead light beams reflected by said concave mirror into said observer's eyeball, and said concave mirror having a configuration in which a point of intersection between a line normal to a plane tangent to a peripheral area of said concave mirror and an optical axis of said concave mirror is closer to said concave mirror than a point of intersection between a line normal to a plane tangent to a principal area of said concave mirror and the optical axis of said concave mirror, so that a refracting power for light rays in said peripheral area is larger in a positive direction than a refracting power for light rays in said principal display area.

2. An image display apparatus comprising image display means that displays an image, and a projection optical system that projects said image, wherein said projection optical system has an edge portion having a refracting or reflecting action, said edge portion being arranged such that a refracting power for a periphery of any image display area is larger in a positive direction than a refracting power for a principal display area, wherein said projection optical system is an ocular optical system that projects said image onto a retina in an observer's eyeball and that includes a surface which has both transmitting and reflecting actions and which is tilted with respect to both said image display device and a visual axis so as to project an enlarged image of said image displayed by said image display device;

wherein said ocular optical system has a concave mirror having an action by which said image displayed by said image display means is projected as an enlarged image, said concave mirror having a focal length f satisfying a condition of $15 \leq f \leq 60$ millimeters and being disposed to face said observer's eyeball such that an optical axis of said concave mirror intersects a line normal to said image display means, said ocular optical system further having a semitransparent mirror disposed between said observer's eyeball and said concave mirror to lead light beams emitted from said image display means to said concave mirror and to lead light beams reflected by said concave mirror into said observer's eyeball, and said concave mirror having a configuration in which a point of intersection between a line normal to a plane tangent to a peripheral area of said concave mirror and the optical axis of said concave mirror is closer to said concave mirror than a point of intersection between a line normal to a plane tangent to a principal area of said concave mirror and the optical axis of said concave mirror, so that a refracting power for light rays in said peripheral area is larger in a positive direction than a refracting power for light rays in said principal display area.

3. An image display apparatus comprising image display means that displays an image, and a projection optical system that projects said image, wherein said projection optical system has an edge portion having a refracting or reflecting action, said edge portion being arranged such that a refracting power for a periphery of any image display area is larger in a positive direction than a refracting power for a principal display area, wherein said projection optical system is an ocular optical system that projects said image onto a retina in an observer's eyeball and that includes a surface which has both transmitting and reflecting actions and which is tilted with respect to both said image display device and a visual axis so as to project an enlarged image of said image displayed by said image display device;

wherein said ocular optical system has a concave mirror disposed to face said image display means and having a focal length f satisfying a condition of $15 \leq f \leq 60$ millimeters so as to project an enlarged image of said image displayed by said image display means, said ocular optical system further having a cemented prism with a semitransparent portion disposed between said concave mirror and said image display means to light beams reflected by said concave mirror into said observer's eyeball, said concave mirror having a configuration in which a point of intersection between a line normal to a plane tangent to a peripheral area of said concave mirror and an optical axis of said concave mirror is closer to said concave mirror than a point of intersection between a line normal to a plane tangent to a principal area of said concave mirror and the optical axis of said concave mirror, so that a refracting power for light rays in said peripheral area is larger in a positive direction than a refracting power for light rays in said principal display area.

4. An image display apparatus comprising image display means that displays an image, and a projection optical system that projects said image, wherein said projection optical system has an edge portion having a refracting or reflecting action, said edge portion being arranged such that a refracting power for a periphery of any image display area is larger in a positive direction than a refracting power for a principal display area, wherein said projection optical system is an ocular optical system that projects said image onto a retina in an observer's eyeball and that includes a surface which has both transmitting and reflecting actions and which is tilted with respect to both said image display device and a visual axis so as to project an enlarged image of said image displayed by said image display device;

wherein said ocular optical system has a concave mirror having a focal length f satisfying a condition of $15 \leq f \leq 60$ millimeters and disposed such that an optical axis of said concave mirror intersects a line normal to said image display means so as to project an enlarged image of said image displayed by said image display means, said ocular optical system further having a cemented prism with a semitransparent portion disposed between said concave mirror and said image display means to lead light beams reflected by said concave mirror into said observer's eyeball, and said concave mirror having a configuration in which a point of intersection between a line normal to a plane tangent to a peripheral area of said concave mirror and the optical axis of said concave mirror is closer to said concave mirror than a point of intersection between a line normal to a plane tangent to a principal area of said concave mirror and the optical axis of said concave mirror, so that a refracting power for light rays in said peripheral area is larger in a positive direction than a refracting power for light rays in said principal display area.

5. An image display apparatus comprising:
image display device that displays an image,
a projection optical system that projects said image,
   wherein said projection optical system comprises at least a prism, said prism having at least an entrance surface through which light from said image display enters said prism, a reflecting surface that reflects the light in said prism, and an exit surface through which the light exits from said prism, wherein said projection optical system has an edge portion having a refracting or reflecting action, said edge portion being arranged such that a refracting power for a periphery of any image display area is larger in a positive direction than a refracting power for a principal display area; and
a periphery bending optical device placed near said prism, said periphery bending optical device being arranged to distribute part of light beams from a periphery of said image display device to inner and outer portions of an image display area in an image field, wherein said periphery bending optical device is placed closer to said projection optical system than said image display device,
wherein said projection optical system is an ocular optical system that projects said image onto a retina in an observer's eyeball,
wherein said periphery bending optical device is disposed in an optical path extending between said observer's eyeball and an optical device having a principal refracting power, said periphery bending optical device being arranged such that a light beam-refracting power for the peripheral area of said image display area is larger in a positive direction than a light beam-refracting power for said principal display area, and
wherein said ocular optical system has a concave mirror disposed to face said image display device and having a focal length f satisfying a condition of 15≦f≦60 millimeters so as to project an enlarged image of said image displayed by said image display device, said ocular optical system further having a semitransparent mirror disposed between said concave mirror and said image display device so as to lead light beams reflected by said concave mirror into said observer's eyeball, and said ocular optical system further having a periphery bending optical device disposed in an optical path extending between said semitransparent mirror and said observer's eyeball, said periphery bending optical device being arranged such that a refracting power for a peripheral area of said image display device is larger in a positive direction than a refracting power for the principal display area.

6. An image display apparatus comprising image display device that displays an image;
a projection optical system that projects said image,
   wherein said projection optical system comprises at least a prism, said prism having at least an entrance surface through which light from said image display device enters said prism, a reflecting surface that reflects the light in said prism, and an exit surface through which the light exits from said prism, wherein said projection optical system has an edge portion having a refracting or reflecting action, said edge portion being arranged such that a refracting power for a periphery of any image display area is larger in a positive direction than a refracting power for a principal display area; and
a periphery bending optical device placed near said prism, said periphery bending optical device being arranged to distribute part of light beams from a periphery of said image display device to inner and outer portions of an image display area in an image field, wherein said periphery bending optical device is placed closer to said projection optical system than said image display device,
wherein said projection optical system is an ocular optical system that projects said image onto a retina in an observer's eyeball,
wherein said ocular optical system has an aspherical surface provided on a principal refracting surface thereof, said aspherical surface having a positive refracting power that weakens at a periphery thereof, said ocular optical system further comprising a periphery bending optical device having a large refracting power in a positive direction to lead light beams subjected to an action at the periphery of said aspherical surface to a pupil of said observer's eyeball, and
wherein said ocular optical system has an optical system including a surface which has both transmitting and reflecting actions and which is tilted with respect to both said image display device and a visual axis so as to project an enlarged image of said image displayed by the image display device.

7. An image display apparatus according to claim 6, wherein said ocular optical system has a concave mirror disposed to face said image display device and having a focal length f satisfying a condition of 15≦f≦60 millimeters so as to project an enlarged image of said image displayed by said image display device, said concave mirror having an aspherical surface in which a positive refracting power for a peripheral area of said image is weaker than a positive refracting power for a principal display area of said image, said ocular optical system further having a semitransparent mirror disposed between said concave mirror and said image display device so as to lead light beams reflected by said concave mirror into said observer's eyeball, and said ocular optical system further having a periphery bending optical device disposed in an optical path extending between said semitransparent mirror and said observer's eyeball, said periphery bending optical device being arranged such that a refracting power for said peripheral area of said image is larger in a positive direction than a refracting power for said principal display area.

8. An image display apparatus according to claim 6, wherein said ocular optical system has a concave mirror having an action by which said image displayed by said image display device is projected as an enlarged image said concave mirror having a focal length f satisfying a condition of 15≦f≦60 millimeters and being disposed to face said observer's eyeball such that an optical axis of said concave mirror intersects a line normal to said image display device, and said concave mirror having an aspherical surface in which a positive refracting power for a peripheral area of said image is weaker than a positive refracting power for a principal display area of said image, said ocular optical system further having a semitransparent mirror disposed between said observer's eyeball and said concave mirror so as to lead light beams emitted from said image display device to said concave mirror and to lead light beams reflected by said concave mirror into said observer's eyeball, and said ocular optical system further having a periphery bending optical device disposed in an optical path extending between said semitransparent mirror and said observer's eyeball, said periphery bending optical device being arranged such that a refracting power for said peripheral area of said image is larger in a positive direction than a refraction power for said principal display area of said image.

9. An image display apparatus according to claim 6, wherein said ocular optical system has a concave mirror disposed to face said image display device and having a focal length f satisfying a condition of 15≦f≦60 millimeters so as to project an enlarged image of said image displayed by said image display device, said concave mirror having an aspherical surface in which a positive refracting power for a peripheral area of said image is weaker than a positive refracting power for a principal display area of said image, said ocular optical system further having a cemented prism having a semitransparent portion disposed between said concave mirror and said image display device to lead light beams reflected by said concave mirror into said observer's eyeball, and said ocular optical system further having a periphery bending optical device disposed in an optical path extending between said cemented prism and said observer's eyeball, said periphery bending optical means being arranged such that a refracting power for said peripheral area of said image is larger in a positive direction than a refracting power for said principal display area of said image.

10. An image display apparatus according to claim 6, wherein said ocular optical system has a concave mirror having a focal length f satisfying a condition of 15≦f≦60 millimeters and disposed such that an optical axis of said concave mirror intersects a line normal to said image display device so as to project an enlarged image of said image displayed by said image display device, and said concave mirror having an aspherical surface in which a positive refracting power for a peripheral area of said image is weaker than a positive refracting power for a principal display area of said image, said ocular optical system further having a cemented prism having a semitransparent portion disposed between said concave mirror and said image display device to lead light beams reflected by said concave mirror into said observer's eyeball, and said ocular optical system further having a periphery bending optical device disposed in an optical path extending between said cemented prism and said observer'eyeball, said periphery bending optical device being arranged such that a refracting power for said peripheral area of said image is larger in a positive direction than a refracting power for said principal display area of said image.

11. An image display apparatus comprising:
image display device that displays an image; and
a projection optical system that projects said image;
wherein said projection optical system comprises at least a prism, said prism having at least an entrance surface through which light from said image display enters said prism, a reflecting surface that reflects the light in said prism, and an exit surface through which the light exits from said prism, wherein said projection optical system has an edge portion having a refracting or reflecting action, said edge portion being arranged such that a refracting power for a periphery of any image display area is larger in a positive direction than a refracting power for a principal display area; and
a periphery bending optical device placed near said prism, said periphery bending optical device being arranged to distribute part of light beams from a periphery of said image display device to inner and outer portions of an image display area in an image field, wherein said periphery bending optical device is placed closer to said projection optical system than said image display device,
wherein said edge portion is formed on an optical surface of said projection optical system that is closest to said image display device,
wherein said projection optical system is an ocular optical system that projects said image onto a retina in an observer's eyeball,
wherein said ocular optical system is an optical system including a surface which has both transmitting and reflecting actions and which is tilted with respect to both said image display device and a visual axis so as to project an enlarged image of said image displayed by said image display device.

12. An image display apparatus, comprising image display device that displays an image;
a projection optical system that projects said image,
wherein said projection optical system comprises at least a prism, said prism having at least an entrance surface through which light from said image display device enters said prism, a reflecting surface that reflects the light in said prism, and an exit surface through which the light exits from said prism, wherein said projection optical system has an edge portion having a refracting or reflecting action, said edge portion being arranged such that a refracting power for a periphery of any image display area is larger in a positive direction than a refracting power for a principal display area; and
a periphery bending optical device placed near said prism, said periphery bending optical device being arranged to distribute part of light beams from a periphery of said image display device to inner and outer portions of an image display area in an image field, wherein said periphery bending optical device is placed closer to said projection optical system than said image display device,
wherein said projection optical system is an ocular optical system that projects said image onto a retina in an observer's eyeball,
wherein said periphery bending optical device is disposed in an optical path extending between said observer's eyeball and an optical device having a principal refracting power, said periphery bending optical device being arranged such that a light beam-refracting power for the peripheral area of said image display area is larger in a positive direction than a light beam-refracting power for said principal display area, and
wherein said ocular optical system is an optical system including a surface which has both transmitting and reflecting actions and which is tilted with respect to both said image display device and a visual axis so as to project an enlarged image of said image displayed by said image display device.

13. An image display apparatus according to claim 12, wherein said periphery bending optical device is a diffractive optical element.

14. An image display apparatus according to claim 12, wherein said ocular optical system has a concave mirror having an action by which said image displayed by said image display means is projected as an enlarged image, said concave mirror having a focal length f satisfying a condition of $15 \leq f \leq 60$ millimeters and being disposed to face said observer's eyeball such that an optical axis of said concave mirror intersects a line normal to said image display means, said ocular optical system further having a semitransparent mirror disposed between said observer's eyeball and said concave mirror to lead light beams emitted from said image display means to said concave mirror and to lead light beams reflected by sad concave mirror into said observer's eyeball, and said ocular optical system further having periphery bending optical means disposed in an optical path extending between said semitransparent mirror and said observer's eyeball, said periphery bending optical means being arranged such that a refracting power for a peripheral area of said image display means is larger in a positive direction than a refracting power for the principal display area.

15. An image display apparatus according to claim 12, wherein said ocular optical system has a concave mirror disposed to face said image display means and having a focal length f satisfying a condition of $15 \leq f \leq 60$ millimeters so as to project an enlarged image of said image displayed by said image display means, said ocular optical system further having a cemented prism with a semitransparent portion disposed between said concave mirror and said image display means to lead light beams reflected by said concave mirror into said observer's eyeball, and wherein said periphery bending optical means is disposed in an optical path extending between said cemented prism and said observer's eyeball, said periphery bending optical means being arranged such that a refracting power for a peripheral area of said image display means is larger in a positive direction than a refracting power for the principal display area.

16. An image display apparatus according to claim 12, wherein said ocular optical system has a concave mirror having a focal length f satisfying a condition of $15 \leq f \leq 60$ millimeters and disposed such that an optical axis of said concave mirror intersects a line normal to said image display means so as to project an enlarged image of said image displayed by said image display means, said ocular optical system further having a cemented prism with a semitransparent portion disposed between sad concave mirror and said image display means to lead light beams reflected by said concave mirror into said observer's eyeball, and wherein said periphery bending optical means is disposed in an optical path extending between said cemented prism and said observer's eyeball, said periphery bending optical means being arranged such that a refracting power for a peripheral area of said image display means is larger in a positive direction than a refracting power for the principal display area.

17. An image display apparatus according to claim 15 or 16, wherein a final exit surface, which is closest to said observer's eyeball, serves also as said periphery bending optical device.

18. An image display apparatus according to claim 12, wherein said periphery bending optical device has a distribution of refracting power in which the refracting power becomes stronger as a distance from a center of said periphery bending optical device increases toward a periphery thereof.

19. An image display apparatus according to claim 12, wherein said periphery bending optical device has an action by which, in backward ray tracing from an exit pupil, light rays passing through a peripheral portion of said periphery bending optical device, which has a large refracting power, reach one of a vicinity of an edge of said optical device having the principal refracting power and a vicinity of an edge of a display area of said image display device.

20. An image display apparatus according to claim 12, wherein, assuming that a light ray which exits perpendicularly from a center of said image display device and which reaches said observer's eyeball is defined as an optical axis, and that a light ray passing through a center of an exit pupil or a light ray passing through a center of a pupil of said observer's eyeball when an observer gazes at a center of an image field is defined as a principal ray, and periphery bending optical device is provided so that a refracting action thereof begins to work at a point within a range extending from a point 2.5 millimeters from a position where the principal ray exiting from a most peripheral portion of said image display device reaches a surface of said periphery bending optical device, on a side of said position that is closer to said optical axis, to a point 2.5 millimeters from said position on a side thereof that is remote from said optical axis, and said refracting action is available in an area extending from said point at which said refracting action begins on a side of said point that is remote from said optical axis.

21. An image display apparatus according to claim 20, wherein said point at which said refracting action begins is within a range extending from a point 0.5 millimeter from said position on a side thereof that is closer to said optical axis to a point 0.5 millimeter from said position on a side thereof that is remote from said optical axis.

22. An image display apparatus according to claim 20, wherein said point at which said refracting action begins is within a range extending from a point 1.5 millimeter from said position on a side thereof that is closer to said optical axis to a point 2.5 millimeter from said position on a side thereof that is remote from said optical axis.

23. An image display apparatus according to claim 12, wherein said periphery bending optical device is a Fresnel optical element.

24. An image display apparatus comprising
image display device that displays an image; and
a projection optical system that projects said image,
wherein said projection optical system has an edge portion having a refracting or reflecting action, said edge portion being arranged such that a refracting power for a periphery of any image display area is larger in a positive direction than a refracting power for a principal display area, wherein said projection optical system is an ocular optical system that projects said image onto a retina in an observer's eyeball, wherein said ocular optical system includes a prism having at least three optical surfaces surrounding a medium that has a refractive index larger than 1, and wherein said prism has a third surface which is closest to said observer's eyeball and transmits light beams from said image display means toward said observer's eyeball; a second surface which is a reflecting surface titled with respect to a visual axis of said observer's eyeball to reflect light beams from said image display means toward said third surface; and a first surface which is a transmitting surface for leading light beams from said image display means into said prism wherein said first surface of said prism in said ocular optical system serves also as a periphery bending optical system in which a light beam-refracting power for a periphery of said image is larger in a positive direction than a light beam-refracting power for the principal display area.

* * * * *